United States Patent
Ibrahim et al.

(10) Patent No.: US 11,864,126 B2
(45) Date of Patent: Jan. 2, 2024

(54) POWER ALLOCATION PRIORITIZATION AT FULL DUPLEX USER EQUIPMENTS

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Seyedkianoush Hosseini, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 17/392,886

(22) Filed: Aug. 3, 2021

(65) Prior Publication Data

US 2023/0042073 A1 Feb. 9, 2023

(51) Int. Cl.
*H04W 52/24* (2009.01)
*H04L 5/14* (2006.01)

(52) U.S. Cl.
CPC ............... *H04W 52/24* (2013.01); *H04L 5/14* (2013.01)

(58) Field of Classification Search
None
See application file for complete search history.

(56) References Cited

U.S. PATENT DOCUMENTS

2018/0098291 A1* 4/2018 Fodor ................. H04W 52/346
2020/0235980 A1* 7/2020 John Wilson ........... H04L 5/143

FOREIGN PATENT DOCUMENTS

WO 2017180031 A1 10/2017
WO 2021035457 A1 3/2021

OTHER PUBLICATIONS

International Search Report and Written Opinion—PCT/US2022/035167—ISA/EPO—dated Oct. 5, 2022.

* cited by examiner

*Primary Examiner* — Hong Shao
(74) *Attorney, Agent, or Firm* — Procopio, Cory, Hargreaves & Savitch LLP

(57) ABSTRACT

Aspects presented herein may enable FD devices to apply power backoff and/or power allocation prioritization rules that are specific to FD transmissions. In one aspect, a UE determines an FD specific power backoff associated with each of at least one transmission of a plurality of transmissions in a slot that is configured as an FD slot, each FD specific power backoff is based on whether a corresponding transmission would cause self-interference with a DL reception in the FD slot, and the plurality of transmissions are overlapping in time. The UE determines a transmission power for each of the at least one transmission in the FD slot based on the determined FD specific power backoff for each of the at least one transmission. The UE transmits one or more of the at least one transmission based on the determined transmission power for the corresponding transmission.

28 Claims, 24 Drawing Sheets

POWER ALLOCATION PRIORITIZATION AT FULL DUPLEX USER EQUIPMENTS

TECHNICAL FIELD

The present disclosure relates generally to communication systems, and more particularly, to a wireless communication involving power allocation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus determines a full-duplex (FD) specific power backoff associated with each of at least one transmission of a plurality of transmissions in a slot that is configured as an FD slot, each FD specific power backoff being based on whether a corresponding transmission would cause self-interference with a downlink (DL) reception in the FD slot, the plurality of transmissions being overlapping in time. The apparatus determines a transmission power for each of the at least one transmission in the FD slot based on the determined FD specific power backoff for each of the at least one transmission. The apparatus transmits one or more of the at least one transmission based on the determined transmission power for the corresponding transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
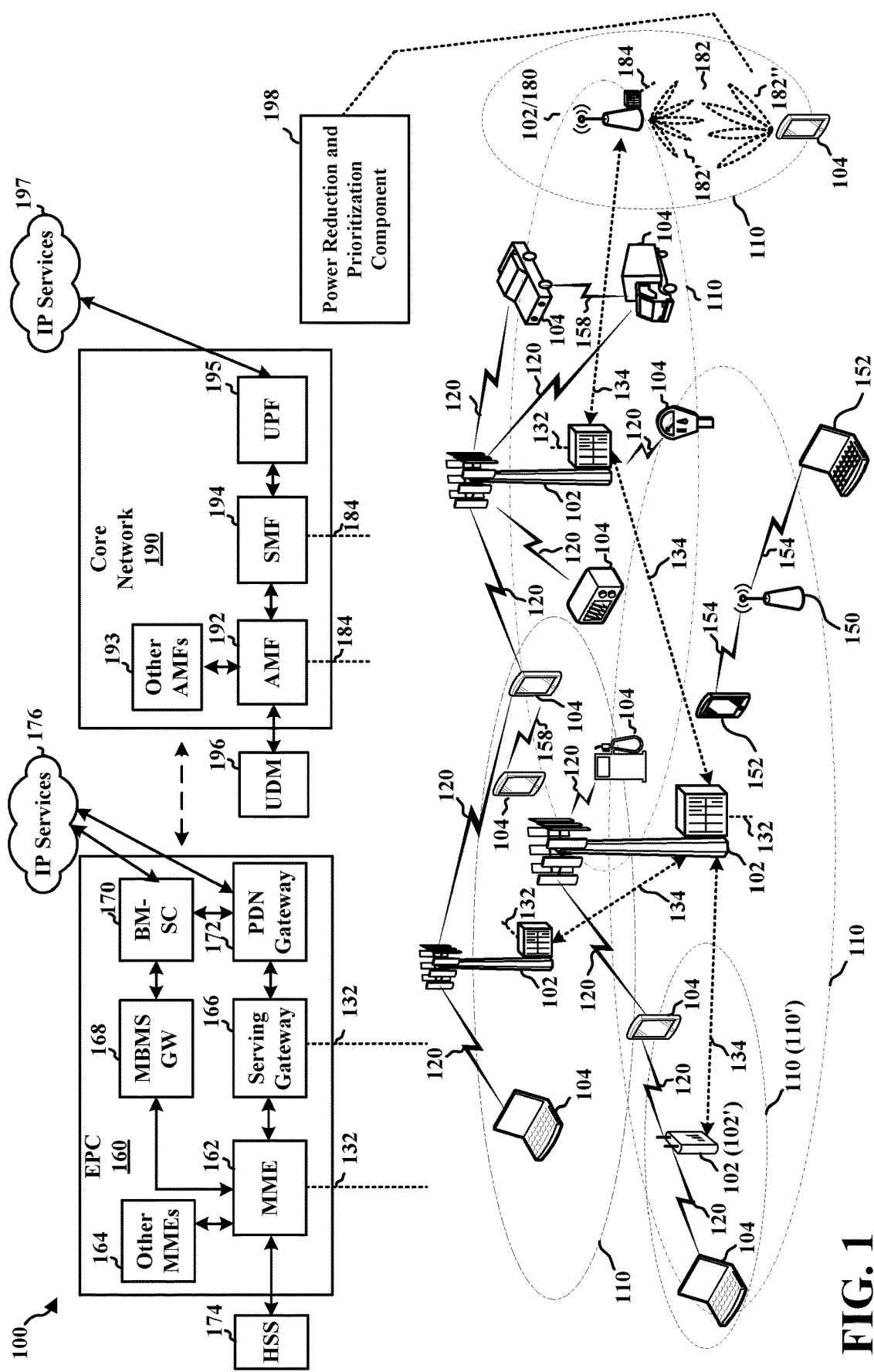
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may improve wireless communication for FD devices or FD capable devices (e.g., UEs operating under an FD mode) by enabling full-duplex devices to apply power reduction for FD operations. Aspects presented herein may enable FD devices to determine whether to apply an MPR that is specific to FD transmissions (e.g., when an uplink transmission and a downlink transmission is at least partially overlapped in time) and/or whether to apply power allocation prioritization rules to UL/SL transmissions associated with FD transmissions, etc.

In certain aspects, the UE 104 may include a power reduction and prioritization component 198 configured to apply a power backoff and/or a power allocation prioritization to at least one of multiple transmissions if at least one DL reception overlaps with the multiple transmissions at least partially in time. In one configuration, the power reduction and prioritization component 198 may determine an FD specific power backoff associated with each of at least one transmission of a plurality of transmissions in a slot that is configured as an FD slot, each FD specific power backoff being based on whether a corresponding transmission would cause self-interference with a DL reception in the FD slot, the plurality of transmissions being overlapping in time. In such configuration, the power reduction and prioritization component 198 may determine a transmission power for each of the at least one transmission in the FD slot based on the determined FD specific power backoff for each of the at least one transmission. In such configuration, the power reduction and prioritization component 198 may transmit one or more of the at least one transmission based on the determined transmission power for the corresponding transmission.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
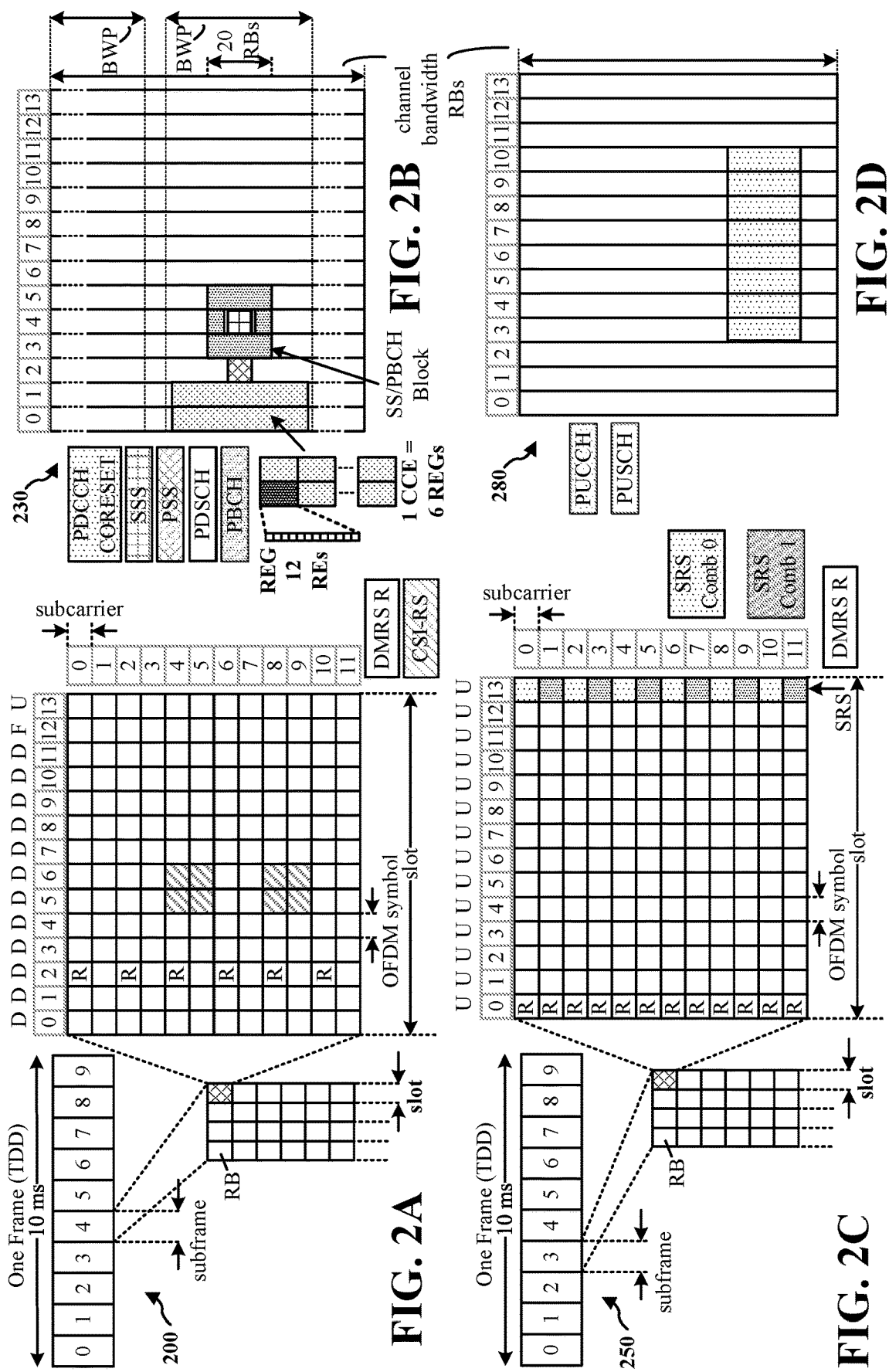
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*$kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
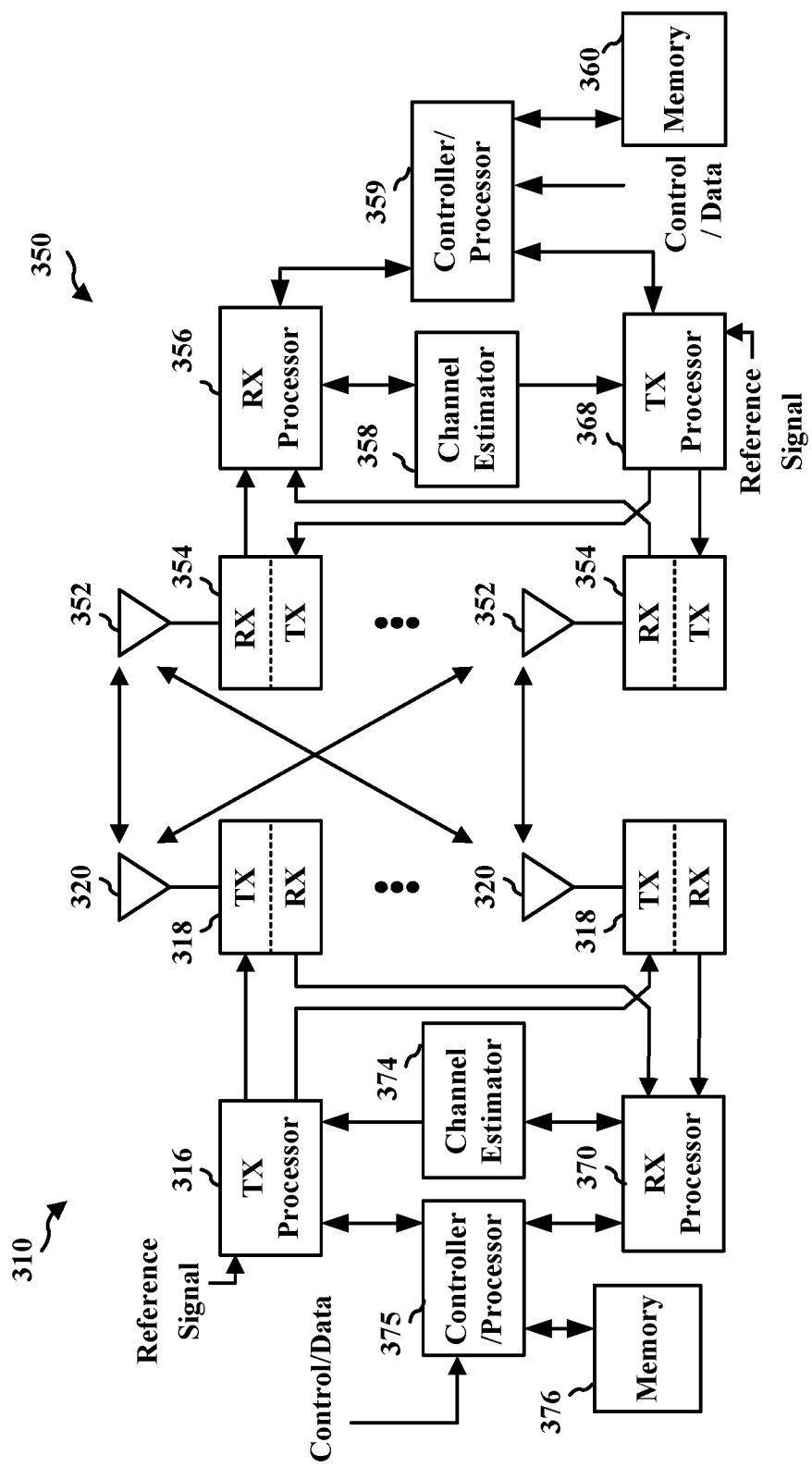
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In one example, at least one of the TX processor 368, the RX processor 356, and the controller/processor 359 may be configured to perform aspects in connection with the power reduction and prioritization component 198 of FIG. 1.

Figures 4A, 4B:
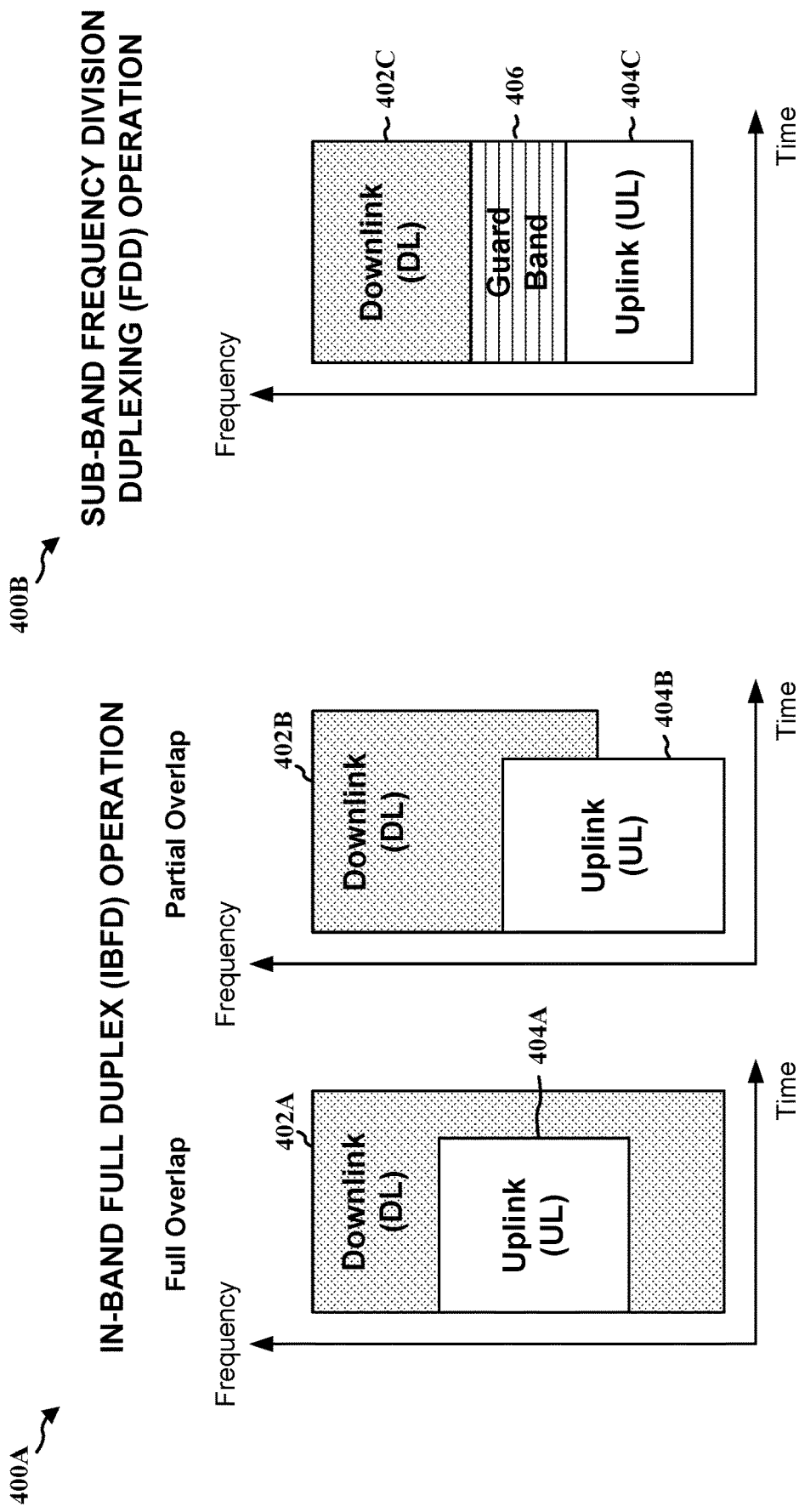
FIG. 4A is a diagram illustrating an example of an in-band full duplex (IBFD) operation in accordance with various aspects of the present disclosure.
FIG. 4B is a diagram illustrating an example of a sub-band frequency division duplexing (FDD) operation in accordance with various aspects of the present disclosure.

A communication network, such as 5G NR, may support full-duplex (FD) operations, where a wireless device (e.g., a UE) may simultaneously transmit data to and receive data from another wireless device (e.g., a base station). As such, full-duplex operations may increase the capacity of the communication network. In some examples, full-duplex operations may include an in-band full-duplex (IBFD) operation and/or a sub-band frequency division duplexing (FDD) operation (which may also be referred to as "flexible duplex" operations). FIG. 4A is a diagram 400A illustrating an example of an IBFD operation in accordance with various aspects of the present disclosure. For an IBFD operation, a wireless device may transmit data (e.g., uplink data) and receive data (e.g., downlink data) at a same time and on the same frequency resource (e.g., the transmission and the reception may overlap at least partially in time and in frequency). For example, as shown by the diagram 400A, a downlink (DL) transmission 402A may be fully overlapped with an uplink (UL) transmission 404A, or a DL transmission 402B may be partially overlapped with an UL transmission 404B, etc.

FIG. 4B is a diagram 400B illustrating an example of a sub-band FDD operation in accordance with various aspects of the present disclosure. For a sub-band FDD operation, a wireless device may transmit data (e.g., uplink data) and receive data (e.g., downlink data) at a same time but on different frequency resources (e.g., the transmission and the reception may overlap at least partially in time but not in frequency). For example, a UE may receive a DL transmission 402C and transmit an UL transmission 404C at a same time using different frequency resources. The DL transmission 402C and the UL transmission 404C may be separated (in frequency) by a guard band 406. In other words, the guard band 406 may provide a frequency gap or a frequency separation between DL resources (e.g., the DL transmission 402C) and UP resources (e.g., the UL transmission 404C).

Figure 5:
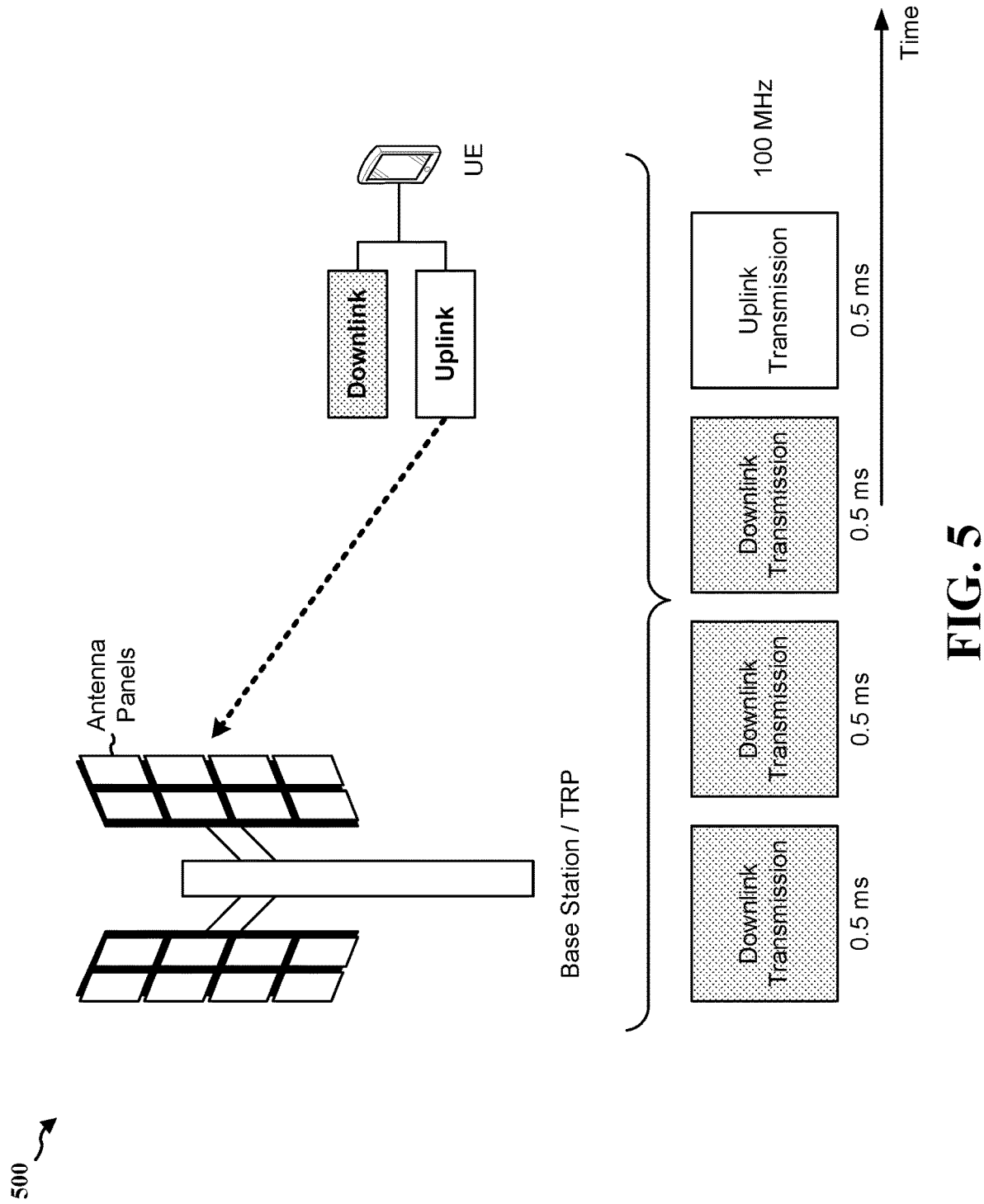
FIG. 5 is a diagram illustrating an example of a static time-division duplexing (TDD) operation in accordance with various aspects of the present disclosure.

FIG. 5 is a diagram 500 illustrating an example of a static time-division duplexing (TDD) operation (e.g., a non-FD operation) in accordance with various aspects of the present disclosure. For the static FDD operation, DL and UL transmissions may be time-division multiplexed (TDMed), such that DL and UL transmissions do not overlap in time. In another words, a UE may either transmit uplink data to a base station/TRP or receive downlink data from the base station/TRP at a time. In addition, the UE may use a same frequency bandwidth (e.g., 100 MHz) to transmit the uplink data and to receive the downlink data.

Figure 6:
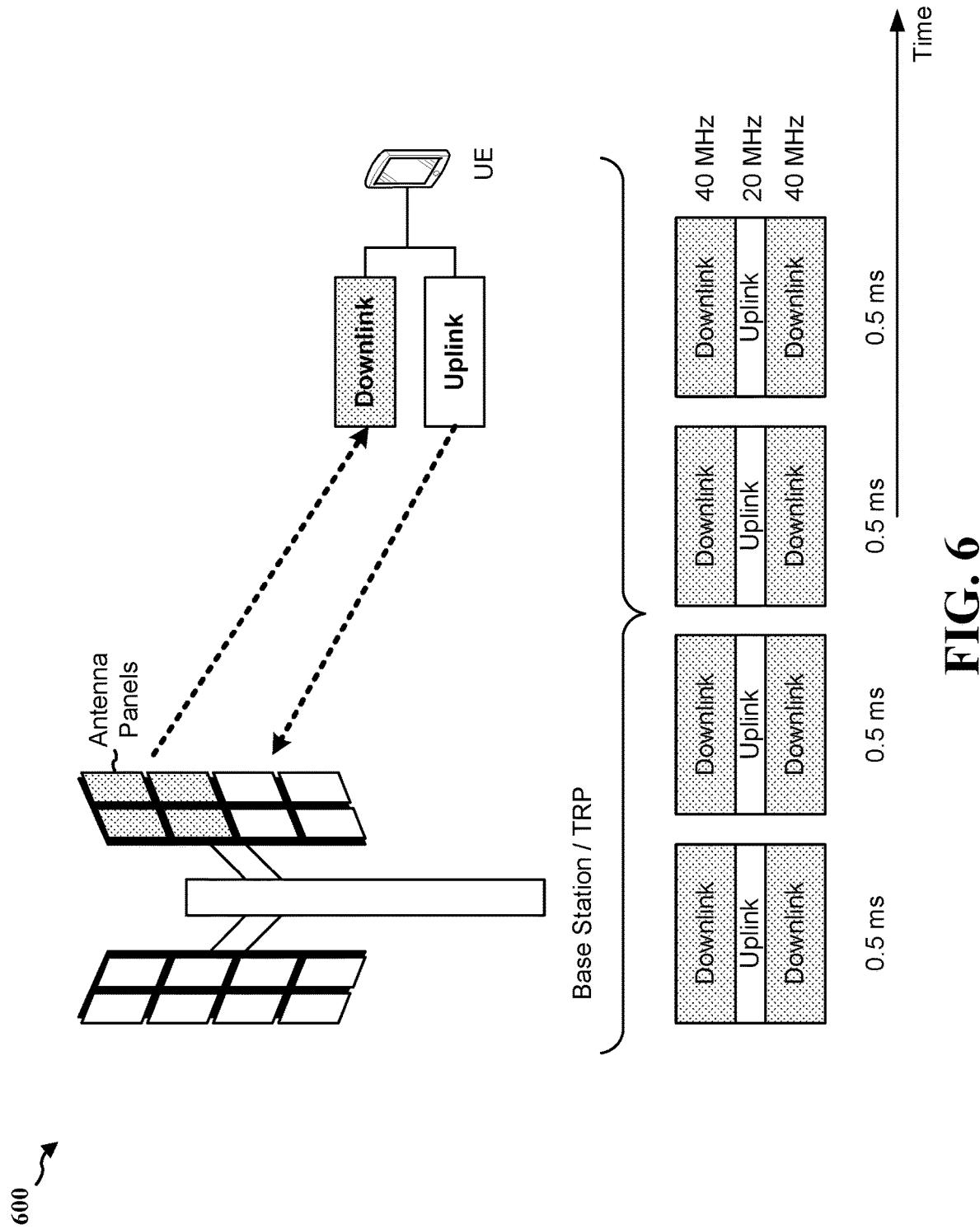
FIG. 6 is a diagram illustrating an example of a sub-band full duplex (SBFD) operation in accordance with various aspects of the present disclosure.

FIG. 6 is a diagram 600 illustrating an example of a sub-band FD (SBFD) operation in accordance with various aspects of the present disclosure. For the sub-band FD operation, DL and UL transmissions may occur simultaneously (e.g., within a same slot). For example, a UE may receive DL transmissions from a set of antenna panels of a base station or a TRP, and the UE may transmit UL transmissions to another set of antenna panels of the base station or the TRP at the same time. In some examples, the DL and UL transmission may be based on frequency division duplexing (FDD), where the DL and UL transmissions may use different frequency bandwidths. For example, a UE may use a portion of an available bandwidth (e.g., 80 MHz of 100 MHz available bandwidth) to receive downlink data, and the UE may simultaneously use another portion of the available bandwidth (e.g., the other 20 MHz of 100 MHz available bandwidth) to transmit uplink data. As such, full-duplex operations may improve transmission coverage and latency for wireless devices as wireless devices may transmit and receive data at the same time.

Figure 7:
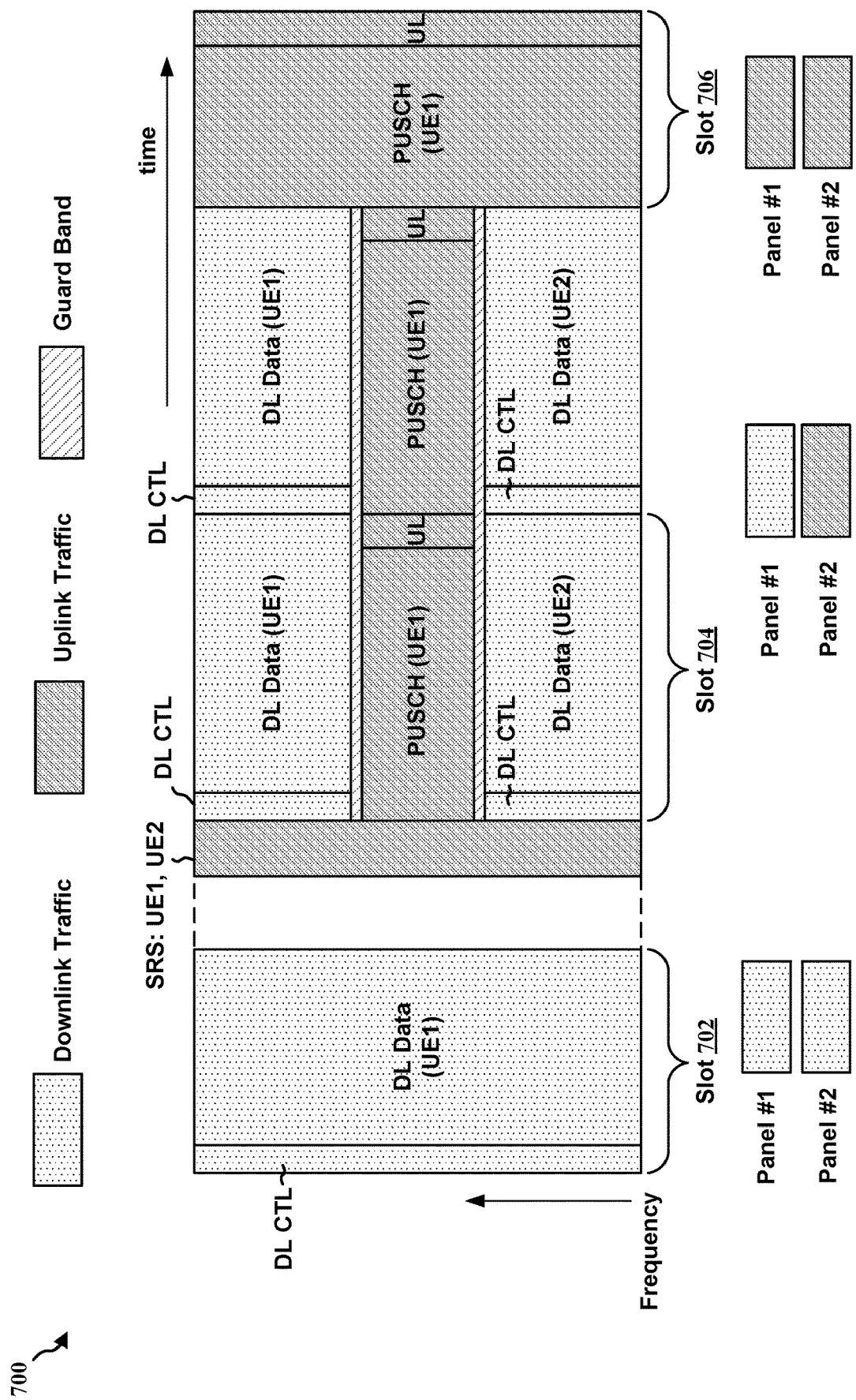
FIG. 7 is a diagram illustrating an example of an SBFD slot format in accordance with various aspects of the present disclosure.

FIG. 7 is a diagram 700 illustrating an example of an SBFD slot format in accordance with various aspects of the present disclosure. For an SBFD operation, a slot in which a band may be used for both UL and DL transmissions may be referred to as a "D+U slot" and/or an "FD slot." A D+U slot may enable DL and UL transmissions to occur in overlapping bands (e.g., for in-band full-duplex) or adjacent bands (e.g., for sub-band full-duplex). In a given D+U symbol (e.g., a symbol within a D+U slot), a half-duplex UE (e.g., a non-FD UE) may either transmit in the UL band or receive in the DL band. On the other hand, in a given D+U symbol, an FD UE may transmit in the UL band and/or receive in the DL band in the same slot/symbol.

In some examples, a D+U slot may include DL symbols without UL symbol(s), or include UL symbols without DL symbol(s), or include FD symbols. For example, as shown by the diagram 700, a D+U slot 702 may include DL symbols without UL symbols, where a half-duplex UE (UE2) or an FD UE (UE1) may be scheduled to receive data from a base station/TRP via the D+U slot 702 (e.g., from panel #1 and panel #2 of the base station/TRP). In another example, a D+U slot 704 may include D+U symbols, where an FD UE (UE1) may transmit data (e.g., a physical uplink shared channel (PUSCH)) in an UL band (e.g., to panel #2 of the base station or the TRP) and receive data (e.g., a physical downlink shared channel (PDSCH)) in a DL band (e.g., from panel #1 of the base station), and a half-duplex UE (UE2) may receive data in another DL band (e.g., from panel #1 of the base station). In another example, a D+U slot 706 may include UL symbols without DL symbols, where a half-duplex UE (UE2) or an FD UE (UE1) may be scheduled to transmit data to a base station/TRP via the D+U slot 706 (e.g., to panel #1 and panel #2 of the base station/TRP). For a D+U slot that includes D+U symbols, the band for UL transmission and the band for DL transmission may be separated in frequency by a guard band.

Figure 8A:
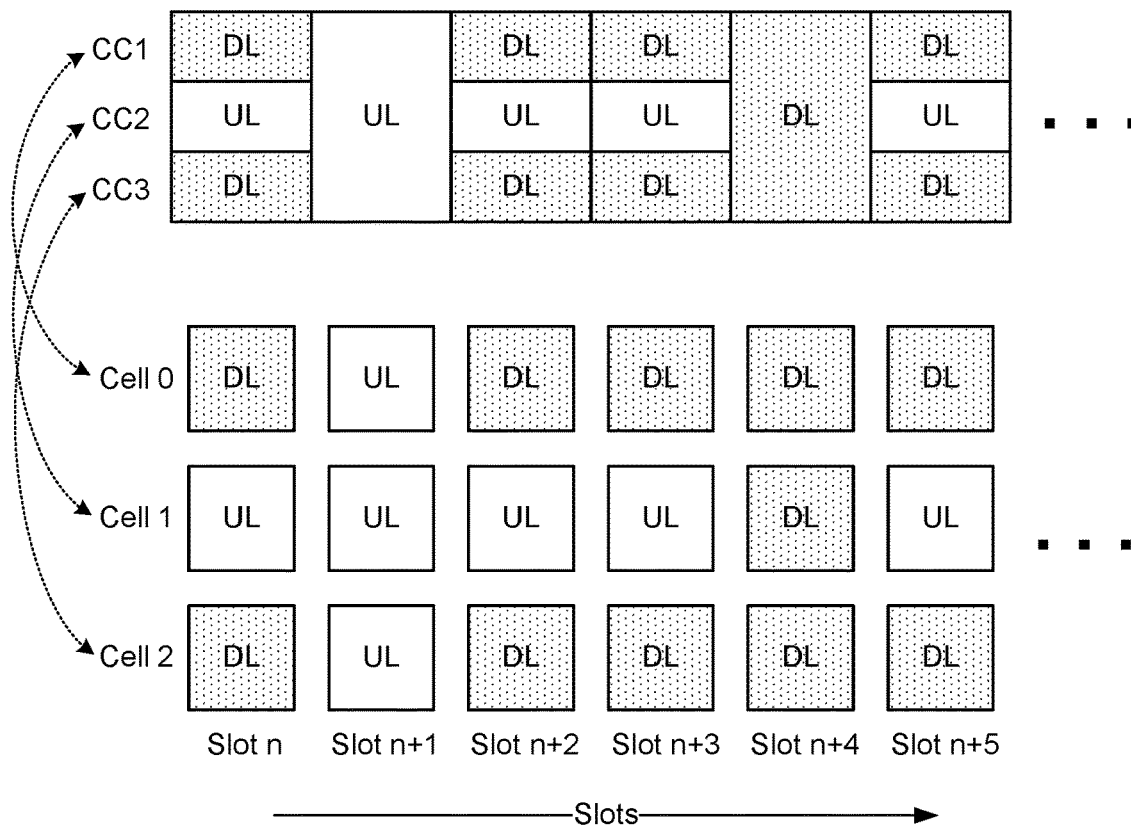
FIGS. 8A and 8B are diagrams illustrating an example of an SBFD operation and an example of an IBFD operation involving multiple cells in accordance with various aspects of the present disclosure.

An FD operation may be associated with multiple cells (e.g., CCs), where a UE may transmit UL transmission(s) and/or receive DL transmission(s) via different cells. FIG. 8A is a diagram 800A illustrating an example of an SBFD operation involving multiple cells (e.g., a cross-cell FD operation) in accordance with various aspects of the present disclosure. A UE may perform an FD operation via three cells, where the UE may simultaneously transmit UL transmission(s) and receive DL transmission(s) via a first cell (Cell 0), a second cell (Cell 1), and a third cell (Cell 2). Each cell may occupy a different frequency band. For example, at slot n, the UE may simultaneously receive DL transmissions (e.g., PDSCHs) via Cell 0 and Cell 2 (e.g., via a first band and a second band) and transmit an UL transmission (e.g., a PUSCH) via Cell 1 (e.g., via a third band); at slot n+1, the UE may simultaneously transmit one UL transmission via Cell 1, one UL transmission via Cell 2, and one UL transmission via Cell 3; and at slot n+2, the UE may simultaneously receive DL transmissions via Cell 0 and Cell 2 and transmit an UL transmission via Cell 1, etc.

Figure 8B:
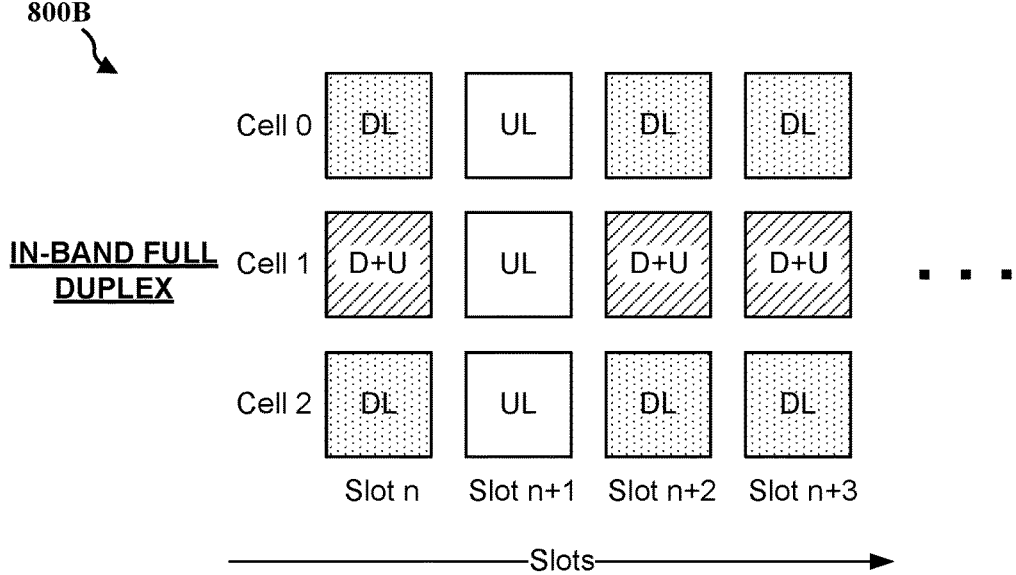

FIG. 8B is a diagram 800B illustrating an example of an IBFD operation involving multiple cells (e.g., a cross-cell FD operation) in accordance with various aspects of the present disclosure. A UE may perform an FD operation with three cells, where the UE may simultaneously communicate via a first cell (Cell 0), a second cell (Cell 1), and a third cell (Cell 2). In one example, the UE may communicate via a cell (e.g., Cell 1) based on an FD mode, where the UE may transmit UL data (e.g., a PUSCH) via a cell and also receive DL data (e.g., a PDSCH) via the cell at a same time (e.g., using a D+U slot).

Figure 9:
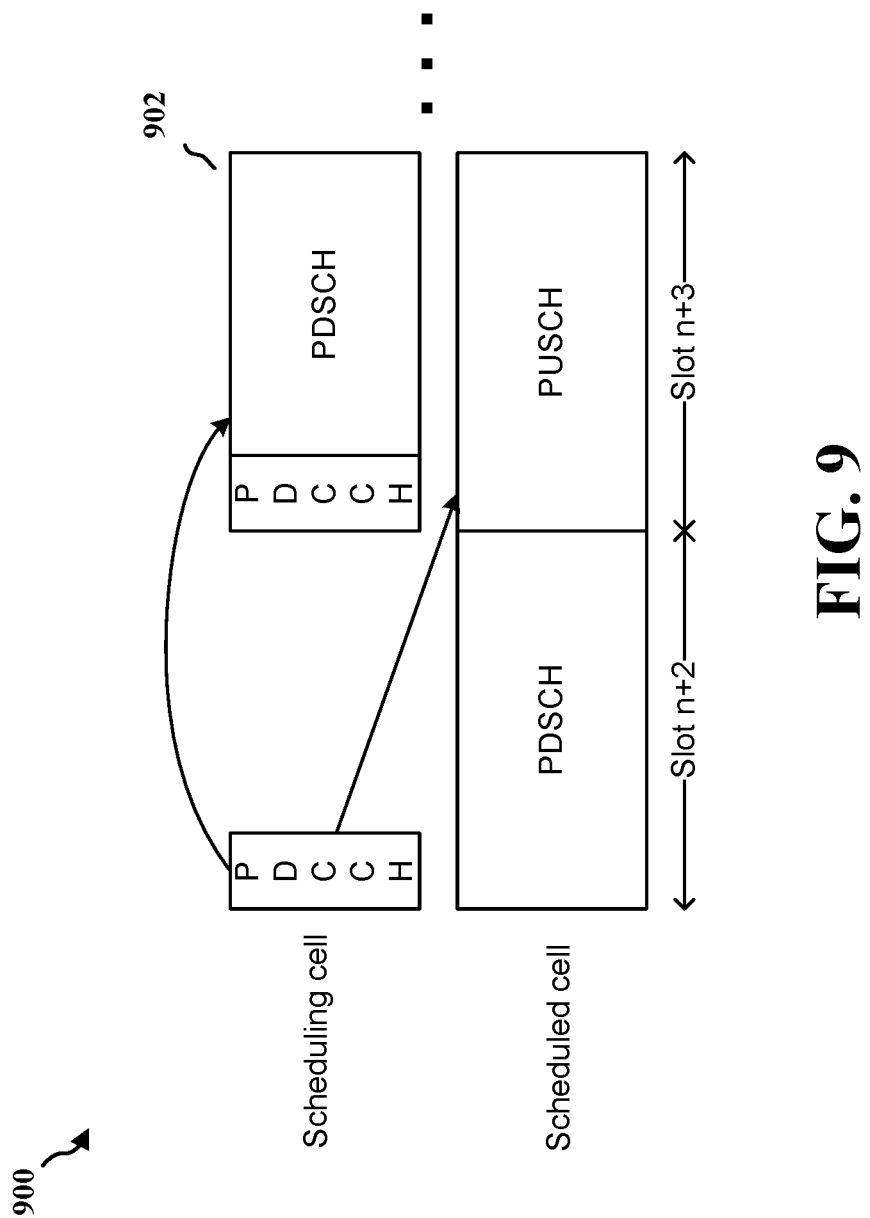
FIG. 9 is a diagram illustrating an example scheduling for cross-cell FD in accordance with various aspects of the present disclosure.

FIG. 9 is a diagram 900 illustrating an example scheduling for cross-cell FD. For a cross-cell FD operation, a cell (e.g., a scheduling cell) may include scheduling of UL transmission(s) and/or DL transmission(s) for other cells (e.g., scheduled cells). For example, as shown at 902, a scheduling cell may carry a physical downlink control channel (PDCCH) that schedules a PDSCH to be transmitted to the UE via the scheduling cell at slot n+3, and the PDCCH may also schedule a PUSCH to be transmitted from the UE via a scheduled cell at slot n+3, where slot n+3 may be an FD slot.

Figures 10A, 10B:
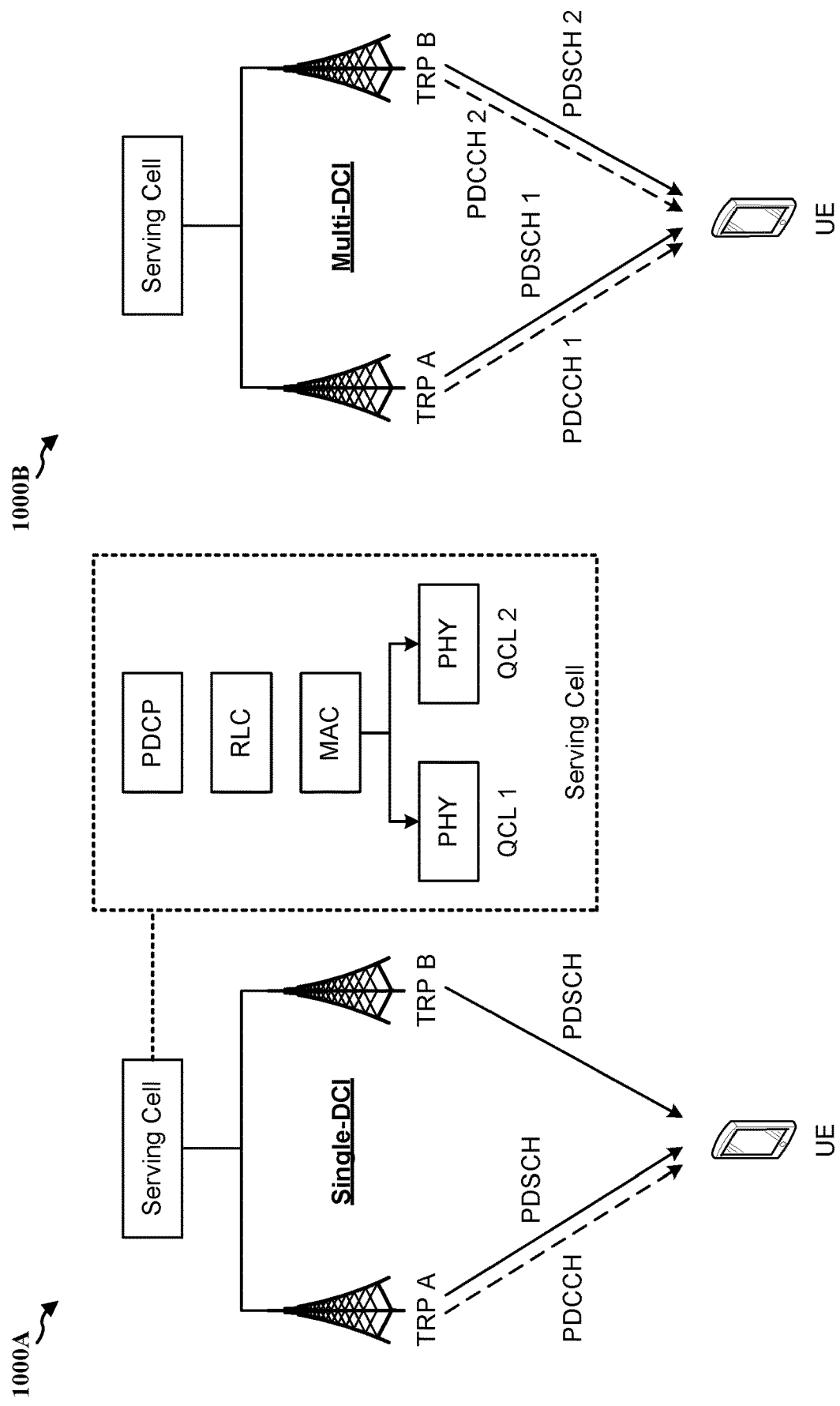
FIG. 10A is a diagram illustrating an example of a multi-transmission-reception point (multi-TRP) operation based on single-downlink control information (DCI) in accordance with various aspects of the present disclosure.
FIG. 10B is a diagram illustrating an example of a multi-TRP operation based on multi-DCI in accordance with various aspects of the present disclosure.

A UE may also communicate with a serving cell via multiple transmission-reception points (TRPs) that are associated with the serving cell. In other words, the communication between the UE and the serving cell may be based on a multi-TRP operation (from a UE's perspective). FIG. 10A is a diagram 1000A illustrating an example of a multi-TRP operation based on single-downlink control information (DCI) in accordance with various aspects of the present disclosure. A serving cell may be associated with a first TRP (e.g., TRP A) and a second TRP (e.g., TRP B), where the serving cell may be configured with two physical (PHY) layers and each physical layer may be associated with a quasi-co location (QCL) assumption (e.g., a beam direction). As such, a UE may communicate with the serving cell via at least one of the TRPs. For example, the UE may receive a PDSCH from the serving cell via the first TRP, via the second TRP, or via both the first TRP and the second TRP, etc. In one example, as shown by the diagram 1000A, a multi-TRP operation may be based on a single-DCI, where a TRP (e.g., the first TRP) may transmit DCI (e.g., a PDCCH) that schedules a corresponding PDSCH to be transmitted from multiple TRPs (e.g., from both the first TRP and the second TRPs). In other words, a TRP may schedule PDSCH transmission for another TRP(s). The PDSCH scheduled by the DCI may be multiplexed based on space-division multiplexing (SDM), frequency division multiplexing (FDM), time division multiplexing (TDM), or a combination thereof. Thus, the UE may receive the PDSCH from the first TRP and the second TRP based on SDM, FDM, TDM, or a combination thereof. In some examples, a multi-TRP operation based on a single-DCI may be suitable for a backhaul network as different PDSCH transmission schemes (e.g., different multiplexing schemes) may provide a more robust or flexible communication.

In another example, a multi-TRP operation may be based on multiple DCI, where each TRP may transmit a PDCCH to a UE that schedules its corresponding PDSCH. FIG. 10B is a diagram 1000B illustrating an example of a multi-TRP operation based on multi-DCI in accordance with various aspects of the present disclosure. In one example, a first TRP (e.g., TRP A) may transmit first DCI (e.g., a first PDCCH, PDCCH 1, etc.) to a UE that schedules a first PDSCH (e.g., PDSCH 1) to be transmitted from the first TRP to the UE. Similarly, a second TRP (e.g., TRP B) may transmit second DCI (e.g., a second PDCCH, PDCCH 2, etc.) to the UE that schedules a second PDSCH (e.g., PDSCH 2) to be transmitted from the second TRP to the UE. In some examples, for a multi-TRP operation that is based on multi-DCI, a carrier aggregation (CA) framework may be leveraged/used to treat different TRPs as different virtual CCs from a UE capability perspective.

In some scenarios, for a single cell operation with two uplink carriers or for an operation with carrier aggregation, if a total UE transmit power for PUSCH, PUCCH, physical random access channel (PRACH), and/or sounding reference signal (SRS) transmissions on serving cells in a frequency range in a respective transmission occasion "i" would exceed P_cmax(i) (e.g., a maximum UE transmitter power), a UE may be configured to allocate power to PUSCH, PUCCH, PRACH, and/or SRS transmissions based on a defined priority order.

Figure 11:
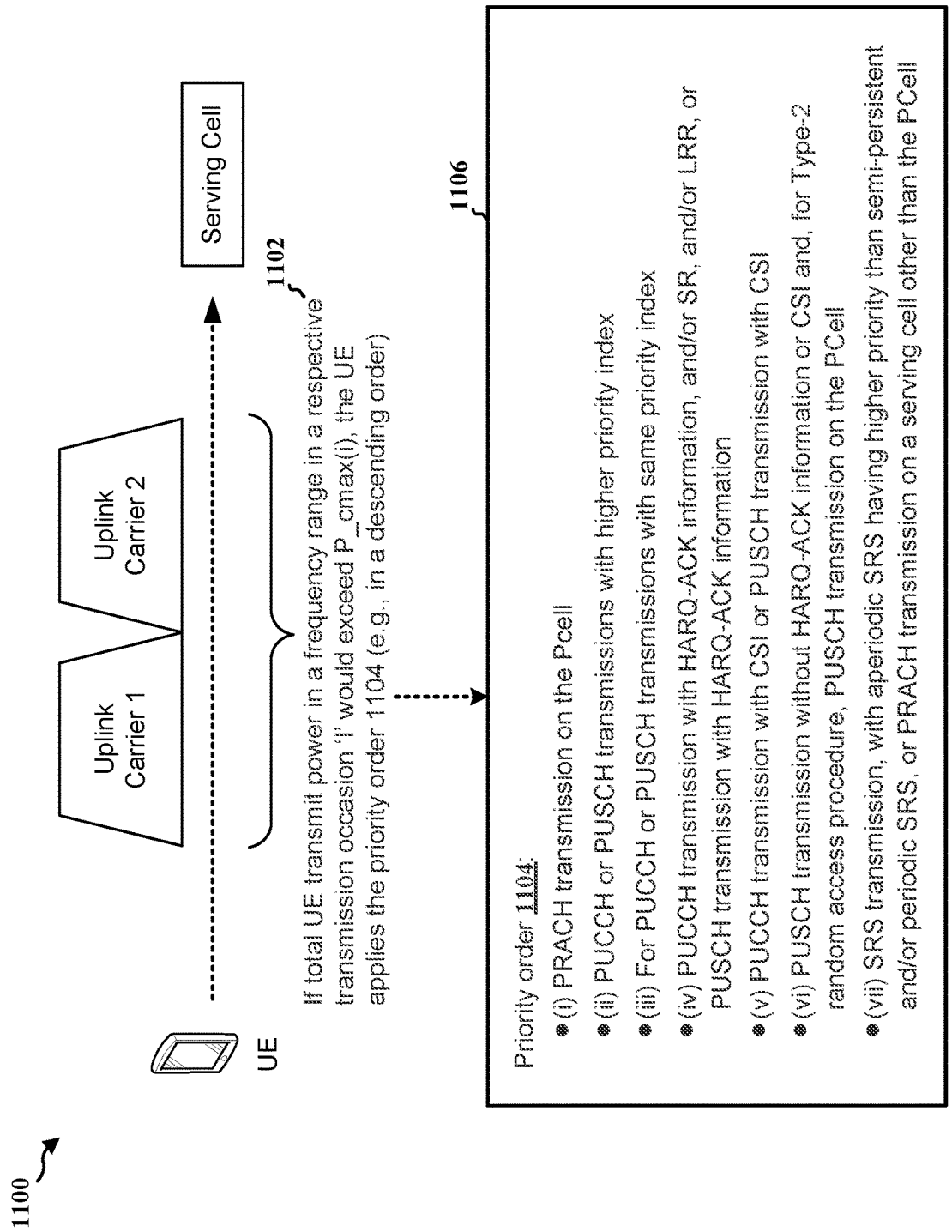
FIG. 11 is a diagram illustrating an example of prioritizations for transmission power reductions in accordance with various aspects of the present disclosure.

FIG. 11 is a diagram 1100 illustrating an example of prioritizations for transmission power reductions in accordance with various aspects of the present disclosure. A UE may be configured with two uplink carriers (e.g., uplink carrier 1 and uplink carrier 2), where the UE may use the uplink carrier(s) for transmitting PUSCH, PUCCH, PRACH, and/or SRS, etc. As shown at 1102, if a total UE transmit power in a frequency range in a respective transmission occasion 'i' would exceed a configured/defined maximum UE transmitter power (e.g., P_cmax(i)), the UE may apply a priority order 1104 to prioritize power for transmissions, such that the total UE transmit power for transmissions on serving cells in the frequency range may be smaller than or equal to the configured/defined maximum UE transmitter power for that frequency range in that transmission occasion. In one example, as shown at 1106, the priority order 1104 may indicate a power allocation priority of (i) PRACH transmission on the PCell>(ii) PUCCH or PUSCH transmissions with a higher priority index>(iii) for PUCCH or PUSCH transmissions with same priority index>(iv) PUCCH transmission with HARQ-ACK information, and/or SR, and/or LRR, or PUSCH transmission with HARQ-ACK information>(v) PUCCH transmission with CSI or PUSCH transmission with CSI>(vi) PUSCH transmission without HARQ-ACK information or CSI and, for Type-2 random access procedure, PUSCH transmission on the PCell>(vii) SRS transmission, with aperiodic SRS having higher priority than semi-persistent and/or periodic SRS, or PRACH transmission on a serving cell other than the PCell, etc., where (i) may have the highest power allocation priority and (vii) may have the lowest power allocation priority.

For example, if the first uplink carrier (e.g., uplink carrier 1) is scheduled with a PRACH transmission on a PCell and the second uplink carrier (e.g., uplink carrier 2) is scheduled with a PUCCH transmission with channel state information (CSI) in a transmission occasion, the UE may prioritize its power allocation to the first uplink carrier (e.g., the PRACH transmission) over the second uplink carrier (e.g., the PUCCH transmission) based on the priority order 1104, e.g., a PRACH transmission (e.g., as shown at (i)) may have a higher transmission priority than a PUSCH transmission with CSI at (e.g., as shown at (v)). In other words, the UE may reduce the power for transmitting the PUCCH transmission with CSI, such that the total UE transmit power does not exceed the configured/defined maximum UE transmitter power (e.g., P_cmax(i)) for that transmission occasion.

In another example, if the first uplink carrier (e.g., uplink carrier 1) is scheduled with a PUSCH transmission without CSI and the second uplink carrier (e.g., uplink carrier 2) is scheduled with a PUSCH transmission with CSI in a transmission occasion, the UE may prioritize its power allocation to the second uplink carrier over the first uplink carrier based on the priority order 1104, e.g., a PUSCH transmission with CSI (e.g., as shown at (v)) has a higher transmission priority than a PUSCH transmission without CSI at (e.g., as shown at (vi)). In other words, the UE may reduce the power for transmitting the PUCCH transmission without CSI, such that the total UE transmit power does not exceed the configured/defined maximum UE transmitter power (e.g., P_cmax(i)) for that transmission occasion.

In some examples, if the first uplink carrier and the second uplink carrier have the same transmission priority, the UE may further be configured to prioritize the transmission power for the first uplink carrier and the second uplink carrier based on whether the transmission is on a primary cell or a secondary cell, and/or based on whether the transmission includes a PUCCH or whether the uplink carrier is a non-supplementary UL carrier, etc. In other words, the UE may apply additional power prioritization rule(s). For example, in case of a same priority order and for an operation with carrier aggregation, a UE may be configured to prioritize power allocation for transmissions on a primary cell of a master cell group (MCG) (e.g., a PCell) or a secondary cell group (SCG) (e.g., a PSCell) over transmissions on a secondary cell (SCell). For example, the first uplink carrier may be scheduled to transmit a PUCCH transmission with CSI on a primary cell and the second uplink carrier may be scheduled to transmit a PUSCH transmission with CSI on a secondary cell. As a PUCCH transmission with CSI may have the same transmission power priority as a PUSCH transmission with CSI (e.g., based on (v) of the priority order 1104), the UE may prioritize its transmission power to the first uplink carrier over the second uplink carrier (e.g., transmission power is prioritized for the PUCCH transmission with CSI) as the first uplink carrier (e.g., the PUCCH transmission with CSI) is to be transmitted on a primary cell whereas the second uplink carrier (e.g., the PUSCH transmission with CSI) is to be transmitted on a secondary cell. In other words, the UE may reduce the power for transmitting the PUSCH transmission with CSI, such that the total UE transmit power does not exceed the configured/defined maximum UE transmitter power for that transmission occasion.

In another example, in case of a same priority order and for an operation with two UL carriers, a UE may prioritize power allocation for transmission on an UL carrier in which the UE is configured to transmit PUCCH. However, if PUCCH is not configured for any of the two UL carriers, the UE may prioritize power allocation for a transmission on the non-supplementary UL carrier. For example, if the first UL carrier is scheduled to transmit a PUCCH transmission with CSI and the second UL carrier is scheduled to transmit a PUSCH transmission with CSI (e.g., both transmissions have the same power allocation priority), the UE may prioritize power allocation to the first UL carrier as the first UL carrier includes a PUCCH transmission. In other words, the UE may reduce the power for transmitting the PUSCH transmission with CSI, such that the total UE transmit power does not exceed the configured/defined maximum UE transmitter power for that transmission occasion. In another example, if both UL carriers are used for transmitting PUSCH with CSI, then the UE may prioritize power allocation to a non-supplementary UL carrier among the first UL carrier and the second UL carrier.

When a UE is transmitting multiple UL carriers based on CA, a UE may set a maximum output power for a serving cell and a total maximum output power. In one example, for an uplink carrier aggregation based on intra-band contiguous CA (e.g., CCs/UL carriers are adjacent to each other in a frequency band), a UE may set its configured maximum output power $P_{CMAX,c}$ for a serving cell c and its total configured maximum output power $P_{CMAX}$. The configured maximum output power $P_{CMAX,c}$ on serving cell c may be set within the following bounds:

$P_{CMAX\_L,c} \leq P_{CMAX,c} \leq P_{CMAX\_H,c}$ with $P_{CMAX\_L,c}=\text{MIN}\{P_{EMAX,c}-\Delta T_{C,c},$
$(P_{PowerClass}-\Delta P_{PowerClass})-\text{MAX}(\text{MAX}$
$(MPR_c+\Delta MPR_c, A\text{-}MPR_c)+\Delta T_{IB,c}+\Delta$
$T_{C,c}+\Delta T_{RxSRS}, P\text{-}MPR_c)\}$, and $P_{CMAX\_H,c}=\text{MIN}\{P_{EMAX,c}, P_{PowerClass}-\Delta P_{PowerClass}\}$, where $P_{EMAX,c}$ may be a value given by a p-Max information element (IE) or a field additionalPmax of the NR-NS-PmaxList IE; $P_{PowerClass}$ may be a maximum UE power specified or predefined by a table; $\Delta P_{PowerClass}$ may depend on power class of a UE (e.g., $\Delta P_{PowerClass}=3$ dB for a power class 2 capable UE or 6 dB for a power class 1.5 UE when P-max of 23 dBm or lower is indicated, etc.); $\Delta T_{IB,c}$ may be an additional tolerance for serving cell c; $\Delta T_{C,c}$ may be a value based between 0 dB to 1.5 dB when certain condition applies for the serving cell c; $MPR_c$ may be a maximum power reduction (MPR) for the serving cell C which may be predefined based on a table; A-MPR$_c$, may be an additional maximum power reduction (A-MPR) for the serving cell C which may be predefined based on a table or a set of rules; ΔMPR$_c$ for serving cell c may be a value specified based on a table or a set of rules; ΔT$_{RxSRS}$ may be applied based on whether the UE transmits SRS and/or where the SRS is transmitted (e.g., first SRS port, second SRS port, DL carrier, etc.); P-MPR$_c$ may be a power management maximum power reduction for complying with applicable electromagnetic energy absorption specifications and/or addressing unwanted emissions, etc. In some examples, P-MPRc may be introduced in the P$_{CMAX,c}$ equation such that the UE may report to a base station an available maximum output transmit power, where the base station may use this information for scheduling decisions.

Similarly, the UE may set the total configured maximum output power P$_{CMAX}$ within P$_{CMAX\_L}$≤P$_{CMAX}$≤P$_{CMAX\_H}$. For example, for UL intra-band contiguous carrier aggregation if a same slot pattern is used in all aggregated serving cells:

$P_{CMAX\_L}$=MIN{10 log$_{10}$Σp$_{EMAX,c}$−ΔT$_C$,P$_{EMAX,CA}$, P$_{PowerClass,CA}$−MAX(MAX(MPR,A-MPR)+ΔT$_{IB,c}$+ΔT$_C$+DT$_{RxSRS}$,P-MPR$_c$)}, and $P_{CMAX\_H}$=MIN{10 log$_{10}$Σp$_{EMAX,c}$,P$_{EMAX,CA}$, P$_{PowerClass,CA}$}, where p$_{EMAX,c}$ may be a linear value of P$_{EMAX,c}$ which is given by IE P-Max for serving cell c; P$_{PowerClass,CA}$ may be a maximum UE power specified based on a table or a set of rules; MPR and A-MPR may be maximum power reduction and additional maximum power reduction, respectively, defined based on a table or a set of rules; ΔT$_{IB,c}$ may be an additional tolerance for the serving cell; P-MPR may be a power management term for the UE (e.g., there may be one power management term for the UE, denoted P-MPR, and P-MPR$_c$=P-MPR); ΔT$_C$ may be a highest value ΔT$_{C,c}$ among all serving cells c; ΔT$_{RxSRS}$ may be a highest value among all serving cells c; P$_{EMAX,CA}$ may be a value indicated by p-NR-FR1 or by p-UE-FR1 whichever is the smallest if both are present, etc.

In another example, for an UL carrier aggregation based on intra-band non-contiguous CA (e.g., at least one CC/UL carrier is separated from or is not adjacent to another CC/UL carrier in a frequency band), a UE may set its configured maximum output power P$_{CMAX,c}$ for a serving cell c and its total configured maximum output power P$_{CMAX}$. The configured maximum output power P$_{CMAX,c}$ on serving cell c may be set within the following bounds:

$P_{CMAX\_L,c}$≤$P_{CMAX,c}$≤$P_{CMAX\_H,c}$ with $P_{CMAX\_L,c}$=MIN{$P_{EMAX,c}$−ΔT$_{C,c}$, ($P_{PowerClass}$−ΔP$_{PowerClass}$)−MAX(MAX (MPR$_c$+ΔMPR$_c$,A-MPR$_c$)+ΔT$_{IB,c}$+ΔT$_{C,c}$+ΔT$_{RxSRS}$,P-MPR$_c$)}, and $P_{CMAX\_H,c}$=MIN{$P_{EMAX,c}$,$P_{PowerClass}$−ΔP$_{PowerClass}$}, where P$_{EMAX,c}$ may be a value given by a p-Max IE or a field additionalPmax of the NR-NS-PmaxList IE; P$_{PowerClass}$ may be a maximum UE power specified or predefined by a table; ΔP$_{PowerClass}$ may depend on power class of a UE (e.g., ΔP$_{PowerClass}$=3 dB for a power class 2 capable UE or 6 dB for a power class 1.5 UE when P-max of 23 dBm or lower is indicated, etc.); ΔT$_{IB,c}$ may be an additional tolerance for serving cell c; ΔT$_{C,c}$ may be a value based between 0 dB to 1.5 dB when certain condition applies for the serving cell c; MPR$_c$ may be a MPR for the serving cell c which may be predefined based on a table or a set of rules; A-MPR$_c$ may be an A-MPR for the serving cell c which may be predefined based on a table; ΔMPR$_c$ for serving cell c may be a value specified based on a table or a set of rules; ΔT$_{RxSRS}$ may be applied based on whether the UE transmits SRS and/or where the SRS is transmitted (e.g., first SRS port, second SRS port, DL carrier, etc.); P-MPR$_c$ may be a power management maximum power reduction for complying with applicable electromagnetic energy absorption specifications and/or addressing unwanted emissions, etc. In some examples, P-MPRc may be introduced in the P$_{CMAX,c}$ equation such that the UE may report to a base station an available maximum output transmit power, where the base station may use this information for scheduling decisions.

Similarly, the UE may set the total configured maximum output power P$_{CMAX}$ within P$_{CMAX\_L}$≤P$_{CMAX}$≤P$_{CMAX\_H}$. For example, for UL intra-band non-contiguous carrier aggregation if a same slot pattern is used in all aggregated serving cells:

$P_{CMAX\_L}$=MIN{10 log$_{10}$Σp$_{EMAX,c}$−ΔT$_C$,P$_{EMAX,CA}$, P$_{PowerClass,CA}$−MAX(MAX(MPR$_c$,A-MPR$_c$)+ΔT$_{IB,c}$+ΔT$_C$+ΔT$_{RxSRS}$,P-MPR$_c$)}, and $P_{CMAX\_H}$=MIN{10 log$_{10}$Σp$_{EMAX,c}$,P$_{EMAX,CA}$, P$_{PowerClass,CA}$}, where p$_{EMAX,c}$ may be a linear value of P$_{EMAX,c}$ which may be given by IE P-Max for serving cell c; P$_{PowerClass,CA}$ may be a maximum UE power specified based on a table or a set of defined rules; MPR and A-MPR may be maximum power reduction and additional maximum power reduction, respectively, defined based on a table or a set of rules; ΔT$_{IB,c}$ may be an additional tolerance for the serving cell; MPR$_c$ may be a MPR for the serving cell c which may be predefined based on a table; A-MPR$_c$ may be an A-MPR for the serving cell c which may be predefined based on a table or a set of rules; P-MPR may be a power management term for the UE (e.g., there may be one power management term for the UE, denoted P-MPR, and P-MPR$_c$=P-MPR); ΔT$_C$ may be a highest value ΔT$_{C,c}$ among all serving cells c; ΔT$_{RxSRS}$ may be a highest value among all serving cells c; P$_{EMAX,CA}$ may be a value indicated by p-NR-FR1 or by p-UE-FR1 whichever is the smallest if both are present, etc.

In one example, a power management maximum output power reduction (e.g., P-MPR$_{f,c}$) may be configured for a UE, where the UE may apply the P-MPR$_{f,c}$ for carrier f of serving cell c to ensure compliance with applicable electromagnetic power density exposure specifications, addressing unwanted emissions and/or self desense specifications in case of simultaneous transmissions on multiple RAT(s); and/or to ensure compliance with applicable electromagnetic power density exposure specifications in case of proximity detection is used to address such specifications that specify a lower maximum output power. Similarly, P-MPR$_{f,c}$ may be introduced in a P$_{CMAX,f,c}$ equation such that the UE may report to a base station an available maximum output transmit power. This information may be used by the base station for scheduling decisions.

In some examples, the UE maximum output power reduction (e.g., MPR, MPR$_c$, etc.) for intra-band contiguous CA may be based on a length of a contiguous resource block (RB) (LCRB) for transmissions in the cell and/or a lowest RB index of transmitted RBs in the cell. In other words, the intra-band contiguous UL CA MPR may be based on whether the RB allocations for the UL CA are classified as inner RB allocations or outer RB allocations. Table 1 below shows an example of allowed MPR for UE power class 3 CA and bandwidth classes B and C.

TABLE 1

Example Contiguous RB Allocation for Power Class 3

| Modulation | | MPR for bandwidth class B(dB) | | MPR for bandwidth class C(dB) | |
| --- | --- | --- | --- | --- | --- |
| | | inner | outer | inner | outer |
| DFT-s-OFDM | Pi/2 BPSK | 1.0 | 3.5 | 2.5 | 7 |
| | QPSK | 1.0 | 3.5 | 2.5 | 7 |
| | 16 QAM | 1.5 | 3.5 | 2.5 | 7 |
| | 64 QAM | 3.0 | 4.0 | 5 | 7 |
| | 256 QAM | 5.5 | 6.0 | 7 | 7.5 |
| CP-OFDM | QPSK | 2.0 | 4.0 | 3.5 | 8 |
| | 16 QAM | 2.5 | 4.0 | 3.5 | 8 |
| | 64 QAM | 3.5 | 4.0 | 5 | 8 |
| | 256 QAM | 6.5 | 6.5 | 7 | 8 |

In one example, for CA bandwidth class B and bandwidth class C with contiguous RB allocation, the following parameters may be defined to specify RB allocation ranges for inner and outer RB allocations (e.g., to determine whether an RB allocation is an inner RB allocation or an outer RB allocation). An RB allocation may be contiguous if $L_{CRB1}=0$ or $L_{CRB2}=0$ or ($L_{CRB1}\neq 0$ and $L_{CRB2}\neq 0$ and $RB_{Start1}+L_{CRB1}=N_{RB1}$ and $RB_{Start2}=0$), where $RB_{Start1}$, $L_{CRB1}$, and $N_{RB1}$ may be for a first component carrier (CC1), $RB_{start2}$, $L_{CRB2}$, and $N_{RB2}$ may be for a second component carrier (CC2), and CC1 may be the component carrier with lower frequency. In contiguous CA, a contiguous allocation may be an inner allocation if:

$$RB_{Start,Low} \leq RB_{Start\_CA} \leq RB_{Start,High}, \text{ and } N_{RB\_alloc} \leq \text{Cell}(N_{RB,agg}/2),$$

where $$RB_{Start,Low}=\max(1,\text{floor}(N_{RB\_alloc}/2))$$

$$RB_{Start,High}=N_{RB,agg}-RB_{Start,Low}-N_{RB,alloc},$$

with $$N_{RB\_alloc}=L_{CRB1}\cdot 2^{\mu_1}+L_{CRB2}\cdot 2^{\mu_2}$$

$$N_{RB\_alloc}=(N_{RB1}-RB_{Start1})\cdot 2^{\mu_1}+(RB_{Start2}+L_{CRB2})\cdot 2^{\mu_2},$$

$$N_{RB,agg}=N_{RB1}\cdot 2^{\mu_1}+N_{RB2}\cdot 2^{\mu_2}.$$

If $L_{CRB1}=0$, $RB_{Start\_CA}=N_{RB1}\cdot 2^{\mu_1}+RB_{Start2}\cdot 2^{\mu_2}$, if $L_{CRB1}>0$, $RB_{Start\_CA}=RB_{Start1}\cdot 2^{\mu_1}$.

A contiguous allocation that is not an inner contiguous allocation may be an outer contiguous allocation.

Figure 12:
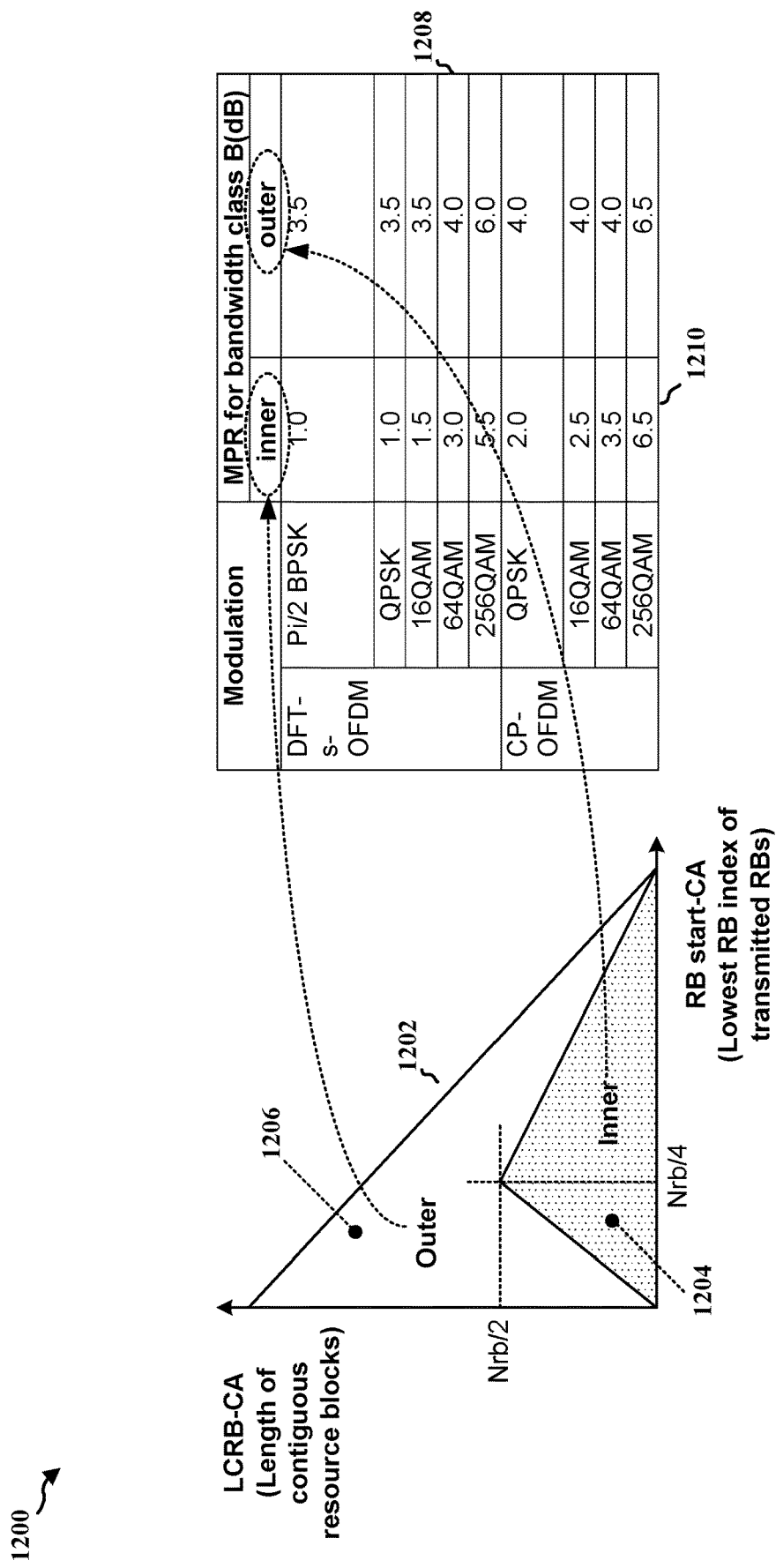
FIG. 12 is a diagram illustrating an example of determining whether a contiguous allocation is an inner allocation or an outer allocation in accordance with various aspects of the present disclosure.

FIG. 12 is a diagram 1200 illustrating an example of determining whether a contiguous allocation is an inner allocation or an outer allocation in accordance with various aspects of the present disclosure. As shown at 1202, whether a contiguous RB allocation is an inner RB allocation or an outer RB allocation may depend on the length of contiguous resource blocks (e.g., an LCRB value) and the lowest RB index of transmitted RBs (e.g., an RB start value) associated with the contiguous RB allocation. For example, as shown at 1204, if a contiguous RB allocation has an LCRB value and an RB start value that fall within the inner RB allocation region as defined by the above equations, the contiguous RB allocation may be consider as an inner RB allocation. In another example, as shown at 1206, if a contiguous RB allocation has an LCRB value and an RB start value that fall within the outer RB allocation region, the contiguous RB allocation may be consider as an outer RB allocation. Then, based on the determination that the contiguous RB allocation is an inner RB allocation or an outer RB allocation, an MPR in which a UE may apply may further be determined based on the bandwidth class, the modulation, and/or the UE power class. For example, as shown at 1208 of FIG. 12 and based on Table 1 above, if a UE is associated with a UE power class 3 CA and bandwidth class B and the modulation for a transmission is based on direct Fourier transform spread OFDM (DFT-s-OFDM) 64 quadrature amplitude modulation (QAM) and the RB allocation for the transmission is classified as an outer RB allocation, the MPR in which the UE may apply for the current transmission may be 4.0 dB. In another example, as shown at 1210 of FIG. 12 and based on Table 1 above, if a UE is associated with a UE power class 3 CA and bandwidth class B and the modulation for a transmission is based on cyclic prefix-OFDM (CP-OFDM) 256 QAM and the RB allocation for the transmission is classified as an inner RB allocation, the MPR in which the UE may apply for the transmission may be 6.5 dB.

In some examples, an MPR value may be independent of a UE declaring a two-amplifier (2PA) architecture (e.g., the UE is capable of using two power amplifiers for transmission). As such, as shown by Table 1, the bandwidth class C may include higher MPR values compared to bandwidth class B to allow the UE to declare 2PA and overcome excessive reverse intermodulation distortion (MMD) effect (e.g., MMD may occur when signals from one transmitter couple to the output ports of nearby transmissions and vice-versa). In some examples, inner MPR (e.g., an MPR value based on an inner RB allocation) may be dominated by error vector magnitude (EVM), and the outer MPR (e.g., an MPR value based on an outer RB allocation) may be dominated by spectral emissions mask (SEM) and adjacent channel leakage ratio (ACLR). In addition, the RB start and LCRB positions (e.g., as shown at 1204 and 1206) may be a function of RB start of both CCs (e.g., both UL carriers) and the associated subcarrier spacing (SCS), and µ may be an index that is a function of the SCS.

Figure 13:
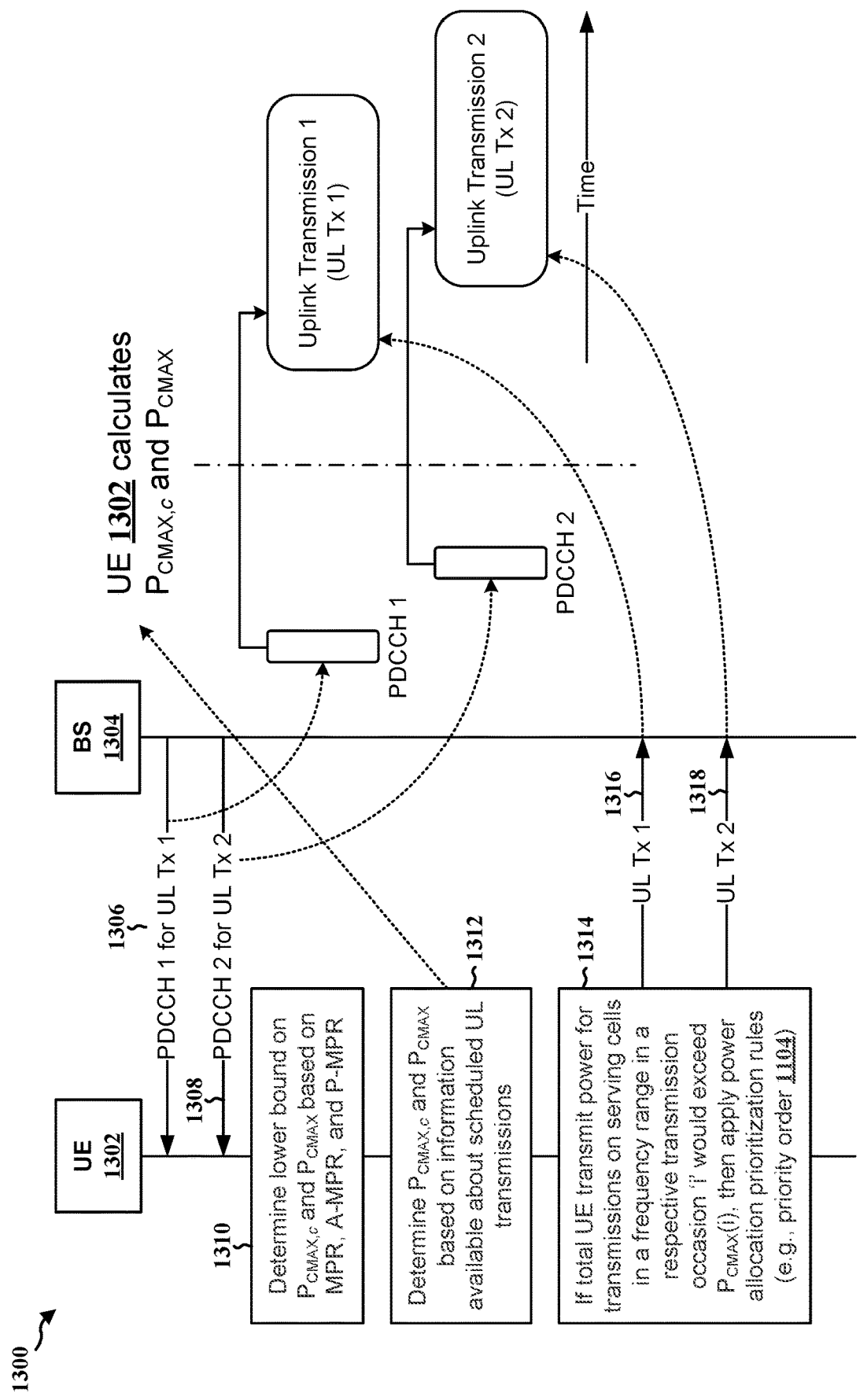
FIG. 13 is a communication flow illustrating an example overall procedure of a UE determining whether to apply power allocation prioritization rules for multiple transmissions in accordance with various aspects of the present disclosure.

FIG. 13 is a communication flow 1300 illustrating an example overall procedure of a UE determining whether to apply power allocation prioritization rules for multiple transmissions (e.g., UL transmissions) in accordance with various aspects of the present disclosure. The numberings associated with the communication flow 1300 do not specify a particular temporal order and are merely used as references for the communication flow 1300.

As shown at 1306 and 1308, a UE 1302 may receive a first PDCCH (PDCCH 1) and a second PDCCH (PDCCH 2) from a base station 1304 that schedule a first UL transmission (UL Tx 1) and a second UL transmission (UL Tx 2), respectively. In some examples, the UE 1302 may receive different PDCCHs on different cells, such as on a primary cell and on one or more secondary cells. For example, the UE 1302 may receive the first PDCCH on a primary cell, and the UE 1302 may receive the second PDCCH on a secondary cell, etc.

At 1310, the UE 1302 may determine a lower bound on $P_{CMAX,c}$ (e.g., a maximum UE output power for serving cell c) and $P_{CMAX}$ (e.g., a maximum UE output power) based on MPR, A-MPR, and P-MPR. In other words, the UE may determine $P_{CMAX\_L,c}$ and $P_{CMAX\_L}$ based on:

$$P_{CMAX\_L}=\text{MIN}\{10\log_{10}\Sigma p_{EMAX,c}-\Delta T_C p_{EMAX,CA},$$
$$P_{PowerClass,CA}-\text{MAX}(\text{MAX}(\text{MPR},A\text{-MPR})+\Delta T_{IB,c}+\Delta T_C+DT_{RxSRS}, P\text{-MPR}_c)\}, \text{ and}$$

$$P_{CMAX\_L,c} = \text{MIN}\{P_{EMAX,c} - \Delta T_{C,c}, (P_{PowerClass} - \Delta P_{PowerClass}) - \text{MAX}(\text{MAX}(MPR_c, A\text{-}MPR_c) + \Delta TIB, c + \Delta TC, c + \Delta TRxSRS, P\text{-}MPR_c)\}.$$

At 1312, the UE 1302 may determine values for $P_{CMAX,c}$ and $P_{CMAX}$ based at least in part on information available about the first UL transmission and the second UL transmission and/or based on a set of pre-configured rules. In other words, the UE may set its configured maximum output power $P_{CMAX,c}$ for a serving cell c and its total configured maximum output power $P_{CMAX}$ based on $P_{CMAX\_L,c} \leq P_{CMAX,c} \leq P_{CMAX\_H,c}$ and $P_{CMAX\_L} \leq P_{CMAX} \leq P_{CMAX\_H}$ where $P_{CMAX\_H,c} = \text{MIN}\{P_{EMAX,c}, P_{PowerClass} - \Delta P_{PowerClass}\}$ and $P_{CMAX\_H} = \text{MIN}\{10 \log_{10} \Sigma p_{EMAX,c}, P_{EMAX,CA}, P_{PowerClass,CA}\}$.

At 1314, after the UE 1302 determines values for $P_{CMAX,c}$ and $P_{CMAX}$, if the total UE transmit power for transmissions on serving cells in a frequency range in a respective transmission occasion 'i' would exceed $P_{CMAX}(i)$, the UE 1302 may apply power allocation prioritization rules to the first UL transmission and the second UL transmission, such as described in connection with FIG. 11 (e.g., the UE may apply the priority order 1104).

At 1316 and 1318, if the UE 1302 applies the power allocation prioritization rules, the UE 1302 may transmit the first UL transmission and the second UL transmission based on the power allocation prioritization rules, such as described in connection with FIG. 11. For example, the transmission power for at least one of the first UL transmission and the second UL transmission may be reduced. On the other hand, if the total UE transmit power for transmissions on serving cells in a frequency range in a respective transmission occasion 'i' would not exceed $P_{CMAX}(i)$, then the UE 1302 may transmit the first UL transmission and the second UL transmission without applying power allocation prioritization rules (e.g., the transmission power for both the first UL transmission and the second UL transmission may not be reduced). Similarly, while the communication flow 1300 shows the UE 1302 transmits the first UL transmission and the second UL transmission to the base station 1304, the UE 1302 may also transmit different UL transmissions to different TRPs of the base station 1304. For example, the UE 1302 may transmit the first UL transmission to a first TRP of the base station 1304 (e.g., the TRP that transmits the first PDCCH), and the UE 1302 may transmit the second UL transmission to a second TRP of the base station 1304 (e.g., the TRP that transmits the second PDCCH), etc. In another example, the UE 1302 may transmit different UL transmissions on different cells, such as on a primary cell and on one or more secondary cells. For example, the UE 1302 may transmit the first UL transmission on a primary cell, and the UE 1302 may transmit the second UL transmission on a secondary cell, etc.

Aspects presented herein may improve wireless communication for FD devices or FD capable devices (e.g., UEs operating under an FD mode) by enabling full-duplex devices to apply power reduction(s) for FD operations. Aspects presented herein may enable FD devices to determine whether to apply an MPR that is specific to FD transmissions (e.g., when an UL transmission and a downlink transmission is at least partially overlapped in time) and/or whether to apply power allocation prioritization rules to transmissions (e.g., UL transmissions and/or SL transmissions) of FD transmissions, etc.

In one aspect of the present disclosure, an MPR specific to an FD mode/operation (e.g., FD-MPR, FD-MPR$_c$, etc.) may be defined for a UE, where the MPR specific to the FD mode/operation (hereafter may refer to as an "FD specific MPR") may be a value or a set of values that takes into account power reduction specified in FD operations in adjacent cells. For example, if a UE (e.g., an FD capable UE, an FD UE, etc.) is scheduled with multiple UL transmissions and at least one DL reception that are at least partially overlapped in time, the UE may apply an FD specific MPR to at least one of the UL transmissions to reduce an interference or a potential interference an UL transmission may cause to the at least one DL reception.

Figure 14:
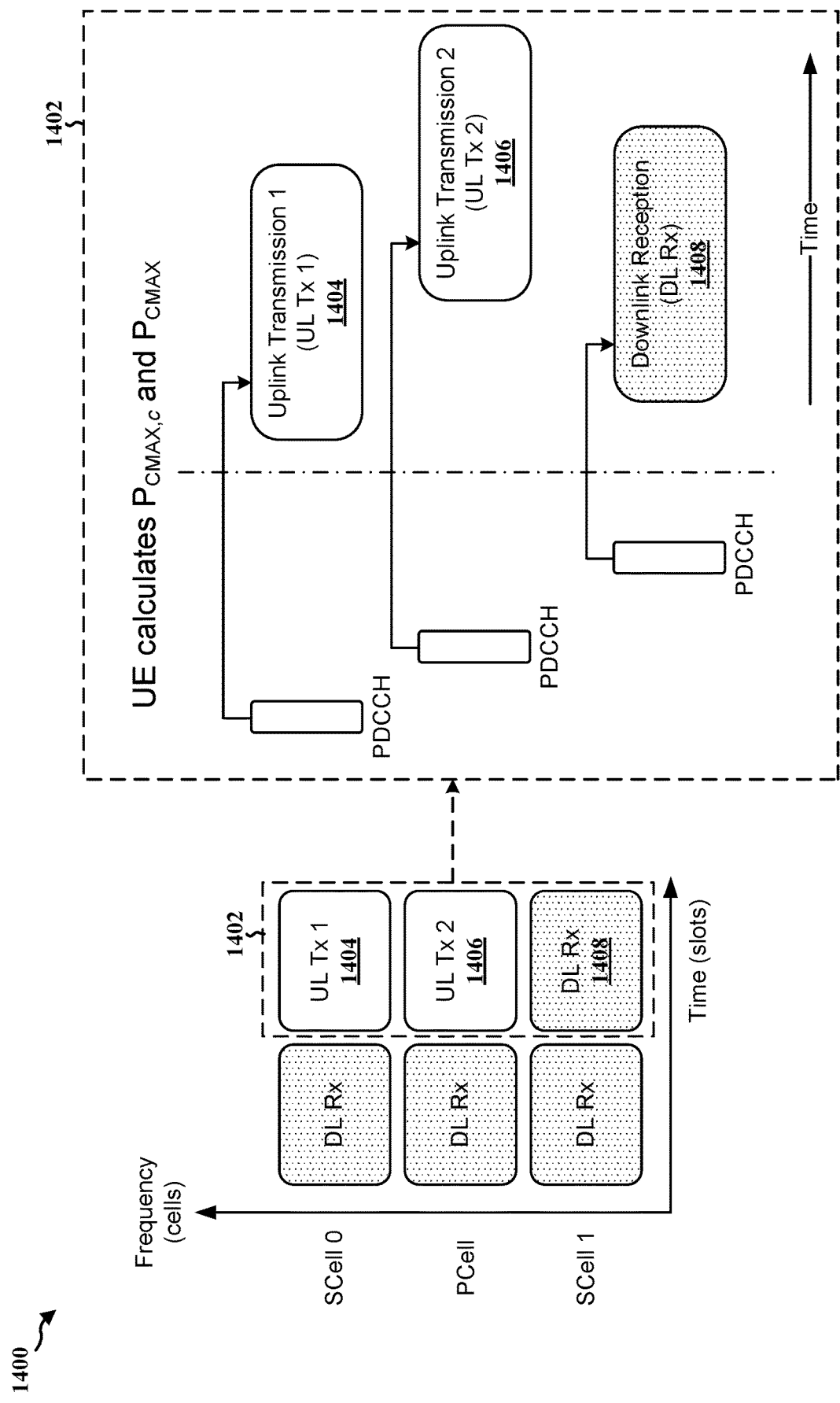
FIG. 14 is a diagram illustrating an example of applying a full duplex (FD) specific maximum power reduction (MPR) for an FD operation in accordance with various aspects of the present disclosure.

FIG. 14 is a diagram 1400 illustrating an example of applying an FD specific MPR for an FD operation in accordance with various aspects of the present disclosure. As shown at 1402, a UE may be scheduled to transmit a first UL transmission 1404 on a first secondary cell (SCell 0) and a second UL transmission 1406 on a primary cell (PCell), and the UE may also be scheduled to receive a DL reception 1408 on a second secondary cell (SCell 1), where the transmission of the first UL transmission 1404 and the second UL transmission 1406 and the reception of the DL reception 1408 may be concurrent (e.g., simultaneous) or at least partially overlapped in time, such as described in connection with FIGS. 8A and 8B. In one example, as the second UL transmission 1406 may be closer to the DL reception 1408 in terms of frequency compared to the first UL transmission 1404, the UE may be configured to apply an FD specific MPR to the second UL transmission 1406 to avoid or to reduce the likelihood of the second UL transmission 1406 causing interference to the DL reception 1408. In one example, the FD specific MPR may be defined per-cell (e.g., FD-MPR$_c$), and the FD specific MPR (e.g., the value of the MPR) may take into account whether the corresponding UL transmission is associated with an inner RB allocation or an outer RB allocation, such as described in connection with FIG. 12.

In one aspect, a UE may be configured to apply an FD specific MPR (e.g., FD-MPR, FD-MPR$_c$, etc.) in an FD mode/operation regardless whether a DL grant is received or not. For example, as a UE in an FD mode (e.g., FD configuration is active) may or may not receive a DL grant (e.g., an FD slot may include UL scheduling without DL scheduling), if the UE is scheduled with one or more UL transmissions but is not scheduled with at least one DL reception (e.g., there is no DL grant/scheduling), the UE may still apply an FD specific MPR to at least one UL transmission. In some scenarios, as shown at 1402 of FIG. 14, a UE may receive UL grants and/or DL grants (e.g., PDCCHs) at different times. Thus, a UE in an FD mode may not know whether a DL grant will be scheduled currently with at least an UL grant. For example, as shown at 1402, a UE may receive two PDCCHs that schedules the first UL transmission 1404 and the second UL transmission 1406 before receiving the PDCCH that schedules the DL reception 1408. As such, an advantage of enabling a UE to apply an FD specific MPR regardless whether there is a DL grant during an FD mode is that the UE may be able to determine whether to apply MPR to at least one of the UL transmissions before receiving a DL grant or before confirming there is a DL grant. Alternatively, a UE may be configured to apply an FD specific MPR (e.g., FD-MPR, FD-MPR$_c$, etc.) in an FD mode/operation if there is at least one DL grant (e.g., there is at least one DL reception that overlaps with an UL transmission), otherwise the UE may not apply the FD specific MPR or may skip applying the FD specific MPR. For example, referring back to 1402 of FIG. 14, if an FD operation includes at least one DL reception (e.g., the DL reception 1408), the UE may apply an FD specific MPR.

However, if there is no DL reception scheduled, then the UE may not apply an FD specific MPR.

Figure 15:
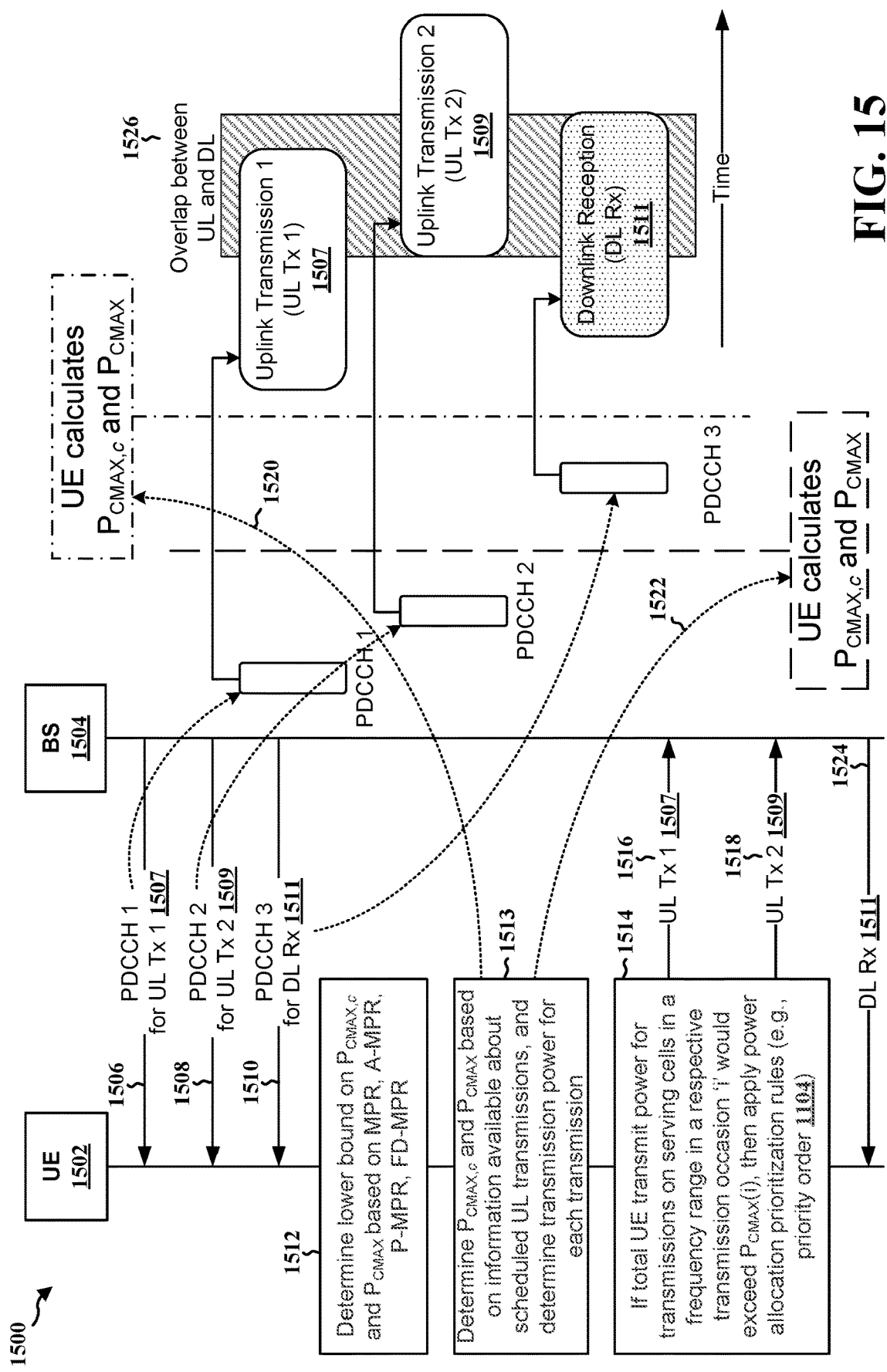
FIG. 15 is a communication flow illustrating an example of a UE in an FD mode determining whether to apply power allocation prioritization rules for multiple transmissions taking into account self-interference in accordance with various aspects of the present disclosure.

FIG. 15 is a communication flow 1500 illustrating an example of a UE in an FD mode determining whether to apply power allocation prioritization rules for multiple transmissions (e.g., UL transmissions) taking into account self-interference in accordance with various aspects of the present disclosure. The numberings associated with the communication flow 1500 do not specify a particular temporal order and are merely used as references for the communication flow 1500.

As shown at 1506, 1508, and 1510, a UE 1502 may receive a first PDCCH (PDCCH 1), a second PDCCH (PDCCH 2), and a third PDCCH (PDCCH 3) from a base station 1504 that schedule a first UL transmission 1507 (UL Tx 1), a second UL transmission 1509 (UL Tx 2), and a DL reception 1511, respectively. While the communication flow 1500 shows three PDCCHs are received from the base station 1504 for scheduling the first UL transmission 1507, the second UL transmission 1509, and the DL reception 1511, in some examples, a same PDCCH may be used for scheduling the first UL transmission 1507, the second UL transmission 1509, and/or the DL reception 1511 (e.g., PDCCH 1, PDCCH 2 and/or PDCCH 3 may be the same PDCCH). In some examples, the UE 1502 may receive different PDCCHs on different cells, such as on a primary cell and on one or more secondary cells. For example, the UE 1502 may receive the first PDCCH on a primary cell, receive the second PDCCH on a first secondary cell (e.g., SCell 0), and receive the third PDCCH on a second secondary cell (e.g., SCell 1), etc.

At 1512, the UE 1502 may determine a lower bound on $P_{CMAX,c}$ (e.g., a maximum UE output power for serving cell c) and $P_{CMAX}$ (e.g., a maximum UE output power) based on MPR, A-MPR, P-MPR, and FD-MPR. In other words, the UE may determine $P_{CMAX\_L,c}$ and $P_{CMAX\_L}$ based on:

$P_{CMAX\_L} = \text{MIN}\{10 \log_{10} \Sigma p_{EMAX,c} - \Delta T_C, P_{EMAX,CA},$
$P_{PowerClass,CA} - \text{MAX}(\text{MAX}(MPR, A-MPR, FD-MPR) + \Delta T_{IB,c} + \Delta T_C + DT_{RxSRS}, P-MPR_c)\}$, and $P_{CMAX\_L,c} = \text{MIN}\{P_{EMAX,c} - \Delta T_{C,c}, (P_{PowerClass} - \Delta P_{PowerClass}) - \text{MAX}(\text{MAX}(MPR_c, A-MPR_c, FD-MPR_c) + \Delta TIB,c + \Delta TC, c + \Delta TRxSRS, P-MPR_c)\}$.

In some examples, as described in connection with FIG. 14, whether the UE 1502 is to include FD specific MPR (e.g., FD-MPR and/or FD-MPR$_c$) when the UE 1502 is determining the lower bounds for $P_{CMAX,c}$ and $P_{CMAX}$ may depend on whether there is at least one DL grant (e.g., the DL reception 1511). For example, the UE 1502 may be configured to apply the FD specific MPR to one or more UL transmissions regardless whether there is at least one DL grant, or the UE 1502 may be configured to apply the FD specific MPR to one or more UL transmissions if there is at least one DL grant, etc.

At 1513, the UE 1502 may determine values for $P_{CMAX,c}$ and $P_{CMAX}$ based at least in part on information available about the first UL transmission 1507, the second UL transmission 1509, the DL reception 1511, and/or based on a set of pre-configured rules. In other words, the UE may set its configured maximum output power $P_{CMAX,c}$ for a serving cell c and its total configured maximum output power $P_{CMAX}$ based on $P_{CMAX\_L,c} \leq P_{CMAX,c} \leq P_{CMAX\_H,c}$ and $P_{CMAX\_L} \leq P_{CMAX} \leq P_{CMAX\_H}$ where $P_{CMAX\_H,c} = \text{MIN}\{P_{EMAX,c}, P_{Powerclass} - \Delta P_{PowerClass}\}$ and $P_{CMAX\_H} = \text{MIN}\{10 \log_{10} \Sigma p_{EMAX,c}, P_{EMAX,CA}, P_{PowerClass,CA}\}$. The UE 1502 may also and determine transmission power for each transmission (e.g., for each of the UL transmissions). In some examples, as shown at 1520, the UE 1502 may determine the values for $P_{CMAX,c}$ and $P_{CMAX}$ after receiving scheduling for the first UL transmission 1507, the second UL transmission 1509, and the DL reception 1511 (e.g., after receiving the first PDCCH, the second PDCCH, and the third PDCCH). In other examples, as shown at 1522, the UE 1502 may determine the values for $P_{CMAX,c}$ and $P_{CMAX}$ after receiving scheduling for the first UL transmission 1507 and the second UL transmission 1509 but prior to receiving scheduling for the DL reception 1511 (e.g., after receiving the first PDCCH and second PDCCH but before receiving the third PDCCH).

In some examples, the UE 1502 may determine values for $P_{CMAX,c}$ and $P_{CMAX}$ based at least in part on its ability to cancel self-interference and/or one or more self-interference threshold specifications, etc. For example, the UE 1502 may determine $P_{CMAX,c}$ weights based on how much interference may be caused to the DL reception, the UE 1502's ability to cancel self-interference, and/or self-interference threshold specifications (e.g., configured or defined for the UE 1502). Then, the UE 1502 may determine for each cell $P_{CMAX,c}$ based on the determined weights.

At 1514, after the UE 1502 determines values for $P_{CMAX,c}$ and $P_{CMAX}$, if the total UE transmit power for transmissions on serving cells in a frequency range in a respective transmission occasion 'i' would exceed $P_{CMAX}$(i), the UE 1502 may apply power allocation prioritization rules to the first UL transmission 1507 and the second UL transmission 1509, such as described in connection with FIG. 11 (e.g., the UE may apply the priority order 1104). For example, if a determined transmission power on a first cell (e.g., for transmitting the first UL transmission 1507) plus a determined transmission power on a second cell (e.g., for transmitting the second UL transmission 1509) exceeds the determined $P_{CMAX}$, then the UE may apply power allocation prioritization rules, where the power allocation prioritization rules may indicate a power allocation priority of (i) PRACH transmission on the PCell>(ii) PUCCH or PUSCH transmissions with a higher priority index>(iii) for PUCCH or PUSCH transmissions with same priority index>(iv) PUCCH transmission with HARQ-ACK information, and/or SR, and/or LRR, or PUSCH transmission with HARQ-ACK information>(v) PUCCH transmission with CSI or PUSCH transmission with CSI>(vi) PUSCH transmission without HARQ-ACK information or CSI and, for Type-2 random access procedure, PUSCH transmission on the PCell>(vii) SRS transmission, with aperiodic SRS having higher priority than semi-persistent and/or periodic SRS, or PRACH transmission on a serving cell other than the PCell, etc. (e.g., (i) may have the highest power allocation priority and (vii) may have the lowest power allocation priority).

At 1516 and 1518, if the UE 1502 applies the power allocation prioritization rules to the first UL transmission 1507 and the second UL transmission 1509, the UE 1502 may transmit the first UL transmission 1507 and the second UL transmission 1509 based on the power allocation prioritization rules, such as described in connection with FIG. 11. For example, the transmission power for at least one of the first UL transmission 1507 and the second UL transmission 1509 may be reduced. On the other hand, if the total UE transmit power for transmissions on serving cells in a frequency range in a respective transmission occasion 'i' would not exceed $P_{CMAX}$(i), then the UE 1502 may transmit the first UL transmission 1507 and the second UL transmission 1509 without applying power allocation prioritization rules (e.g., the transmission power for both the first UL transmission 1507 and the second UL transmission 1509 may not be reduced). Similarly, while the communication flow 1500 shows the UE 1502 transmits the first UL transmission 1507 and the second UL transmission 1509 to the base station 1504, the UE 1502 may also transmit different UL transmissions to different TRPs of the base station 1504. For example, the UE 1502 may transmit the first UL transmission 1507 to a first TRP of the base station 1504 (e.g., the TRP that transmits the first PDCCH), and the UE 1502 may transmit the second UL transmission 1509 to a second TRP of the base station 1504 (e.g., the TRP that transmits the second PDCCH), etc. In another example, the UE 1502 may transmit different UL transmissions on different cells, such as on a primary cell and on one or more secondary cells. For example, the UE 1502 may transmit the first UL transmission 1507 on a primary cell, and the UE 1502 may transmit the second UL transmission 1509 on a secondary cell, etc.

At 1524, the UE 1502 may receive the DL reception 1511 from the base station 1504 (or a TRP of the base station), where the DL reception 1511 may overlap with at least one of the first UL transmission 1507 or the second UL transmission 1509 at least partially in time, such as shown at 1526. For example, the UE 1502 may transmit the first UL transmission 1507 and the second UL transmission 1509 and receive the DL reception 1511 in an FD slot.

In another aspect of the present disclosure, for intra-band CA, if after the UE 1502 applies the power allocation prioritization rules for multiple UL transmissions (e.g., at 1514) and at least two UL transmissions have a same priority order (e.g., the first UL transmission 1507 and the second UL transmission 1509 have a same power allocation priority), the UE 1502 may further apply an additional power prioritization rule to the UL transmissions having the same priority.

Figure 16:
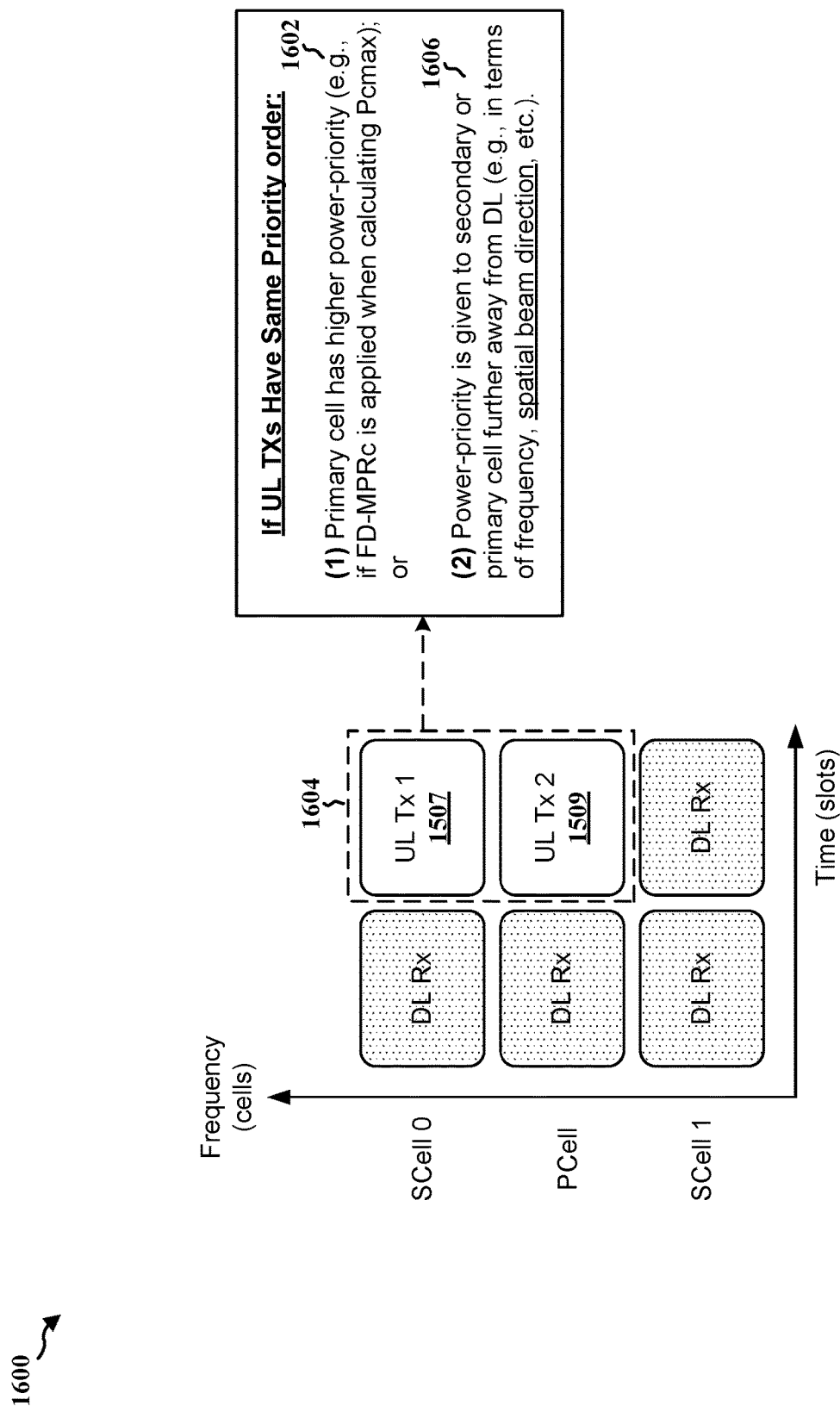
FIG. 16 is a diagram illustrating an example of an intra-band carrier aggregation (CA) power prioritization in an FD mode in which a UE may apply if multiple uplink (UL) transmissions have a same power allocation priority in accordance with various aspects of the present disclosure.

FIG. 16 is a diagram 1600 illustrating an example of an intra-band CA power prioritization in an FD mode in which a UE may apply if multiple UL transmissions have a same power allocation priority in accordance with various aspects of the present disclosure. In one example, as shown at 1602, if multiple UL transmissions have a same power allocation priority, a UE may give a higher power allocation priority to a primary cell. In other words, an UL transmission on a primary cell may be given a power allocation priority over an UL transmission on a secondary cell. For example, as shown at 1604, as the first UL transmission 1507 is transmitted on a secondary cell (e.g., SCell 0) and the second UL transmission 1509 is transmitted on a primary cell (e.g., PCell), the UE 1502 may give a higher power allocation priority to the second UL transmission 1509. In some examples, the UE 1502 may be configured to apply such configuration (e.g., the rule shown at 1602) if an FD specific MPR is applied when the UE 1502 is calculating $P_{CMAX}$ and/or $P_{CMAX,c}$ (e.g., an FD specific MPR is taken into consideration when the UE 1502 determines the values for $P_{CMAX}$ and/or $P_{CMAX,c}$). If an FD specific MPR is not applied when the UE 1502 is calculating $P_{CMAX}$ and/or $P_{CMAX,c}$, then the UE 1502 may not apply such configuration.

In another example, as shown at 1606, if multiple UL transmissions have a same power allocation priority, a UE may give a higher power allocation priority to a primary cell or a second cell based on which cell may cause less interference to the DL reception. In other words, the power priority may be given to a cell that is further away from the DL reception, such as in terms of frequency and/or spatial beam direction, etc. For example, as shown at 1604, as the second UL transmission 1509 is closer to the DL reception in terms of frequency compared to the first UL transmission 1507, the UE 1502 may give a higher power allocation priority to the first UL transmission 1507 (e.g., to SCell 0), and the transmission power for the second UL transmission 1509 may be reduced. In other words, the UE 1502 may give a higher power allocation priority to an UL transmission that causes less self-interference compared to other UL transmission(s), even though the UL transmission may not be on a primary cell. In some examples, the UE 1502 may be configured to apply such configuration (e.g., the rule shown at 1606) if an FD specific MPR is not applied to the primary cell when the UE 1502 is calculating $P_{CMAX}$ and/or $P_{CMAX,c}$ (e.g., FD specific MPR is not taken into consideration when the UE 1502 determines the values for $P_{CMAX}$ and/or $P_{CMAX,c}$ for the primary cell). Otherwise if an FD specific MPR is applied to the primary cell when the UE 1502 is calculating $P_{CMAX}$ and/or $P_{CMAX,c}$, then the UE 1502 may apply such configuration. In other words, if the UE 1502 applies FD specific MPR to the primary cell, then the UE 1502 may apply the rule indicated at 1602, and if the UE 1502 does not apply FD specific MPR to the primary cell, then the UE 1502 may apply the rule indicated at 1606, etc.

In another aspect of the present disclosure, when a UE simultaneously transmits multiple UL transmissions and receives at least one DL reception (e.g., the UL transmissions are at least partially overlapped with the DL reception in time) in a CC, the UE may determine an power allocation priority for the multiple UL transmissions based at least in part on a priority associate with the at least one DL transmission if an UL-DL-prioritization rule (e.g., a transmission or communication priority rule that is different from the power allocation priority rule) is configured for the UL and DL transmissions. For example, an UL transmission may be configured with a higher communication priority over a DL reception, such that a UE may prioritize the transmission of the UL transmission over the DL reception.

Figure 17:
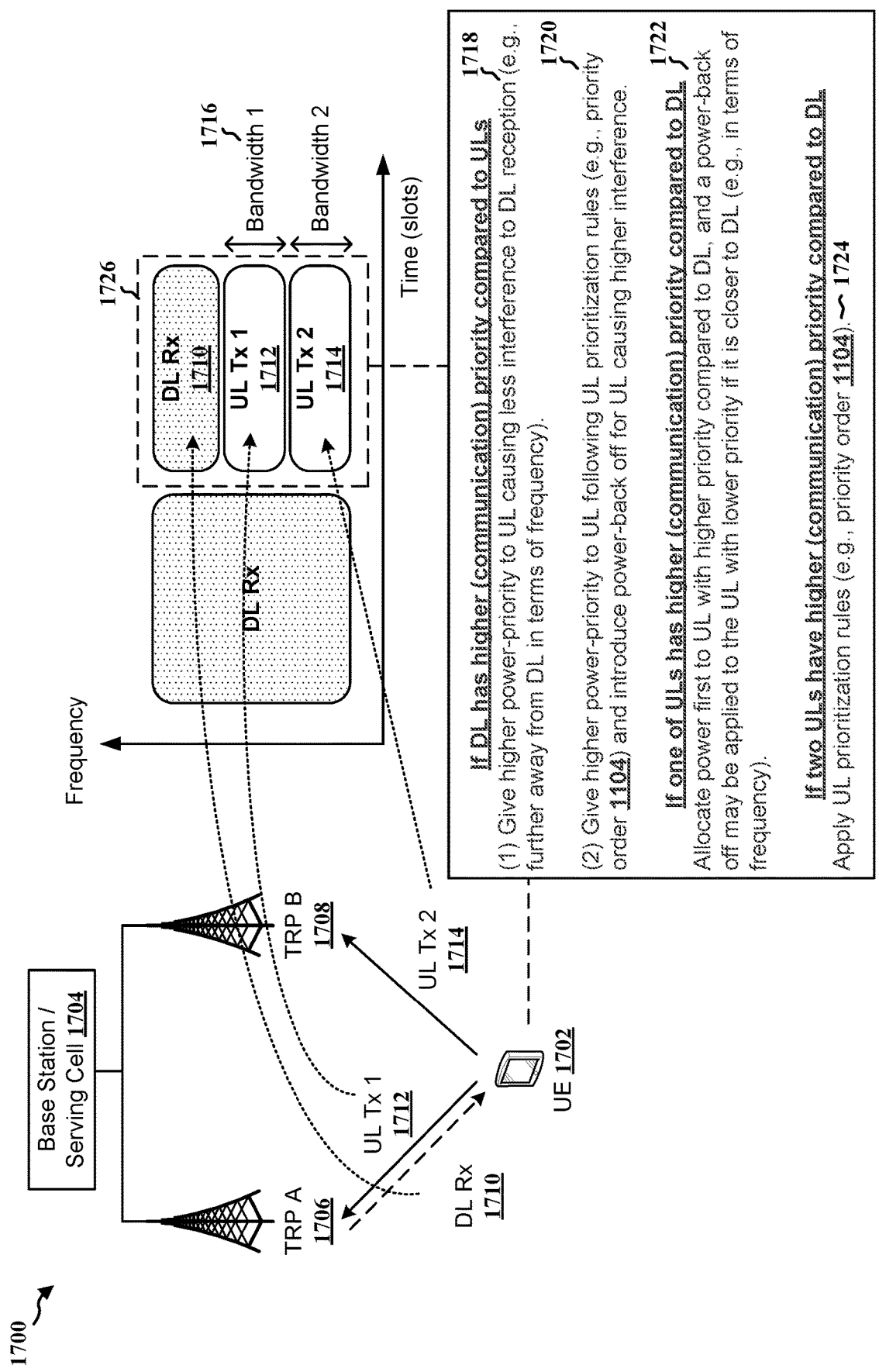
FIG. 17 is a diagram illustrating an example of applying prioritization to multiple UL transmissions in a component carrier (CC) based at least in part on a priority associated with a concurrent downlink (DL) transmission in the CC in accordance with various aspects of the present disclosure.

FIG. 17 is a diagram 1700 illustrating an example of applying a power allocation prioritization to multiple UL transmissions in a CC based at least in part on an UL-DL-priority associated with a concurrent DL transmission in the CC in accordance with various aspects of the present disclosure. A UE 1702 (e.g., the UE 1502), which may be an FD UE with multiple antenna panels, may be communicating with a base station 1704 (e.g., the base station 1504) via a first TRP 1706 (TRP A) and a second TRP 1708 (TRP B) of the base station 1704, such as described in connection with FIGS. 10A, 10B, and 15. In one example, as described in connection with 1506, 1508, and/or 1510 of FIG. 15, the UE 1702 may receive one or more PDCCHs from the base station 1704 that schedule a DL reception 1710 from the first TRP 1706, a first UL transmission 1712 to the first TRP 1706, and a second UL transmission 1714 to the second TRP 1708. As shown at 1716, the UE 1702 may transmit the first UL transmission 1712 and the second UL transmission 1714 using different frequency bandwidths. In other words, the UE 1702 may transmit the first UL transmission 1712 and the second UL transmission 1714 based on frequency-division multiplexing (FDM).

In one example, if UL-DL-prioritization rules are configured or defined for UL transmissions and DL transmissions in a CC and if a DL transmission has a higher priority compared to an UL transmission, as shown at 1718, the UE 1702 may be configured to give a higher power-priority to an UL causing less interference to DL reception (e.g., an UL that is further away from DL), such as described in connection with 1606 of FIG. 16. In other words, the power allocation priority may be given to the UL transmission that is further away from the DL reception in terms of frequency. For example, as shown at 1726, as the first UL transmission 1712 is closer to the DL reception 1710 in terms of frequency compared to the second UL transmission 1714, the UE 1702 may give a higher power allocation priority to the second UL transmission 1714 (e.g., to the second TRP 1708). In another example, as shown at 1720, the UE 1702 may give a higher power-priority to an UL transmission based on UL prioritization rules (e.g., the priority order 1104), and then the UE 1702 may introduce or apply power-backoff for the UL transmission that causes higher interference (e.g., is closer to DL reception). For example, after applying UL prioritization rules (e.g., the priority order 1104) to the first UL transmission 1712 and the second UL transmission 1714, the UE 1702 may determine that the first UL transmission 1712 has a higher power allocation priority over the second UL transmission 1714. Thus, the UE 1702 may give a higher power-priority to the first UL transmission 1712. However, as the first UL transmission 1712 may be more likely to cause higher interference to the DL reception 1710 as the first UL transmission 1712 is closer to the DL reception 1710 in terms of frequency, the UE 1702 may apply a power-backoff for the first UL transmission 1712 (e.g., the transmission power for the first UL transmission 1712 may be reduced).

In another example, if UL-DL-prioritization rules are configured or defined for UL transmissions and DL transmissions in a CC and if one of UL transmissions has a higher priority compared to a DL transmission, as shown at 1722, the UE 1702 may be configured to allocate power first to the UL transmission with the higher priority compared to the DL reception. In addition, if an UL transmission with a lower priority is closer to the DL reception (e.g., the first UL transmission 1712), a power-backoff may be applied to this UL transmission. For example, if the second UL transmission 1714 has a higher priority than the DL reception 1710 and the first UL transmission 1712 has a lower priority than the DL reception 1710 (e.g., UL Tx 2>DL Rx>UL Tx 1), the UE 1702 may give a higher power priority to the second UL transmission 1714. Additionally, as the first UL transmission 1712 has a lower priority compared to the second UL transmission 1714 and the DL reception 1710, and the first UL transmission 1712 is also closer to the DL reception 1710 (e.g., in terms of frequency), the UE 1702 may be configured to apply a power-backoff to the first UL transmission 1712.

In another example, if UL-DL-prioritization rules are configured or defined for UL transmissions and DL transmissions in a CC and if UL transmissions have a higher priority compared to DL transmissions, as shown at 1724, the UE 1702 may be configured to apply UL prioritization rules (e.g., the priority order 1104) to the UL transmissions, such as described in connection with FIG. 11. For example, if both the first UL transmission 1712 and the second UL transmission 1714 have a priority higher than the DL reception 1710, the UE 1702 may prioritize power allocations for the first UL transmission 1712 and the second UL transmission 1714 based on a priority of (i) PRACH transmission on the PCell>(ii) PUCCH or PUSCH transmissions with a higher priority index>(iii) for PUCCH or PUSCH transmissions with same priority index>(iv) PUCCH transmission with HARQ-ACK information, and/or SR, and/or LRR, or PUSCH transmission with HARQ-ACK information>(v) PUCCH transmission with CSI or PUSCH transmission with CSI>(vi) PUSCH transmission without HARQ-ACK information or CSI and, for Type-2 random access procedure, PUSCH transmission on the PCell>(vii) SRS transmission, with aperiodic SRS having higher priority than semi-persistent and/or periodic SRS, or PRACH transmission on a serving cell other than the PCell, etc., where (i) may have the highest power allocation priority and (vii) may have the lowest power allocation priority.

Figure 18:
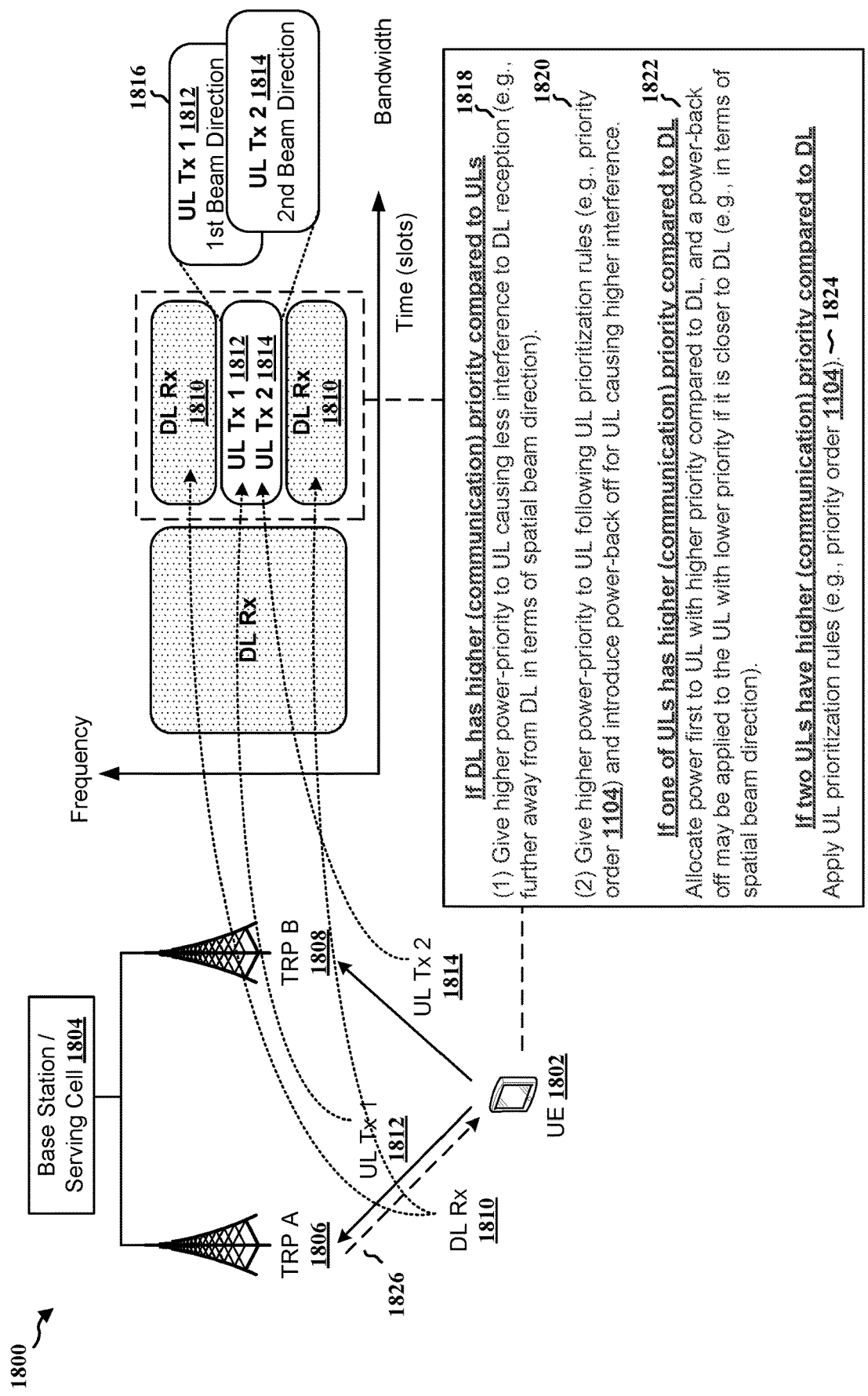
FIG. 18 is a diagram illustrating an example of applying prioritization to multiple UL transmissions in a CC based at least in part on a priority associated with a concurrent DL transmission in the CC in accordance with various aspects of the present disclosure.

FIG. 18 is a diagram 1800 illustrating an example of applying prioritization to multiple UL transmissions in a CC based at least in part on an UL-DL-priority associated with a concurrent DL transmission in the CC in accordance with various aspects of the present disclosure. A UE 1802 (e.g., the UE 1502), which may be an FD UE with multiple antenna panels, may be communicating with a base station 1804 (e.g., the base station 1504) via a first TRP 1806 (TRP A) and a second TRP 1808 (TRP B) of the base station 1804, such as described in connection with FIGS. 10A, 10B, and 15. In one example, as described in connection with 1506, 1508, and/or 1510 of FIG. 15, the UE 1802 may receive one or more PDCCHs from the base station 1804 that schedule a DL reception 1810 from the first TRP 1806, a first UL transmission 1812 to the first TRP 1806, and a second UL transmission 1814 to the second TRP 1808. As shown at 1816, the UE 1802 may transmit the first UL transmission 1812 and the second UL transmission 1814 using a same frequency bandwidth but with different spatial beam directions. In other words, the UE 1802 may transmit the first UL transmission 1812 and the second UL transmission 1814 based on spatial-division multiplexing (SDM). For example, the UE 1802 may transmit the first UL transmission 1812 to the first TRP 1806 based on a first spatial beam direction, and the UE 1502 may transmit the second UL transmission 1814 to the second TRP 1808 based on a second spatial beam direction. In this example, as the UE 1802 may receive the DL reception 1810 from the first TRP 1806 at a direction that is the same or close to the first spatial beam direction (e.g., the direction for transmitting the first UL transmission 1812), it is likely that the first UL transmission 1812 may cause more interference to the DL reception 1810 compared to the second UL transmission 1814.

In one example, if UL-DL-prioritization rules are configured or defined for UL transmissions and DL transmissions in a CC and if a DL transmission has a higher priority compared to UL transmissions, as shown at 1818, the UE 1802 may be configured to give a higher power-priority to an UL causing less interference to the DL reception, such as described in connection with 1606 of FIG. 16. In other words, the power priority may be given to the UL transmission that is further away from the DL reception in terms of spatial beam direction. For example, as shown at 1826, as the first UL transmission 1812 is closer to the DL reception 1810 in terms of beam direction compared to the second UL transmission 1814, the UE 1802 may give a higher power allocation priority to the second UL transmission 1814 (e.g., to the second TRP 1808). In another example, as shown at 1820, the UE 1802 may give a higher power-priority to an UL transmission based on UL prioritization rules (e.g., the priority order 1104), and then the UE 1802 may introduce or apply power-backoff for the UL transmission that causes higher interference (e.g., is closer to DL reception in terms of beam direction). For example, after applying UL prioritization rules (e.g., the priority order 1104) to the first UL transmission 1812 and the second UL transmission 1814, the UE 1802 may determine that the first UL transmission 1812 has a higher power allocation priority over the second UL transmission 1814. Thus, the UE 1802 may give a higher power-priority to the first UL transmission 1812. However, as the first UL transmission 1812 may be more likely to cause a higher interference to the DL reception 1810 as the first UL transmission 1812 is closer to the DL reception 1810 in terms of beam direction, the UE 1802 may apply a power-backoff (e.g., a beam specific power backoff, a beam specific FD-power-backoff, etc.) for the first UL transmission 1812 (e.g., the transmission power for the first UL transmission 1812 may be reduced).

In another example, if UL-DL-prioritization rules are configured or defined for UL transmissions and DL transmissions in a CC and if one of UL transmissions has a higher priority compared to DL transmissions, as shown at 1822, the UE 1802 may be configured to allocate power first to an UL transmission with a higher priority compared to DL reception. In addition, if an UL transmission with a lower priority is closer to the DL reception in terms of beam direction (e.g., the first UL transmission 1812), a power-back off (e.g., a beam specific power backoff, a beam specific FD-power-backoff, etc.) may be applied to this UL transmission. For example, if the second UL transmission 1814 has a higher priority than the DL reception 1810 and the first UL transmission 1812 has a lower priority than the DL reception 1810 (e.g., UL Tx 2>DL Rx>UL Tx 1), the UE 1802 may give a higher power allocation priority to the second UL transmission 1814 (e.g., to the second TRP 1808). Additionally, as the first UL transmission 1812 has a lower priority compared to the second UL transmission 1814 and the DL reception 1810, and the first UL transmission 1812 is also closer to the DL reception 1810 (e.g., in terms of spatial beam direction), the UE 1802 may be configured to apply a power-backoff to the first UL transmission 1812.

In another example, if UL-DL-prioritization rules are configured or defined for UL transmissions and DL transmissions in a CC and if UL transmissions have a higher priority compared to DL transmissions, as shown at 1824, the UE 1802 may be configured to apply UL prioritization rules (e.g., the priority order 1104) to the UL transmissions, such as described in connection with FIG. 11. For example, if both the first UL transmission 1812 and the second UL transmission 1814 have a priority higher than the DL reception 1810, the UE 1802 may prioritize power allocations for the first UL transmission 1812 and the second UL transmission 1814 based on a priority of (i) PRACH transmission on the PCell>(ii) PUCCH or PUSCH transmissions with a higher priority index>(iii) for PUCCH or PUSCH transmissions with same priority index>(iv) PUCCH transmission with HARQ-ACK information, and/or SR, and/or LRR, or PUSCH transmission with HARQ-ACK information>(v) PUCCH transmission with CSI or PUSCH transmission with CSI>(vi) PUSCH transmission without HARQ-ACK information or CSI and, for Type-2 random access procedure, PUSCH transmission on the PCell>(vii) SRS transmission, with aperiodic SRS having higher priority than semi-persistent and/or periodic SRS, or PRACH transmission on a serving cell other than the PCell, etc., where (i) may have the highest power allocation priority and (vii) may have the lowest power allocation priority.

In some scenarios, if a UE is configured to transmit at least one UL transmission simultaneously with at least one sidelink (SL) transmission (e.g., an UL transmission is at least partially overlapped with an SL transmission in time), the UE may apply power prioritization rules to the UL transmission(s) and the SL transmission(s) if the total UE transmit power exceeds a configured/defined maximum UE transmitter power (e.g., P_cmax). In one example, if a UE that is capable of simultaneous transmissions on UL and SL of two respective carriers of a serving cell, or of two respective serving cells, and the UL transmission may overlap with the SL transmission over a time period, such that total UE transmission power over the time period may exceed configured/defined maximum UE transmitter power (P_cmax), then the UE may reduce the power for the UL transmission prior to the start of the UL transmission if the SL transmission has a higher priority than the UL transmission. As such, the total UE transmission power does not exceed the P_cmax. On the other hand, if the UL transmission has a higher priority than the SL transmission, the UE may reduce the power for the SL transmission prior to the start of the SL transmission, so that the total UE transmission power does not exceed the P_cmax.

In some examples, a UE may perform power allocation prioritizations for SL and UL transmissions/receptions based on a set of rules (hereafter "SL-UL power prioritization rules"). For example, physical sidelink feedback channel (PSFCH) transmissions in a slot may have a same priority value as the smallest priority value among physical sidelink shared channel (PSSCH) receptions with corresponding hybrid automatic repeat request (HARQ)-acknowledgement (ACK) (HARQ-ACK) information provided by the PSFCH transmissions in the slot. PSFCH receptions in a slot may have a same priority value as the smallest priority value among PSSCH transmissions with corresponding HARQ-ACK information provided by the PSFCH receptions in the slot.

For prioritization between SL transmission or PSFCH/sidelink synchronization signal (S-SS)/physical sidelink broadcast channel (PSBCH) block reception and UL transmission other than a physical random access channel (PRACH), or a PUSCH scheduled by an UL grant in a random access response (RAR) and its retransmission, or a PUSCH corresponding to Type-2 random access procedure and its retransmission, or a PUCCH with sidelink HARQ-ACK information report, if the UL transmission is for a PUSCH or for a PUCCH with priority index 1, and if sl-PriorityThreshold-UL-URLLC is provided, the SL transmission or reception may have a higher priority than the UL transmission if the priority value of the SL transmission(s) is smaller than sl-PriorityThreshold-UL-URLLC. Otherwise, the UL transmission may have a higher priority than the SL transmission or reception. If the above condition does not apply, the UL transmission may have a higher priority than the SL transmission or reception. In addition, or alternatively, the SL transmission or reception may have a higher priority than the UL transmission if the priority value of the SL transmission(s) or reception is smaller than sl-PriorityThreshold, otherwise the UL transmission may have a higher priority than the SL transmission or reception.

In some examples, a PRACH transmission, or a PUSCH scheduled by an UL grant in a RAR and its retransmission, or a PUSCH for Type-2 random access procedure and its retransmission, or a PUCCH with HARQ-ACK information in response to successRAR, or a PUCCH indicated by a DCI format 1_0 with CRC scrambled by a corresponding TC-RNTI may have a higher priority than an SL transmission or reception.

In another example, a PUCCH transmission with a sidelink HARQ-ACK information report may have a higher priority than an SL transmission if a priority value of the PUCCH is smaller than a priority value of the SL transmission. If the priority value of the PUCCH transmission is larger than the priority value of the SL transmission, the SL transmission may have a higher priority.

In another example, a PUCCH transmission with a sidelink HARQ-ACK information report may have a higher priority than a PSFCH/S-SS/PSBCH block reception if a priority value of the PUCCH is smaller than a priority value of the SL reception. If the priority value of the PUCCH transmission is larger than the priority value of the PSFCH/S-SS/PSBCH block reception, the SL reception has higher priority.

In another example, when one or more SL transmissions from a UE overlap in time with multiple non-overlapping UL transmissions from the UE, the UE may perform the SL transmissions if at least one SL transmission is prioritized over all UL transmissions subject to the UE processing timeline with respect to the first SL transmission and the first UL transmission. When one or more UL transmissions from a UE overlap in time with multiple non-overlapping SL transmissions, the UE may perform the UL transmissions if at least one UL transmission is prioritized over all SL transmissions subject to the UE processing timeline with respect to the first SL transmission and the first UL transmission. When one SL transmission overlaps in time with one or more overlapping UL transmissions, the UE may perform the SL transmission if the SL transmission is prioritized over all UL transmissions subject to both the UE multiplexing and processing timelines with respect to the first SL transmission and the first UL transmission, where the UE processing timeline with respect to the first SL transmission and the first UL transmission is same as when one or more SL transmissions overlap in time with multiple non-overlapping UL transmissions. When one SL transmission overlaps in time with one or more overlapping UL transmissions, the may UE perform the UL transmission if at least one UL transmission is prioritized over the SL transmission subject to both the UE multiplexing and processing timelines with respect to the first SL transmission and the first UL transmission, where the UE processing timeline with respect to the first SL transmission and the first UL transmission is same as when one or more SL transmissions overlap in time with multiple non-overlapping UL transmissions.

Figure 19:
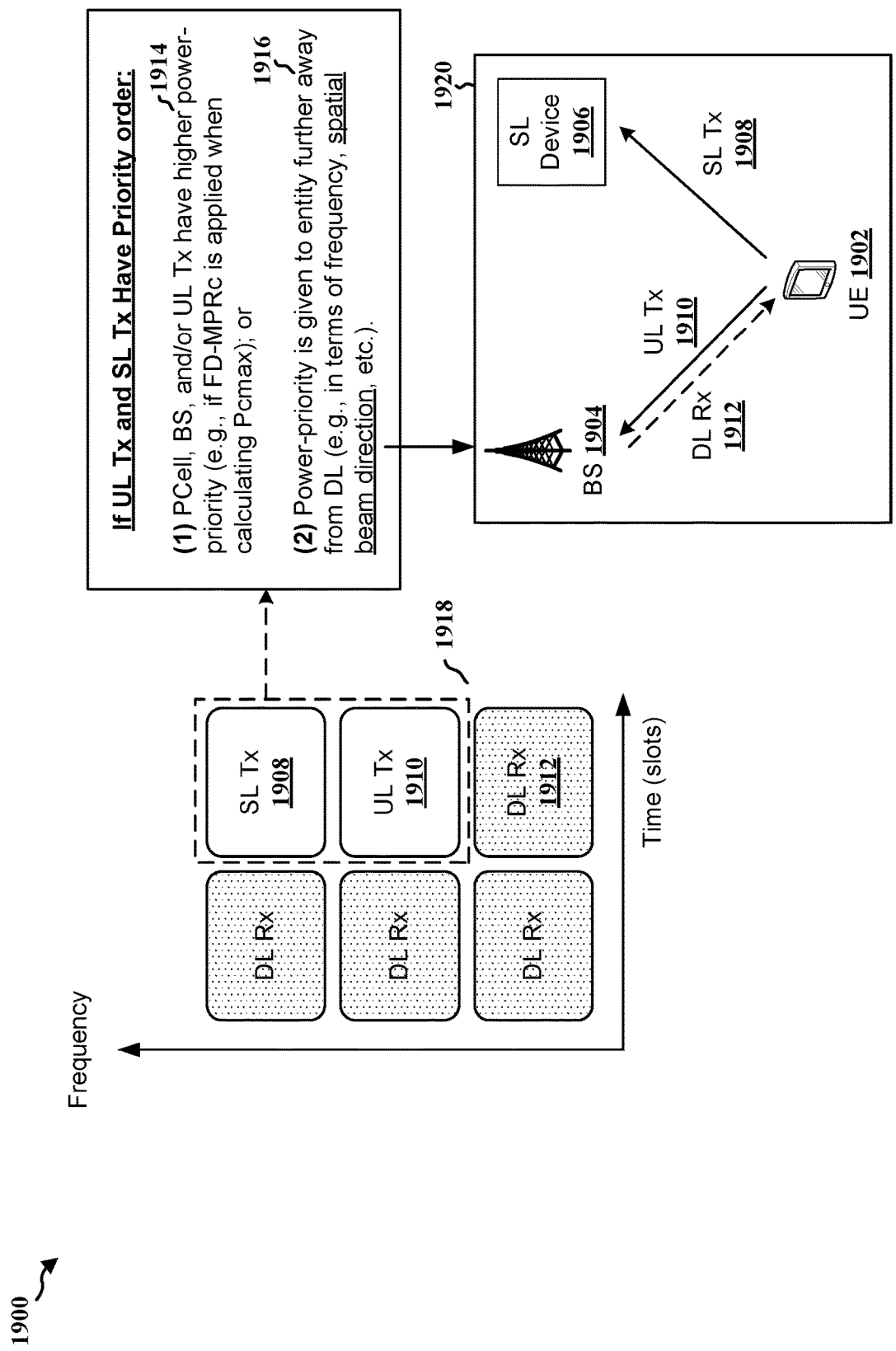
FIG. 19 is a diagram illustrating an example of an intra-band sidelink (SL)/UL power prioritization in an FD mode in which a UE may apply when at least one UL transmission and at least SL transmission have a power allocation priority and are transmitted simultaneously/concurrently in accordance with various aspects of the present disclosure.

FIG. 19 is a diagram 1900 illustrating an example of an intra-band SL/UL power prioritization in an FD mode in which a UE may apply when at least one UL transmission and at least SL transmission are associated with a power allocation priority and are transmitted simultaneously/concurrently in accordance with various aspects of the present disclosure. A UE 1902 (e.g., a UE under an FD mode or an FD capable UE) may be communicating with a base station 1904 and an SL device 1906 (e.g., a UE, an RSU, a vehicle UE, etc.), where the UE 1902 may concurrently transmit UL/SL transmission(s) and receive DL reception(s). For example, the UE 1902 may be scheduled or configured to transmit an SL transmission 1908 to the SL device 1906, transmit an UL transmission 1910 to the base station 1904, and receive a DL reception 1912 from the base station 1904, where the transmission of the SL transmission 1908 and/or the UL transmission 1910 may overlap with the DL reception 1912 at least partially in time. Note that the UE 1902 may also receive DL receptions from the SL device 1906.

In one example, as shown at 1914, when an UL transmission and an SL transmission are associated with a power allocation priority, a UE may be configured to give a higher power allocation priority to a primary cell, a base station, or an UL transmission. As such, an UL transmission on a primary cell or BS may be given a power allocation priority over an SL transmission. For example, the UE 1902 may give a higher power allocation priority to the UL transmission 1910 over the SL transmission 1908. In some examples, the UE 1902 may be configured to apply such configuration (e.g., the rule shown at 1914) if an FD specific MPR is applied when the UE 1902 is calculating $P_{CMAX}$ and/or $P_{CMAX,c}$ (e.g., FD specific MPR is taken into consideration when the UE 1902 determines the values for $P_{CMAX}$ and/or $P_{CMAX,c}$). If an FD specific MPR is not applied when the UE 1902 is calculating $P_{CMAX}$ and/or $P_{CMAX,c}$, then the UE 1902 may not apply such configuration.

In another example, as shown at 1916, when an UL transmission and an SL transmission are associated with a power allocation priority, a UE may give a higher power allocation priority to an entity (e.g., a base station, a serving cell, a TRP, a UE, a sidelink device, etc.) that may cause less interference to the DL reception. In other words, the power priority may be given to an entity that is further away from the DL reception 1912, such as in terms of frequency and/or spatial beam direction, etc. For example, as shown at 1918, as the UL transmission 1910 is closer to the DL reception 1912 in terms of frequency compared to the SL transmission 1908, the UE 1902 may give a higher power allocation priority to the SL transmission 1908, and the transmission power for the UL transmission 1910 may be reduced. In another example, as shown at 1920, the UE 1902 may transmit the SL transmission 1908 to the SL device 1906 based on a first spatial beam direction, and the UE 1902 may transmit the UL transmission 1910 to the base station 1904 based on a second spatial beam direction. In this example, if the UE 1902 is scheduled to receive the DL reception 1912 concurrently/simultaneously from the base station at a direction that is the same or close to the second spatial beam direction (e.g., the direction for transmitting the UL transmission 1910), it is likely that the UL transmission 1910 will cause more interference to the DL reception 1912 compared to the SL transmission 1908. As such, the UE 1902 may give a higher power allocation priority to the SL transmission 1908 (e.g., the transmission power for the UL transmission 1910 may be reduced). In other words, the UE 1902 may give a higher power allocation priority to a transmission that causes less self-interference compared to other transmission(s), even though the transmission may not be on a primary cell or to a base station. In some examples, the UE 1902 may be configured to apply such configuration (e.g., the rule shown at 1916) if an FD specific MPR is not applied to the primary cell or base station when the UE 1902 is calculating $P_{CMAX}$ and/or $P_{CMAX,c}$ (e.g., FD specific MPR is not taken into consideration when the UE 1902 determines the values for $P_{CMAX}$ and/or $P_{CMAX,c}$ for the primary cell). Otherwise if an FD specific MPR is applied to the primary cell or the base station when the UE 1902 is calculating $P_{CMAX}$ and/or $P_{CMAX,c}$, then the UE 1902 may apply such configuration. In other words, if the UE 1902 applies an FD specific MPR to a primary cell or a base station, then the UE 1902 may apply the rule indicated at 1914, and if the UE 1902 does not apply FD specific MPR to a primary cell or a base station, then the UE 1902 may apply the rule indicated at 1916, etc.

In another aspect of the present disclosure, when a UE simultaneously transmits at least one UL transmission and at least one SL transmission and receives at least one DL reception (e.g., the UL transmission and/or the SL transmission are at least partially overlapped with the DL reception in time) in a CC, the UE may determine an power allocation priority for the at least one UL transmission and the at least one SL transmission based at least in part on a priority associate with the at least one DL transmission if a prioritization rule (e.g., a transmission or communication priority rule that is different from the power allocation priority rule) is configured for the UL, DL, and SL transmissions. For example, an UL transmission and/or an SL transmission may be configured with a higher communication priority over a DL reception, such that a UE may prioritize the transmission of the UL transmission and/or the SL transmission over the DL reception.

Figure 20:
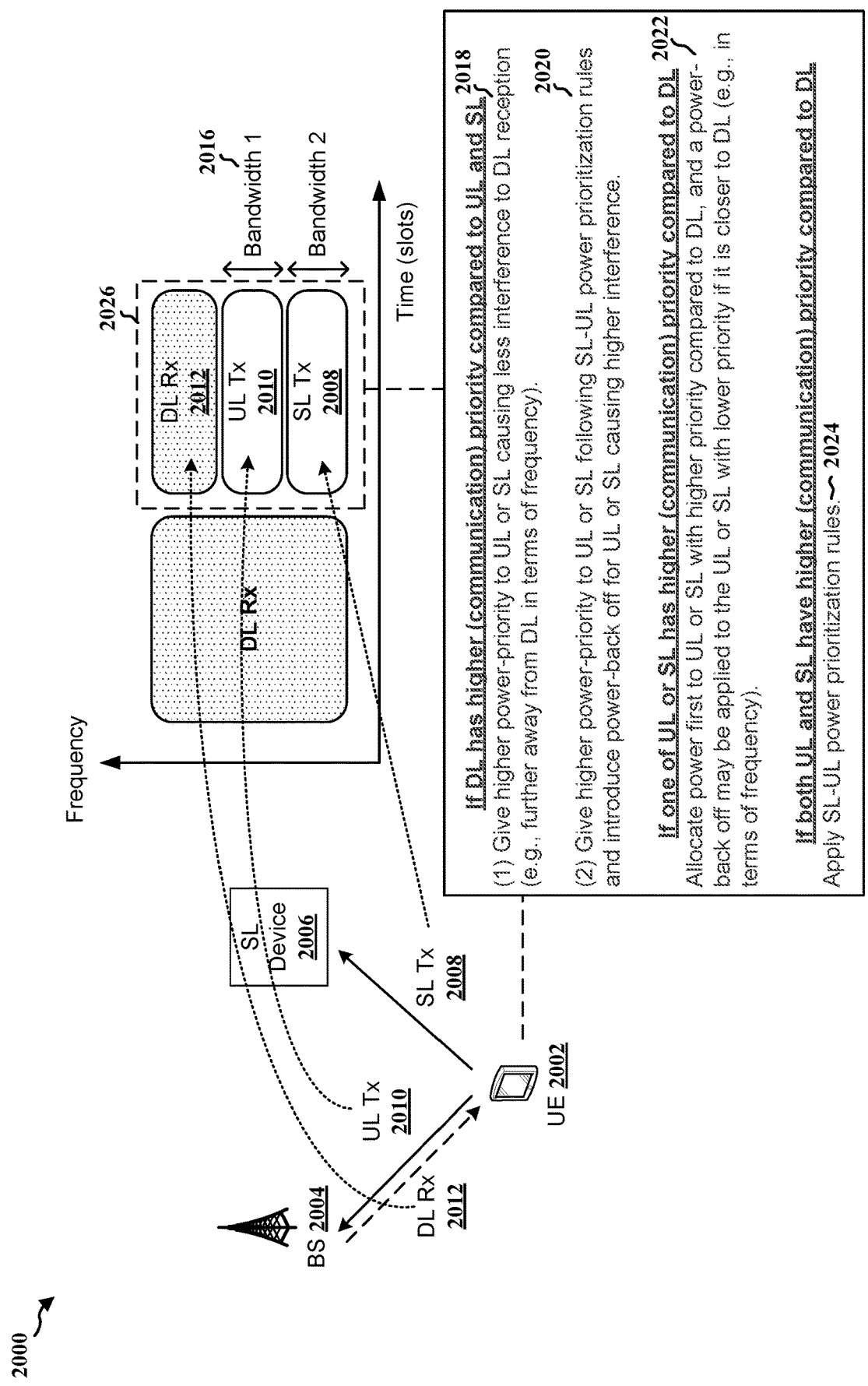
FIG. 20 is a diagram illustrating an example of applying prioritization to at least one UL transmission and at least one SL transmission in a CC based at least in part on a priority associated with a concurrent DL transmission in the CC in accordance with various aspects of the present disclosure.

FIG. 20 is a diagram 2000 illustrating an example of applying prioritization to at least one UL transmission and at least one SL transmission in a CC based at least in part on a priority associated with a concurrent DL transmission in the CC in accordance with various aspects of the present disclosure. A UE 2002 (e.g., a UE under an FD mode or an FD capable UE) may be communicating with a base station 2004 and an SL device 2006 (e.g., a UE, an RSU, a vehicle UE, etc.), where the UE 2002 may concurrently transmit UL/SL transmission(s) and receive DL reception(s) (e.g., from the base station 2004 or the SL device 2006 or both). For example, the UE 2002 may be scheduled or configured to transmit an SL transmission 2008 to the SL device 2006, transmit an UL transmission 2010 to the base station 2004, and receive a DL reception 2012 from the base station 2004, where the transmission of the SL transmission 2008 and/or the UL transmission 2010 may overlap with the DL reception 2012 at least partially in time. In addition, as shown at 2016, the UE 2002 may transmit the UL transmission 2010 and the SL transmission 2008 using different frequency bandwidths. In other words, the UE 2002 may transmit the UL transmission 2010 and the SL transmission 2008 based on FDM. Note that the UE 2002 may also receive DL receptions from the SL device 2006.

In one example, if UL-DL-SL-prioritization rules are configured or defined for an UL transmission, a DL transmission, and an SL transmission in a CC and if a DL transmission has a higher priority compared to UL and DL transmissions, as shown at 2018, the UE 2002 may be configured to give a higher power-priority to an UL or an SL causing less interference to the DL reception (e.g., an UL/SL that is further away from DL), such as described in connection with 1916 of FIG. 19. In other words, the power priority may be given to an UL or an SL transmission that is further away from the DL reception in terms of frequency. For example, as shown at 2026, as the UL transmission 2010 is closer to the DL reception 2012 in terms of frequency compared to the SL transmission 2008, the UE 2002 may give a higher power allocation priority to the SL transmission 2008 (e.g., to the SL device 2006). In another example, as shown at 2020, the UE 2002 may give a higher power-priority to an UL or an SL transmission based on the SL-UL power prioritization rules, and then the UE 2002 may introduce or apply a power-backoff for the UL transmission or the SL transmission that causes higher interference to the DL reception (e.g., is closer to DL reception). For example, after applying the SL-UL power prioritization rules to the UL transmission 2010 and the SL transmission 2008, the UE 2002 may determine that the UL transmission 2010 has a higher power allocation priority over the SL transmission 2008. Thus, the UE 2002 may give a higher power-priority to the UL transmission 2010. However, as the UL transmission 2010 may be more likely to cause higher interference to the DL reception 2012 as the UL transmission 2010 is closer to the DL reception 2012 in terms of frequency, the UE 2002 may apply a power-backoff for the UL transmission 2010 (e.g., the transmission power for the UL transmission 2010 may be reduced).

In another example, if UL-DL-SL-prioritization rules are configured or defined for an UL transmission, a DL transmission, and an SL transmission in a CC and if one of the UL transmission or the SL transmission has a higher priority compared to the DL transmission, as shown at 2022, the UE 2002 may be configured to allocate power first to an UL transmission or an SL transmission with a higher priority compared to the DL reception. In addition, if an UL transmission or an SL transmission with a lower priority is closer to the DL reception (e.g., the UL transmission 2010), a power-backoff may be applied to this UL transmission or SL transmission. For example, if the SL transmission 2008 has a higher priority than the DL reception 2012 and the UL transmission 2010 has a lower priority than the DL reception 2012 (e.g., SL Tx>DL Rx>UL Tx), the UE 2002 may give a higher power priority to the SL transmission 2008. Additionally, as the UL transmission 2010 has a lower priority compared to the SL transmission 2008 and the DL reception 2012, and the UL transmission 2010 is also closer to the DL reception 2012 (e.g., in terms of frequency), the UE 2002 may be configured to apply a power-backoff to the UL transmission 2010.

In another example, if UL-DL-SL-prioritization rules are configured or defined for an UL transmission, a DL transmission, and an SL transmission in a CC and if both the UL transmission and the SL transmission have a higher priority compared to the DL transmission, as shown at 2024, the UE 2002 may be configured to apply the SL-UL power prioritization rules to the UL transmission and the SL transmission.

Figure 21:
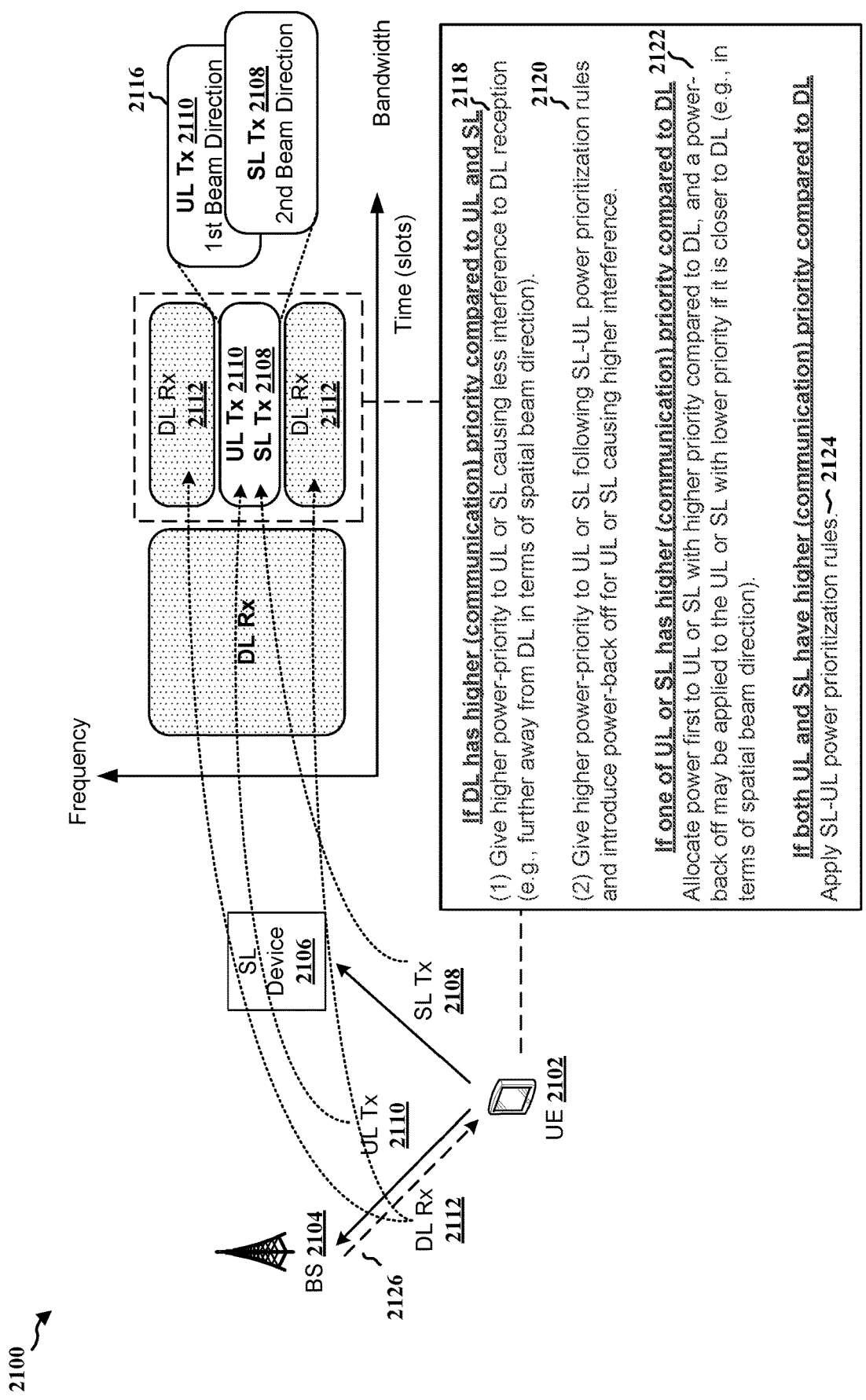
FIG. 21 is a diagram illustrating an example of applying prioritization to at least one UL transmission and at least one SL transmission in a CC based at least in part on a priority associated with a concurrent DL transmission in the CC in accordance with various aspects of the present disclosure.

FIG. 21 is a diagram 2100 illustrating an example of applying prioritization to at least one UL transmission and at least one SL transmission in a CC based at least in part on a priority associated with a concurrent DL transmission in the CC in accordance with various aspects of the present disclosure. A UE 2102 (e.g., a UE under an FD mode or an FD capable UE) may be communicating with a base station 2104 and an SL device 2106 (e.g., a UE, an RSU, a vehicle UE, etc.), where the UE 2102 may concurrently transmit UL/SL transmission(s) and receive DL reception(s). For example, the UE 2102 may be scheduled or configured to transmit an SL transmission 2108 to the SL device 2106, transmit an UL transmission 2110 to the base station 2104, and receive a DL reception 2112 from the base station 2104, where the transmission of the SL transmission 2108 and/or the UL transmission 2110 may overlap with the DL reception 2112 at least partially in time. In addition, as shown at 2116, the UE 2102 may transmit the UL transmission 2110 and the SL transmission 2108 using a same frequency bandwidth but with different spatial beam directions. In other words, the UE 2102 may transmit the UL transmission 2110 and the SL transmission 2108 based on SDM. For example, the UE 2102 may transmit the UL transmission 2110 to the base station 2104 based on a first spatial beam direction, and the UE 1502 may transmit the SL transmission 2108 to the SL device 2106 based on a second spatial beam direction. In this example, as the UE 2102 may receive the DL reception 2112 from the base station 2104 at a direction that is the same or close to the first spatial beam direction (e.g., the direction for transmitting the UL transmission 2110), it is likely that the UL transmission 2110 will cause more interference to the DL reception 2112 compared to the SL transmission 2108. Note that the UE 2002 may also receive DL receptions from the SL device 2006.

In one example, if UL-DL-SL-prioritization rules are configured or defined for an UL transmission, a DL transmission, and an SL transmission in a CC and if a DL transmission has a higher priority compared to UL and DL transmissions, as shown at 2118, the UE 2102 may be configured to give a higher power-priority to an UL or an SL causing less interference to the DL reception (e.g., an UL/SL that is further away from DL), such as described in connection with 1916 of FIG. 19. In other words, the power priority may be given to an UL or an SL transmission that is further away from the DL reception in terms of spatial beam direction. For example, as shown at 2126, as the UL transmission 2110 is closer to the DL reception 2112 in terms of spatial beam direction compared to the SL transmission 2108, the UE 2102 may give a higher power allocation priority to the SL transmission 2108 (e.g., to the SL device 2106). In another example, as shown at 2120, the UE 2102 may give a higher power-priority to an UL or an SL transmission based on the SL-UL power prioritization rules, and then the UE 2102 may introduce or apply a power-backoff for the UL transmission or the SL transmission that causes higher interference to the DL reception (e.g., is closer to DL reception). For example, after applying the SL-UL power prioritization rules to the UL transmission 2110 and the SL transmission 2108, the UE 2102 may determine that the UL transmission 2110 has a higher power allocation priority over the SL transmission 2108. Thus, the UE 2102 may give a higher power-priority to the UL transmission 2110. However, as the UL transmission 2110 may be more likely to cause higher interference to the DL reception 2112 as the UL transmission 2110 is closer to the DL reception 2112 in terms of beam direction, the UE 2102 may apply a power-backoff for the UL transmission 2110 (e.g., the transmission power for the UL transmission 2110 may be reduced).

In another example, if UL-DL-SL-prioritization rules are configured or defined for an UL transmission, a DL transmission, and an SL transmission in a CC and if one of the UL transmission or the SL transmission has a higher priority compared to the DL transmission, as shown at 2122, the UE 2102 may be configured to allocate power first to an UL transmission or an SL transmission with a higher priority compared to the DL reception. In addition, if an UL transmission or an SL transmission with a lower priority is closer to the DL reception (e.g., the UL transmission 2110) in terms of spatial beam direction, a power-backoff may be applied to this UL transmission or SL transmission. For example, if the SL transmission 2108 has a higher priority than the DL reception 2112 and the UL transmission 2110 has a lower priority than the DL reception 2112 (e.g., SL Tx>DL Rx>UL Tx), the UE 2102 may give a higher power priority to the SL transmission 2108. Additionally, as the UL transmission 2110 has a lower priority compared to the SL transmission 2108 and the DL reception 2112, and the UL transmission 2110 is also closer to the DL reception 2112 (e.g., in terms of frequency), the UE 2102 may be configured to apply a power-backoff to the UL transmission 2110.

In another example, if UL-DL-SL-prioritization rules are configured or defined for an UL transmission, a DL transmission, and an SL transmission in a CC and if both the UL transmission and the SL transmission have a higher priority compared to the DL transmission, as shown at 2124, the UE 2102 may be configured to apply the SL-UL power prioritization rules to the UL transmission and the SL transmission.

Figure 22:
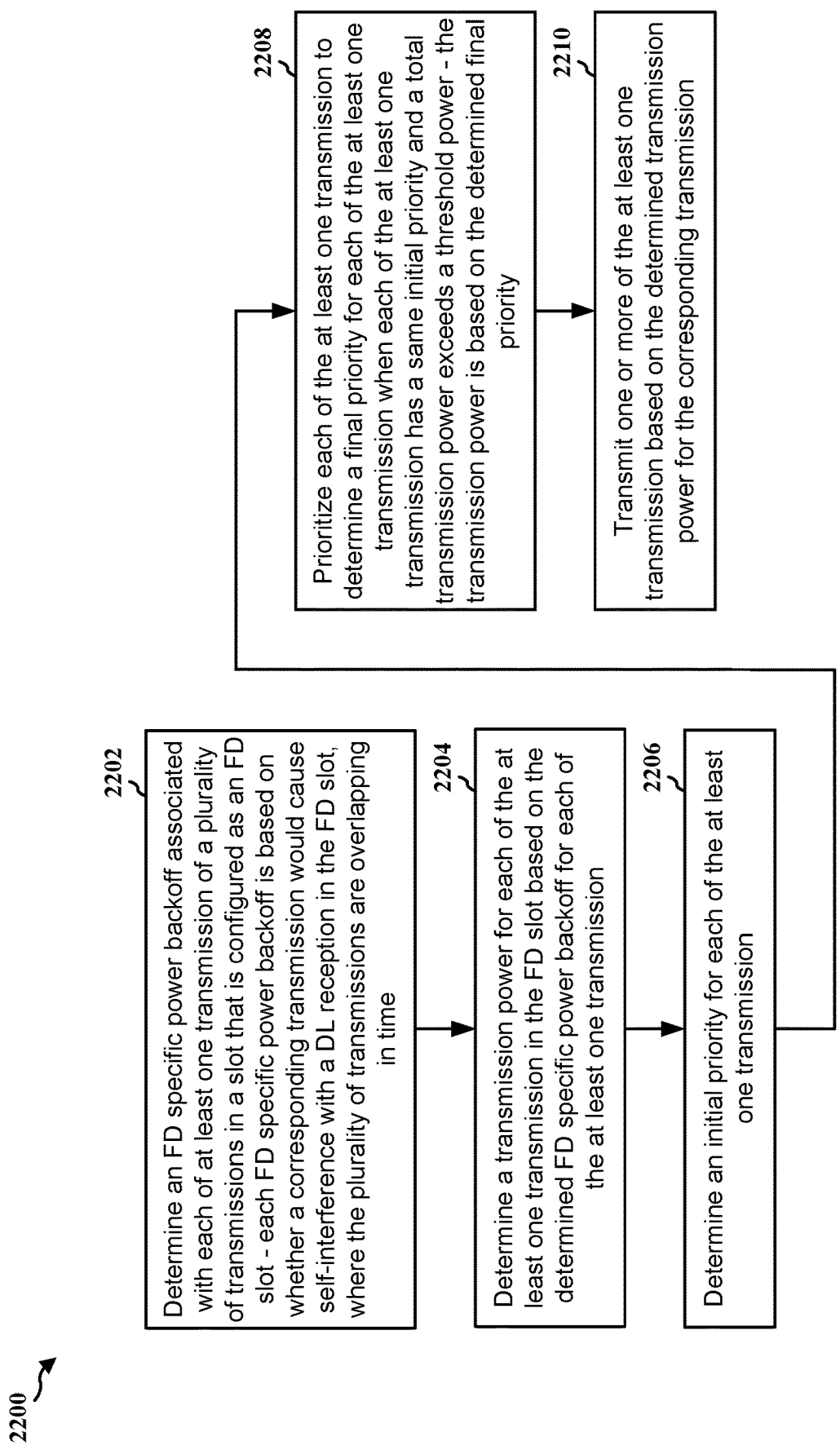
FIG. 22 is a flowchart of a method of wireless communication in accordance with aspects presented herein.

FIG. 22 is a flowchart 2200 of a method of wireless communication. The method may be performed by a UE or a component of a UE (e.g., the UE 104, 350, 1302, 1502, 1702, 1802, 1902, 2002, 2102; the apparatus 2402; a processing system, which may include the memory 360 and which may be the entire UE 350 or a component of the UE 350, such as the TX processor 368, the RX processor 356, and/or the controller/processor 359). The method may enable the UE to apply a power backoff and/or a power allocation prioritization to at least one of multiple transmissions if at least one DL reception overlaps with the multiple transmissions at least partially in time.

At 2202, a UE may determine an FD specific power backoff associated with each of at least one transmission of a plurality of transmissions in a slot that is configured as an FD slot, each FD specific power backoff may be based on whether a corresponding transmission would cause self-interference with a DL reception in the FD slot, and the plurality of transmissions may be overlapping in time, such as described in connection with FIGS. 15 to 21. For example, at 1512 and 1513 of FIG. 15, the UE 1502 may determine $P_{CMAX,c}$ and $P_{CMAX}$ based on information available about scheduled UL transmissions and based on FD specific MPR, where UL transmissions may be overlapped in time with a DL reception, such as shown at 1526. The determination of the FD specific power backoff may be performed by, e.g., the FD power backoff determination component 2440 of the apparatus 2402 in FIG. 24. The FD specific power backoff may be one of an MPR, a cell-specific MPR, an intra-cell frequency-specific power backoff, or an intra-cell beam-specific power backoff. The plurality of transmissions may include a plurality of UL transmissions, a plurality of SL transmissions, or at least one UL transmission and at least one SL transmission. For example, the plurality of UL transmissions may be to a plurality of TRPs.

In one example, the FD specific power backoff may be greater for a first transmission that causes more self-interference to the DL reception than for second transmission that causes less self-interference to the DL reception, such as described in connection with FIGS. 16 to 21.

In another example, the FD specific power backoff may be an MPR. The MPR may be a cell-specific MPR, and the cell-specific MPR may be based on at least one of an LCRB for transmissions in the cell, or a lowest RB index of transmitted RBs in the cell, such as described in connection with FIG. 12. In such an example, when the UE determines the power backoff, the UE may determine a cell-specific MPR for each carrier of a set of carriers, and when the UE determines the transmission power, the UE may determine the transmission power for each of the at least one transmission based on the determined cell-specific MPR corresponding to the cell for the transmission.

In another example, as described in connection with FIG. 15, the power backoff may be applied for the at least one transmission in the FD slot when the DL reception is scheduled for the UE at least partially overlapping in time with the at least one transmission. Alternative, when the power backoff may be applied for the at least one transmission in the FD slot irrespective of whether a DL reception is scheduled for the UE at least partially overlapping in time with the at least one transmission.

In another example, each FD specific power backoff may be determined further based on whether a corresponding transmission has higher priority than the DL reception in the FD slot, such as described in connection with FIGS. 17, 18, 20, and 21.

At 2204, the UE may determine a transmission power for each of the at least one transmission in the FD slot based on the determined FD specific power backoff for each of the at least one transmission, such as described in connection with FIGS. 15 to 21. For example, at 1513, the UE 1502 may determine transmission power for each of the UL transmissions. The determination of the transmission power may be performed by, e.g., the transmission power determination component 2442 of the apparatus 2402 in FIG. 24.

In one example, the determining the transmission power for each transmission of the at least one transmission in the FD slot may include determining a cell-specific upper bound maximum output power $P_{CMAX\_H, c}$ for the transmission; determining a cell-specific lower bound maximum output power $P_{CMAX\_L, c}$ for the transmission based on the determined FD specific backoff; determining a cell-specific maximum output power $P_{CMAX, c}$ for the transmission based on the determined cell-specific lower bound maximum output power $P_{CMAX\_L, c}$ and the determined cell-specific upper bound maximum output power $P_{CMAX\_H, c}$ for the transmission, where $P_{CMAX\_L, c} \leq P_{CMAX, c} \leq P_{CMAX\_H, c}$, where the cell-specific maximum output power $P_{CMAX, c}$ for the transmission may be determined within a range $P_{CMAX\_L, c} \leq P_{CMAX, c} \leq P_{CMAX\_H, c}$ based on at least one of whether the corresponding transmission would cause self-interference with the DL reception in the FD slot, a self-interference cancelation capability, or self-interference threshold specifications, such as described in connection with 1512 and 1513 of FIG. 15.

At 2206, the UE may determine an initial priority for each of the at least one transmission, such as described in connection with FIG. 11. For example, a UE may determine an initial priority for multiple transmissions based on the priority order 1104. The determination of the initial priority may be performed by, e.g., the priority determination component 2444 of the apparatus 2402 in FIG. 24.

At 2208, the UE may prioritize each of the at least one transmission to determine a final priority for each of the at least one transmission when each of the at least one transmission has a same initial priority and a total transmission power exceeds a threshold power, where the transmission power may be based on the determined final priority, such as described in connection with FIGS. 15 to 21. For example, at 1602 and 1606 of FIG. 16, the UE 1202 may apply prioritization rules for the first UL transmission 1507 and the second UL transmission 1509 when the first UL transmission 1507 and the second UL transmission 1509 have a same priority order. The prioritization of the at least one transmission may be performed by, e.g., the prioritization application component 2446 of the apparatus 2402 in FIG. 24.

In one example, a primary cell for a first transmission of the plurality of transmissions may be prioritized over a secondary cell for a second transmission of the plurality of transmissions, such as described in connection with FIGS. 16 and 19.

In another example, a first cell for a first transmission of the plurality of transmissions may be prioritized over a second cell for a second transmission of the plurality of transmissions when the second transmission at least one: causes more interference to the DL reception in the FD slot than the first transmission; is closer in spatial beam direction to the spatial beam direction of the DL reception in the FD slot; or is closer in frequency to the frequency of the DL reception in the FD slot, such as described in connection with FIGS. 16 and 19.

At 2210, the UE may transmit one or more of the at least one transmission based on the determined transmission power for the corresponding transmission, such as described in connection with FIGS. 15 to 21. For example, at 1516 and 1518, the UE 1502 may transmit the first UL transmission 1507 and the second UL transmission 1509 based on the power allocation prioritization rules (e.g., the priority order 1104), and the UE 1502 may further apply addition prioritization described in connection with FIGS. 16 to 21 if multiple transmissions have a same priority. The transmission of the first UL transmission 1507 and the second UL transmission 1509 based on the power allocation periodization rules may be performed by, e.g., the transmission power configuration component 2448 and/or the transmission component 2434 of the apparatus 2402 in FIG. 24.

Figure 23:
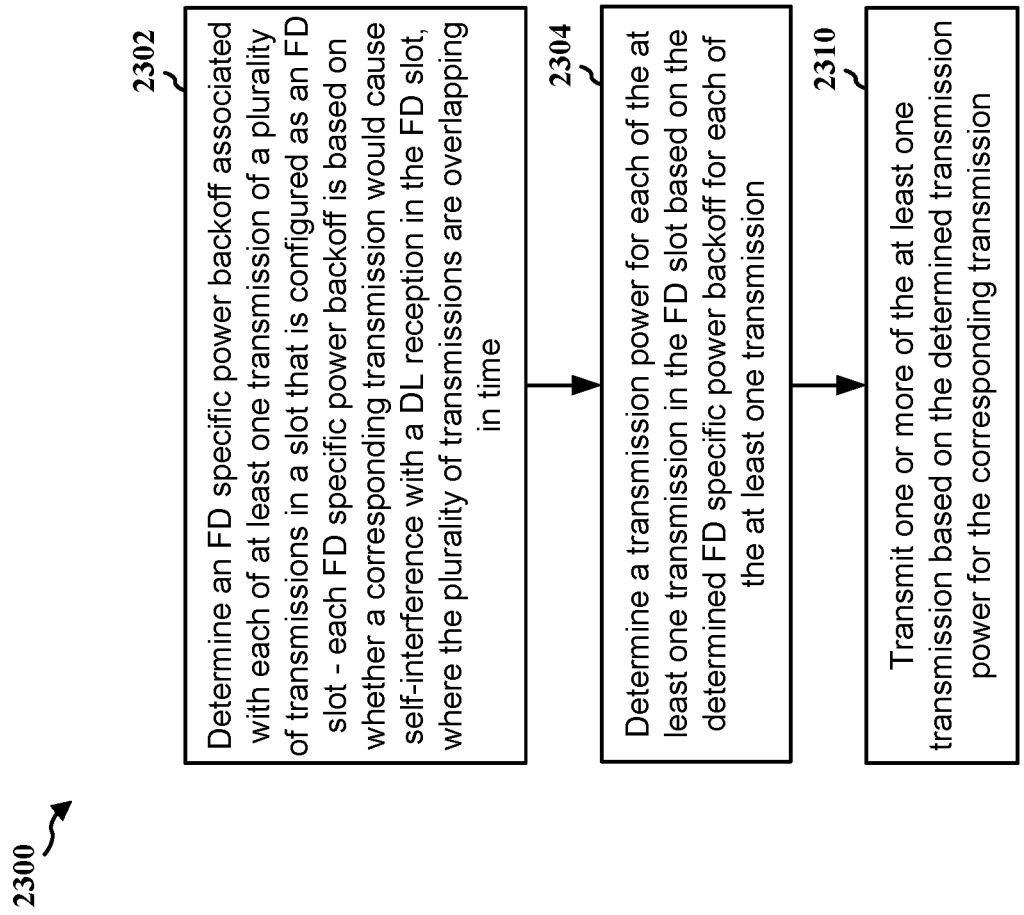
FIG. 23 is a flowchart of a method of wireless communication in accordance with aspects presented herein.

FIG. 23 is a flowchart 2300 of a method of wireless communication. The method may be performed by a UE or a component of a UE (e.g., the UE 104, 350, 1302, 1502, 1702, 1802, 1902, 2002, 2102; the apparatus 2402; a processing system, which may include the memory 360 and which may be the entire UE 350 or a component of the UE 350, such as the TX processor 368, the RX processor 356, and/or the controller/processor 359). The method may enable the UE to apply a power backoff and/or a power allocation prioritization to at least one of multiple transmissions if at least one DL reception overlaps with the multiple transmissions at least partially in time.

At 2302, a UE may determine an FD specific power backoff associated with each of at least one transmission of a plurality of transmissions in a slot that is configured as an FD slot, each FD specific power backoff may be based on whether a corresponding transmission would cause self-interference with a DL reception in the FD slot, and the plurality of transmissions may be overlapping in time, such as described in connection with FIGS. 15 to 21. For example, at 1512 and 1513 of FIG. 15, the UE 1502 may determine $P_{CMAX,c}$ and $P_{CMAX}$ based on information available about scheduled UL transmissions and based on FD specific MPR, where UL transmissions may be overlapped in time with a DL reception, such as shown at 1526. The determination of the FD specific power backoff may be performed by, e.g., the FD power backoff determination component 2440 of the apparatus 2402 in FIG. 24. The FD specific power backoff may be one of an MPR, a cell-specific MPR, an intra-cell frequency-specific power backoff, or an intra-cell beam-specific power backoff. The plurality of transmissions may include a plurality of UL transmissions, a plurality of SL transmissions, or at least one UL transmission and at least one SL transmission. For example, the plurality of UL transmissions may be to a plurality of TRPs.

In one example, the FD specific power backoff may be greater for a first transmission that causes more self-interference to the DL reception than for second transmission that causes less self-interference to the DL reception, such as described in connection with FIGS. 16 to 21.

In another example, the FD specific power backoff may be an MPR. The MPR may be a cell-specific MPR, and the cell-specific MPR may be based on at least one of an LCRB for transmissions in the cell, or a lowest RB index of transmitted RBs in the cell, such as described in connection with FIG. 12. In such an example, when the UE determines the power backoff, the UE may determine a cell-specific MPR for each carrier of a set of carriers, and when the UE determines the transmission power, the UE may determine the transmission power for each of the at least one transmission based on the determined cell-specific MPR corresponding to the cell for the transmission.

In another example, as described in connection with FIG. 15, the power backoff may be applied for the at least one transmission in the FD slot when the DL reception is scheduled for the UE at least partially overlapping in time with the at least one transmission. Alternative, when the power backoff may be applied for the at least one transmission in the FD slot irrespective of whether a DL reception is scheduled for the UE at least partially overlapping in time with the at least one transmission.

In another example, each FD specific power backoff may be determined further based on whether a corresponding transmission has higher priority than the DL reception in the FD slot, such as described in connection with FIGS. 17, 18, 20, and 21.

At 2304, the UE may determine a transmission power for each of the at least one transmission in the FD slot based on the determined FD specific power backoff for each of the at least one transmission, such as described in connection with FIGS. 15 to 21. For example, at 1513, the UE 1502 may determine transmission power for each of the UL transmissions. The determination of the transmission power may be performed by, e.g., the transmission power determination component 2442 of the apparatus 2402 in FIG. 24.

In one example, the determining the transmission power for each transmission of the at least one transmission in the FD slot may include determining a cell-specific upper bound maximum output power $P_{CMAX\_H,\ c}$ for the transmission; determining a cell-specific lower bound maximum output power $P_{CMAX\_L,\ c}$ for the transmission based on the determined FD specific backoff; determining a cell-specific maximum output power $P_{CMAX,\ c}$ for the transmission based on the determined cell-specific lower bound maximum output power $P_{CMAX\_L,\ c}$ and the determined cell-specific upper bound maximum output power $P_{CMAX\_H,\ c}$ for the transmission, where $P_{CMAX\_L,\ c} \leq P_{CMAX,\ c} \leq P_{CMAX\_H,\ c}$, where the cell-specific maximum output power $P_{CMAX,\ c}$ for the transmission may be determined within a range $P_{CMAX\_L,\ c} \leq P_{CMAX,\ c} \leq P_{CMAX\_H,\ c}$ based on at least one of whether the corresponding transmission would cause self-interference with the DL reception in the FD slot, a self-interference cancelation capability, or self-interference threshold specifications, such as described in connection with 1512 and 1513 of FIG. 15.

In another example, the UE may determine an initial priority for each of the at least one transmission, such as described in connection with FIG. 11. For example, a UE may determine an initial priority for multiple transmissions based on the priority order 1104. The determination of the initial priority may be performed by, e.g., the priority determination component 2444 of the apparatus 2402 in FIG. 24.

In another example, the UE may prioritize each of the at least one transmission to determine a final priority for each of the at least one transmission when each of the at least one transmission has a same initial priority and a total transmission power exceeds a threshold power, where the transmission power may be based on the determined final priority, such as described in connection with FIGS. 15 to 21. For example, at 1602 and 1606 of FIG. 16, the UE 1202 may apply prioritization rules for the first UL transmission 1507 and the second UL transmission 1509 when the first UL transmission 1507 and the second UL transmission 1509 have a same priority order. The prioritization of the at least one transmission may be performed by, e.g., the prioritization application component 2446 of the apparatus 2402 in FIG. 24.

In another example, a primary cell for a first transmission of the plurality of transmissions may be prioritized over a secondary cell for a second transmission of the plurality of transmissions, such as described in connection with FIGS. 16 and 19.

In another example, a first cell for a first transmission of the plurality of transmissions may be prioritized over a second cell for a second transmission of the plurality of transmissions when the second transmission at least one: causes more interference to the DL reception in the FD slot than the first transmission; is closer in spatial beam direction to the spatial beam direction of the DL reception in the FD slot; or is closer in frequency to the frequency of the DL reception in the FD slot, such as described in connection with FIGS. 16 and 19.

At 2310, the UE may transmit one or more of the at least one transmission based on the determined transmission power for the corresponding transmission, such as described in connection with FIGS. 15 to 21. For example, at 1516 and 1518, the UE 1502 may transmit the first UL transmission 1507 and the second UL transmission 1509 based on the power allocation prioritization rules (e.g., the priority order 1104), and the UE 1502 may further apply addition prioritization described in connection with FIGS. 16 to 21 if multiple transmissions have a same priority. The transmission of the first UL transmission 1507 and the second UL transmission 1509 based on the power allocation periodization rules may be performed by, e.g., the transmission power configuration component 2448 and/or the transmission component 2434 of the apparatus 2402 in FIG. 24.

Figure 24:
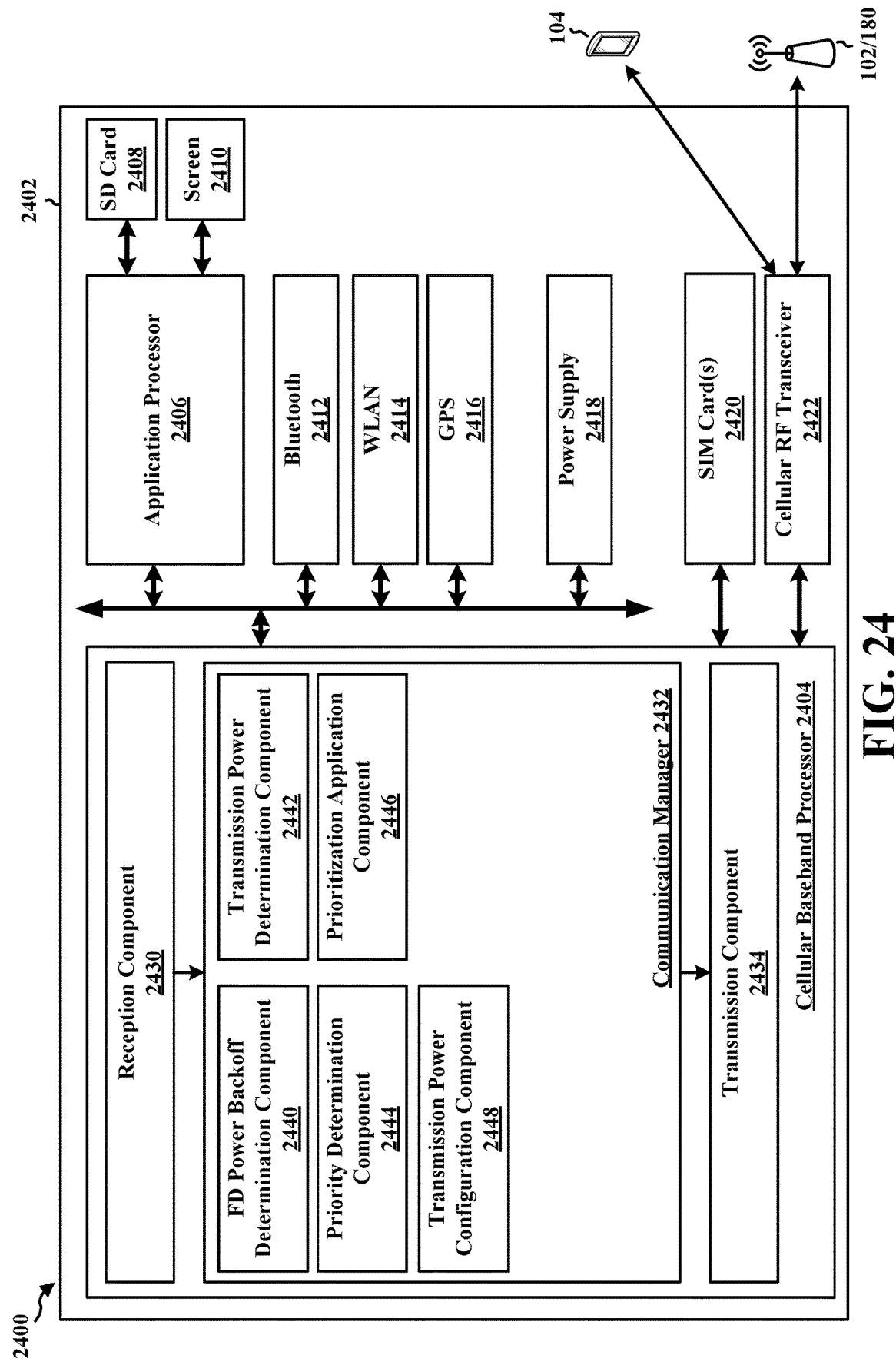
FIG. 24 is a diagram illustrating an example of a hardware implementation for an example apparatus in accordance with aspects presented herein.

FIG. 24 is a diagram 2400 illustrating an example of a hardware implementation for an apparatus 2402. The apparatus 2402 may be a UE, a component of a UE, or may implement UE functionality. In some aspects, the apparatus 2402 may include a cellular baseband processor 2404 (also referred to as a modem) coupled to a cellular RF transceiver 2422. In some aspects, the apparatus 2402 may further include one or more subscriber identity modules (SIM) cards 2420, an application processor 2406 coupled to a secure digital (SD) card 2408 and a screen 2410, a Bluetooth module 2412, a wireless local area network (WLAN) module 2414, a Global Positioning System (GPS) module 2416, or a power supply 2418. The cellular baseband processor 2404 communicates through the cellular RF transceiver 2422 with the UE 104 and/or BS 102/180. The cellular baseband processor 2404 may include a computer-readable medium/memory. The computer-readable medium/memory may be non-transitory. The cellular baseband processor 2404 is responsible for general processing, including the execution of software stored on the computer-readable medium/memory. The software, when executed by the cellular baseband processor 2404, causes the cellular baseband processor 2404 to perform the various functions described supra. The computer-readable medium/memory may also be used for storing data that is manipulated by the cellular baseband processor 2404 when executing software. The cellular baseband processor 2404 further includes a reception component 2430, a communication manager 2432, and a transmission component 2434. The communication manager 2432 includes the one or more illustrated components. The components within the communication manager 2432 may be stored in the computer-readable medium/memory and/or configured as hardware within the cellular baseband processor 2404. The cellular baseband processor 2404 may be a component of the UE 350 and may include the memory 360 and/or at least one of the TX processor 368, the RX processor 356, and the controller/processor 359. In one configuration, the apparatus 2402 may be a modem chip and include just the baseband processor 2404, and in another configuration, the apparatus 2402 may be the entire UE (e.g., see 350 of FIG. 3) and include the additional modules of the apparatus 2402.

The communication manager 2432 includes an FD power backoff determination component 2440 that is configured to determine an FD specific power backoff associated with each of at least one transmission of a plurality of transmissions in a slot that is configured as an FD slot, each FD specific power backoff being based on whether a corresponding transmission would cause self-interference with a DL reception in the FD slot, the plurality of transmissions being overlapping in time, e.g., as described in connection with 2202 of FIGS. 22 and/or 2302 of FIG. 23. The communication manager 2432 further includes a transmission power determination component 2442 that is configured to determine a transmission power for each of the at least one transmission in the FD slot based on the determined FD specific power backoff for each of the at least one transmission, e.g., as described in connection with 2204 of FIGS. 22 and/or 2304 of FIG. 23. The communication manager 2432 further includes a priority determination component 2444 that is configured to determine an initial priority for each of the at least one transmission, e.g., as described in connection with 2206 of FIG. 22. The communication manager 2432 further includes a prioritization application component 2446 that is configured to prioritize each of the at least one transmission to determine a final priority for each of the at least one transmission when each of the at least one transmission has a same initial priority and a total transmission power exceeds a threshold power, where the transmission power is based on the determined final priority, e.g., as described in connection with 2208 of FIG. 22. The communication manager 2432 further includes a transmission power configuration component 2448 that is configured to transmit one or more of the at least one transmission based on the determined transmission power for the corresponding transmission, e.g., as described in connection with 2210 of FIGS. 22 and/or 2310 of FIG. 23.

The apparatus may include additional components that perform each of the blocks of the algorithm in the flowcharts of FIGS. 22 and 23. As such, each block in the flowcharts of FIGS. 22 and 23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2402 may include a variety of components configured for various functions. In one configuration, the apparatus 2402, and in particular the cellular baseband processor 2404, includes means for determining an FD specific power backoff associated with each of at least one transmission of a plurality of transmissions in a slot that is configured as an FD slot, each FD specific power backoff being based on whether a corresponding transmission would cause self-interference with a DL reception in the FD slot, the plurality of transmissions being overlapping in time (e.g., the FD power backoff determination component 2440). The apparatus 2402 includes means for determining a transmission power for each of the at least one transmission in the FD slot based on the determined FD specific power backoff for each of the at least one transmission (e.g., the transmission power determination component 2442). The apparatus 2402 includes means for determining an initial priority for each of the at least one transmission (e.g., the priority determination component 2444). The apparatus 2402 includes means for prioritizing each of the at least one transmission to determine a final priority for each of the at least one transmission when each of the at least one transmission has a same initial priority and a total transmission power exceeds a threshold power, where the transmission power is based on the determined final priority (e.g., the prioritization application component 2446). The apparatus 2402 includes means for transmitting one or more of the at least one transmission based on the determined transmission power for the corresponding transmission (e.g., the transmission power configuration component 2448 and/or the transmission component 2434). The FD specific power backoff may be one of an MPR, a cell-specific MPR, an intra-cell frequency-specific power backoff, or an intra-cell beam-specific power backoff. The plurality of transmissions may include a plurality of UL transmissions, a plurality of SL transmissions, or at least one UL transmission and at least one SL transmission. The plurality of UL transmissions may be to a plurality of TRPs.

In one configuration, the FD specific power backoff may be greater for a first transmission that causes more self-interference to the DL reception than for second transmission that causes less self-interference to the DL reception.

In another configuration, the FD specific power backoff may be an MPR. The MPR may be a cell-specific MPR, and the cell-specific MPR may be based on at least one of an LCRB for transmissions in the cell, or a lowest RB index of transmitted RBs in the cell. In such a configuration, the means for determining the power backoff may include the means for determining a cell-specific MPR for each carrier of a set of carriers, and the means for determining the transmission power may include the means for determining the transmission power for each of the at least one transmission based on the determined cell-specific MPR corresponding to the cell for the transmission.

In another configuration, the power backoff may be applied for the at least one transmission in the FD slot when the DL reception is scheduled for the UE at least partially overlapping in time with the at least one transmission. Alternative, when the power backoff may be applied for the at least one transmission in the FD slot irrespective of whether a DL reception is scheduled for the UE at least partially overlapping in time with the at least one transmission.

In another configuration, each FD specific power backoff may be determined further based on whether a corresponding transmission has higher priority than the DL reception in the FD slot.

In another configuration, the means for determining the transmission power for each transmission of the at least one transmission in the FD slot may include means for determining a cell-specific upper bound maximum output power $P_{CMAX\_H,\ C}$ for the transmission; means for determining a cell-specific lower bound maximum output power $P_{CMAX\_L,\ C}$ for the transmission based on the determined FD specific backoff; means for determining a cell-specific maximum output power $P_{CMAX,\ C}$ for the transmission based on the determined cell-specific lower bound maximum output power $P_{CMAX\_L,\ C}$ and the determined cell-specific upper bound maximum output power $P_{CMAX\_H,\ C}$ for the transmission, where $P_{CMAX\_L,\ C} \leq P_{CMAX,\ C} \leq P_{CMAX\_H,\ C}$, where the cell-specific maximum output power $P_{CMAX,\ C}$ for the transmission may be determined within a range $P_{CMAX\_L,\ C} \leq P_{CMAX,\ C} \leq P_{CMAX\_H,\ C}$ based on at least one of whether the corresponding transmission would cause self-interference with the DL reception in the FD slot, a self-interference cancelation capability, or self-interference threshold specifications.

In another configuration, a primary cell for a first transmission of the plurality of transmissions may be prioritized over a secondary cell for a second transmission of the plurality of transmissions.

In another configuration, a first cell for a first transmission of the plurality of transmissions may be prioritized over a second cell for a second transmission of the plurality of transmissions when the second transmission at least one: causes more interference to the DL reception in the FD slot than the first transmission; is closer in spatial beam direction to the spatial beam direction of the DL reception in the FD slot; or is closer in frequency to the frequency of the DL reception in the FD slot.

The means may be one or more of the components of the apparatus 2402 configured to perform the functions recited by the means. As described supra, the apparatus 2402 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to determine an FD specific power backoff associated with each of at least one transmission of a plurality of transmissions in a slot that is configured as an FD slot, each FD specific power backoff being based on whether a corresponding transmission would cause self-interference with a DL reception in the FD slot, the plurality of transmissions being overlapping in time; determine a transmission power for each of the at least one transmission in the FD slot based on the determined FD specific power backoff for each of the at least one transmission; and transmit one or more of the at least one transmission based on the determined transmission power for the corresponding transmission.

Aspect 2 is the apparatus of aspect 1, where the FD specific power backoff is greater for a first transmission that causes more self-interference to the DL reception than for second transmission that causes less self-interference to the DL reception.

Aspect 3 is the apparatus of any of aspects 1 and 2, where the FD specific power backoff is an MPR.

Aspect 4 is the apparatus of any of aspects 1 to 3, where the MPR is a cell-specific MPR, and the cell-specific MPR is based on at least one of an LCRB for transmissions in the cell, or a lowest RB index of transmitted RBs in the cell.

Aspect 5 is the apparatus of any of aspects 1 to 4, where to determine the FD specific power backoff the at least one processor is further configured to determine a cell-specific MPR for each carrier of a set of carriers, and to determine the transmission power the at least one processor is further configured to determine the transmission power for each of the at least one transmission based on the determined cell-specific MPR corresponding to the cell for the transmission.

Aspect 6 is the apparatus of any of aspects 1 to 5, where the power backoff is applied for the at least one transmission in the FD slot when the DL reception is scheduled for the UE at least partially overlapping in time with the at least one transmission.

Aspect 7 is the apparatus of any of aspects 1 to 6, where the power backoff is applied for the at least one transmission in the FD slot irrespective of whether a DL reception is scheduled for the UE at least partially overlapping in time with the at least one transmission.

Aspect 8 is the apparatus of any of aspects 1 to 7, where to determine the transmission power for each transmission of the at least one transmission in the FD slot, the at least one processor is further configured to: determine a cell-specific upper bound maximum output power $P_{CMAX\_H,\ c}$ for the transmission; determine a cell-specific lower bound maximum output power $P_{CMAX\_L,\ c}$ for the transmission based on the determined FD specific backoff; determine a cell-specific maximum output power $P_{CMAX,\ c}$ for the transmission based on the determined cell-specific lower bound maximum output power $P_{CMAX\_L,\ c}$ and the determined cell-specific upper bound maximum output power $P_{CMAX\_H,\ c}$ for the transmission, where $P_{CMAX\_L,\ c} \leq P_{CMAX,\ c} \leq P_{CMAX\_H,\ c}$; where the cell-specific maximum output power $P_{CMAX,\ c}$ for the transmission is determined within a range $P_{CMAX\_L,\ c} \leq P_{CMAX,\ c} \leq P_{CMAX\_H,\ c}$ based on at least one of whether the corresponding transmission would cause self-interference with the DL reception in the FD slot, a self-interference cancelation capability, or self-interference threshold specifications.

Aspect 9 is the apparatus of any of aspects 1 to 8, where the at least one processor is further configured to: determine an initial priority for each of the at least one transmission; and prioritize each of the at least one transmission to determine a final priority for each of the at least one transmission when each of the at least one transmission has a same initial priority and a total transmission power exceeds a threshold power, where the transmission power is based on the determined final priority.

Aspect 10 is the apparatus of any of aspects 1 to 9, where a primary cell for a first transmission of the plurality of transmissions is prioritized over a secondary cell for a second transmission of the plurality of transmissions.

Aspect 11 is the apparatus of any of aspects 1 to 10, where a first cell for a first transmission of the plurality of transmissions is prioritized over a second cell for a second transmission of the plurality of transmissions when the second transmission at least one: causes more interference to the DL reception in the FD slot than the first transmission; is closer in spatial beam direction to the spatial beam direction of the DL reception in the FD slot; or is closer in frequency to the frequency of the DL reception in the FD slot.

Aspect 12 is the apparatus of any of aspects 1 to 11, where the FD specific power backoff is one of an MPR, a cell-specific MPR, an intra-cell frequency-specific power backoff, or an intra-cell beam-specific power backoff.

Aspect 13 is the apparatus of any of aspects 1 to 12, further including a transceiver coupled to the at least one processor, where the plurality of transmissions includes a plurality of UL transmissions, a plurality of SL transmissions, or at least one UL transmission and at least one SL transmission.

Aspect 14 is the apparatus of any of aspects 1 to 13, where the plurality of UL transmissions is to a plurality of TRPs.

Aspect 15 is the apparatus of any of aspects 1 to 14, where each FD specific power backoff is determined further based on whether a corresponding transmission has higher priority than the DL reception in the FD slot.

Aspect 16 is a method of wireless communication for implementing any of aspects 1 to 15.

Aspect 17 is an apparatus for wireless communication including means for implementing any of aspects 1 to 15.

Aspect 18 is a computer-readable medium storing computer executable code, where the code when executed by a processor causes the processor to implement any of aspects 1 to 15.

What is claimed is:

1. An apparatus for wireless communication at a user equipment (UE), comprising:
   a memory; and
   at least one processor coupled to the memory and configured to:
   determine a full-duplex (FD) specific power backoff associated with each of at least two transmissions of a plurality of transmissions in a slot that is configured as an FD slot, each FD specific power backoff being based on whether a corresponding transmission would cause self-interference with a downlink (DL) reception in the FD slot, the plurality of transmissions being overlapping in time;
   determine a transmission power for each of the at least two transmissions in the FD slot based on the determined FD specific power backoff for each of the at least two transmissions;
   determine an initial priority for each of the at least two transmissions;
   prioritize each of the at least two transmissions to determine a final priority for each of the at least two transmissions when each of the at least two transmissions has a same initial priority and a total transmission power exceeds a threshold power; and
   transmit one or more of the at least two transmissions based on the determined transmission power and the determined final priority for the corresponding transmission.

2. The apparatus of claim 1, wherein the FD specific power backoff is greater for a first transmission in the at least two transmissions that causes more self-interference to the DL reception than for a second transmission in the at least two transmissions that causes less self-interference to the DL reception.

3. The apparatus of claim 1, wherein the FD specific power backoff is a maximum power reduction (MPR).

4. The apparatus of claim 3, wherein the MPR is a cell-specific MPR, and the cell-specific MPR is based on at least one of a length of a contiguous resource block (RB) (LCRB) for transmissions in a cell, or a lowest RB index of transmitted RBs in the cell.

5. The apparatus of claim 3, wherein to determine the FD specific power backoff the at least one processor is further configured to determine a cell-specific MPR for each carrier of a set of carriers, and to determine the transmission power the at least one processor is further configured to determine the transmission power for each of the at least two transmissions based on the determined cell-specific MPR corresponding to a cell for the transmission.

6. The apparatus of claim 1, wherein the FD specific power backoff is applied for the at least two transmissions in the FD slot when the DL reception is scheduled for the UE at least partially overlapping in time with the at least two transmissions.

7. The apparatus of claim 1, wherein the FD specific power backoff is applied for the at least two transmissions in the FD slot irrespective of whether a DL reception is scheduled for the UE at least partially overlapping in time with the at least two transmissions.

8. The apparatus of claim 1, wherein to determine the transmission power for each transmission of the at least two transmissions in the FD slot, the at least one processor is further configured to:
   determine a cell-specific upper bound maximum output power $P_{CMAX\_H,\ c}$ for the transmission;
   determine a cell-specific lower bound maximum output power $P_{CMAX\_L,\ c}$ for the transmission based on the determined FD specific backoff; and
   determine a cell-specific maximum output power $P_{CMAX,\ c}$ for the transmission based on the determined cell-specific lower bound maximum output power $P_{CMAX\_L,\ c}$ and the determined cell-specific upper bound maximum output power $P_{CMAX\_H,\ c}$ for the transmission, where $P_{CMAX\_L,\ c} \leq P_{CMAX,\ c} \leq P_{CMAX\_H,\ c}$;
   wherein the cell-specific maximum output power $P_{CMAX,\ c}$ for the transmission is determined within a range $P_{CMAX\_L,\ c} \leq P_{CMAX,\ c} \leq P_{CMAX\_H,\ c}$ based on at least one of whether the corresponding transmission would cause self-interference with the DL reception in the FD slot, a self-interference cancelation capability, or self-interference threshold specifications.

9. The apparatus of claim 1, wherein a primary cell for a first transmission of the plurality of transmissions is prioritized over a secondary cell for a second transmission of the plurality of transmissions.

10. The apparatus of claim 9, wherein a first cell for the first transmission of the plurality of transmissions is prioritized over a second cell for the second transmission of the plurality of transmissions when the second transmission at least one:
    causes more interference to the DL reception in the FD slot than the first transmission;
    is closer in spatial beam direction to the spatial beam direction of the DL reception in the FD slot; or
    is closer in frequency to the frequency of the DL reception in the FD slot.

11. The apparatus of claim 1, wherein the FD specific power backoff is one of a maximum power reduction (MPR), a cell-specific MPR, an intra-cell frequency-specific power backoff, or an intra-cell beam-specific power backoff.

12. The apparatus of claim 1, further comprising a transceiver coupled to the at least one processor, wherein the plurality of transmissions comprises more than two uplink (UL) transmissions, more than two sidelink (SL) transmissions, or at least one UL transmission and at least one SL transmission.

13. The apparatus of claim 12, wherein the at least one processor is configured to transmit the more than two UL transmissions to a plurality of transmission reception points (TRPs).

14. The apparatus of claim 1, wherein the at least one processor is configured to determine each FD specific power backoff further based on whether the corresponding transmission has a higher priority than the DL reception in the FD slot.

15. A method of wireless communication at a user equipment (UE), comprising:
    determining a full-duplex (FD) specific power backoff associated with each of at least two transmissions of a plurality of transmissions in a slot that is configured as an FD slot, each FD specific power backoff being based on whether a corresponding transmission would cause self-interference with a downlink (DL) reception in the FD slot, the plurality of transmissions being overlapping in time;
    determining a transmission power for each of the at least two transmissions in the FD slot based on the determined FD specific power backoff for each of the at least two transmissions;
    determining an initial priority for each of the at least two transmissions;
    prioritizing each of the at least two transmissions to determine a final priority for each of the at least two transmissions when each of the at least two transmissions has a same initial priority and a total transmission power exceeds a threshold power; and
    transmitting one or more of the at least two transmissions based on the determined transmission power and the determined final priority for the corresponding transmission.

16. The method of claim 15, wherein the FD specific power backoff is greater for a first transmission in the at least two transmissions that causes more self-interference to the DL reception than for a second transmission in the at least two transmissions that causes less self-interference to the DL reception.

17. The method of claim 15, wherein the FD specific power backoff is a maximum power reduction (MPR).

18. The method of claim 15, wherein the FD specific power backoff is applied for the at least two transmissions in the FD slot when the DL reception is scheduled for the UE at least partially overlapping in time with the at least two transmissions.

19. The method of claim 15, wherein the FD specific power backoff is applied for the at least two transmissions in the FD slot irrespective of whether a DL reception is scheduled for the UE at least partially overlapping in time with the at least two transmissions.

20. The method of claim 15, wherein the determining the transmission power for each transmission of the at least two transmissions in the FD slot comprises:
    determining a cell-specific upper bound maximum output power $P_{CMAX\_H,\ C}$ for the transmission;
    determining a cell-specific lower bound maximum output power $P_{CMAX\_L,\ C}$ for the transmission based on the determined FD specific backoff; and
    determining a cell-specific maximum output power $P_{CMAX,\ C}$ for the transmission based on the determined cell-specific lower bound maximum output power $P_{CMAX\_L,\ C}$ and the determined cell-specific upper bound maximum output power $P_{CMAX\_H,\ C}$ for the transmission, where $P_{CMAX\_L,\ C} \leq P_{CMAX,\ C} \leq P_{CMAX\_H,\ C}$;
    wherein the cell-specific maximum output power $P_{CMAX,\ C}$ for the transmission is determined within a range $P_{CMAX\_L,\ C} \leq P_{CMAX,\ C} \leq P_{CMAX\_H,\ C}$ based on at least one of whether the corresponding transmission would cause self-interference with the DL reception in the FD slot, a self-interference cancelation capability, or self-interference threshold specifications.

21. The method of claim 15, wherein a primary cell for a first transmission of the plurality of transmissions is prioritized over a secondary cell for a second transmission of the plurality of transmissions.

22. The method of claim 21, wherein a first cell for the first transmission of the plurality of transmissions is prioritized over a second cell for the second transmission of the plurality of transmissions when the second transmission at least one:
    causes more interference to the DL reception in the FD slot than the first transmission;
    is closer in spatial beam direction to the spatial beam direction of the DL reception in the FD slot; or
    is closer in frequency to the frequency of the DL reception in the FD slot.

23. The method of claim 15, wherein the FD specific power backoff is one of a maximum power reduction (MPR), a cell-specific MPR, an intra-cell frequency-specific power backoff, or an intra-cell beam-specific power backoff.

24. The method of claim 15, wherein the plurality of transmissions comprises more than two uplink (UL) transmissions, more than two sidelink (SL) transmissions, or at least one UL transmission and at least one SL transmission.

25. The method of claim 24, wherein the more than two UL transmissions are transmitted to a plurality of transmission reception points (TRPs).

26. The method of claim 15, wherein each FD specific power backoff is determined further based on whether the corresponding transmission has a higher priority than the DL reception in the FD slot.

27. An apparatus for wireless communication at a user equipment (UE), comprising:
    means for determining a full-duplex (FD) specific power backoff associated with each of at least two transmissions of a plurality of transmissions in a slot that is configured as an FD slot, each FD specific power backoff being based on whether a corresponding transmission would cause self-interference with a downlink (DL) reception in the FD slot, the plurality of transmissions being overlapping in time;

means for determining a transmission power for each of the at least two transmissions in the FD slot based on the determined FD specific power backoff for each of the at least two transmissions;

means for determining an initial priority for each of the at least two transmissions;

means for prioritizing each of the at least two transmissions to determine a final priority for each of the at least two transmissions when each of the at least two transmissions has a same initial priority and a total transmission power exceeds a threshold power; and means for transmitting one or more of the at least two transmissions based on the determined transmission power and the determined final priority for the corresponding transmission.

28. A computer-readable medium storing computer executable code at a user equipment (UE), the code when executed by a processor causes the processor to:

determine a full-duplex (FD) specific power backoff associated with each of at least two transmissions of a plurality of transmissions in a slot that is configured as an FD slot, each FD specific power backoff being based on whether a corresponding transmission would cause self-interference with a downlink (DL) reception in the FD slot, the plurality of transmissions being overlapping in time;

determine a transmission power for each of the at least two transmissions in the FD slot based on the determined FD specific power backoff for each of the at least two transmissions;

determine an initial priority for each of the at least two transmissions;

prioritize each of the at least two transmissions to determine a final priority for each of the at least two transmissions when each of the at least two transmissions has a same initial priority and a total transmission power exceeds a threshold power; and transmit one or more of the at least two transmissions based on the determined transmission power and the determined final priority for the corresponding transmission.

* * * * *